United States Patent
Watanabe et al.

(10) Patent No.: US 12,504,348 B2
(45) Date of Patent: Dec. 23, 2025

(54) DISPERSION MEASUREMENT DEVICE AND DISPERSION MEASUREMENT METHOD

(71) Applicant: HAMAMATSU PHOTONICS K.K., Hamamatsu (JP)

(72) Inventors: Koyo Watanabe, Hamamatsu (JP); Hisanari Takahashi, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 259 days.

(21) Appl. No.: 18/286,250

(22) PCT Filed: Mar. 14, 2022

(86) PCT No.: PCT/JP2022/011388
§ 371 (c)(1),
(2) Date: Oct. 10, 2023

(87) PCT Pub. No.: WO2022/249660
PCT Pub. Date: Dec. 1, 2022

(65) Prior Publication Data
US 2024/0192082 A1    Jun. 13, 2024

(30) Foreign Application Priority Data
May 24, 2021  (JP) ................. 2021-087093

(51) Int. Cl.
*G01M 11/02*    (2006.01)
(52) U.S. Cl.
CPC ............................. *G01M 11/0207* (2013.01)
(58) Field of Classification Search
CPC .......... G01M 11/0207; G01M 11/338; G01M 11/0285; G02F 2203/26; G02F 2203/54; G01J 9/00; G01J 11/00
See application file for complete search history.

(56) References Cited

U.S. PATENT DOCUMENTS

| 6,456,380 B1 * | 9/2002 | Naganuma ............... G01J 11/00 356/450 |
| 2005/0058449 A1 * | 3/2005 | Ogawa ..................... G01J 11/00 398/9 |

(Continued)

FOREIGN PATENT DOCUMENTS

| JP | 2000-193558 A | 7/2000 |
| JP | 2000-321171 A | 11/2000 |

(Continued)

OTHER PUBLICATIONS

JP2020169946A translation (Year: 2020).*

(Continued)

*Primary Examiner* — Tarifur R Chowdhury
*Assistant Examiner* — Carlos Perez-Guzman
(74) *Attorney, Agent, or Firm* — Faegre Drinker Biddle & Reath LLP

(57) ABSTRACT

A dispersion measuring device includes a pulse forming unit, a light detection unit, a control unit, and an arithmetic operation unit. The control unit selectively outputs a first phase pattern and a second phase pattern. The pulse forming unit forms an optical pulse train from initial pulsed light, the optical pulse train including a plurality of optical pulses having a time difference from each other and having different center wavelengths from each other. The light detection unit detects a temporal waveform of the optical pulse train. The arithmetic operation unit estimates a wavelength dispersion amount of a measurement object based on a feature amount of the temporal waveform of the optical pulse train. When the first phase pattern is output, a pulse having a long center wavelength is generated first. When the second phase pattern is output, a pulse having a short center wavelength is generated first.

11 Claims, 34 Drawing Sheets

(56) References Cited

U.S. PATENT DOCUMENTS

2014/0368809 A1    12/2014  Chen et al.
2019/0128741 A1*   5/2019   Takahashi ................ G01J 11/00
2020/0076151 A1*   3/2020   Bordenyuk ............. G02F 1/113

FOREIGN PATENT DOCUMENTS

JP      2015-169847 A      9/2015
JP      2020-169946 A     10/2020
WO     WO-03/042652 A1     5/2003

OTHER PUBLICATIONS

English-language translation of International Preliminary Report on Patentability (IPRP) dated Dec. 7, 2023 that issued in WO Patent Application No. PCT/JP2022/011388.

* cited by examiner

Fig.6
(a)
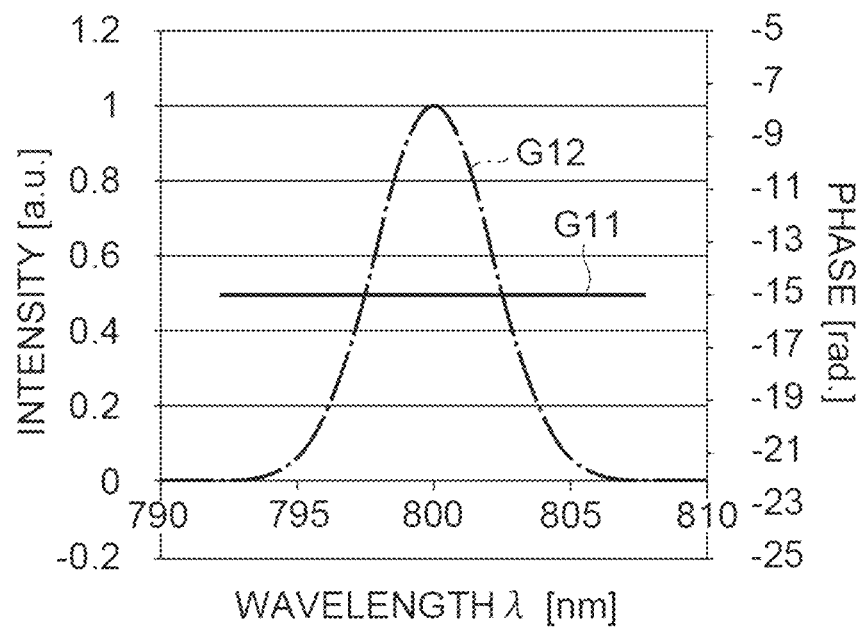
(b)
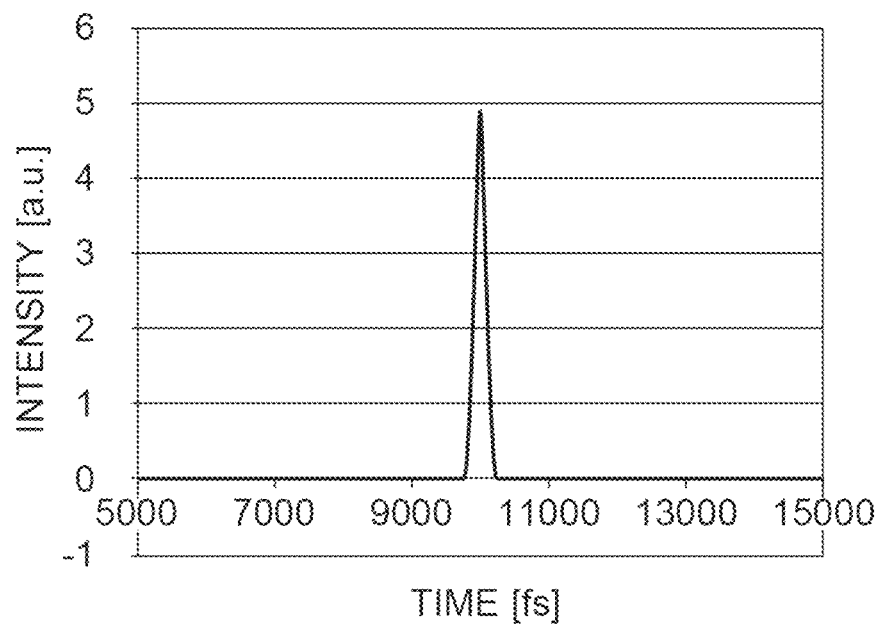

Fig.7
(a)
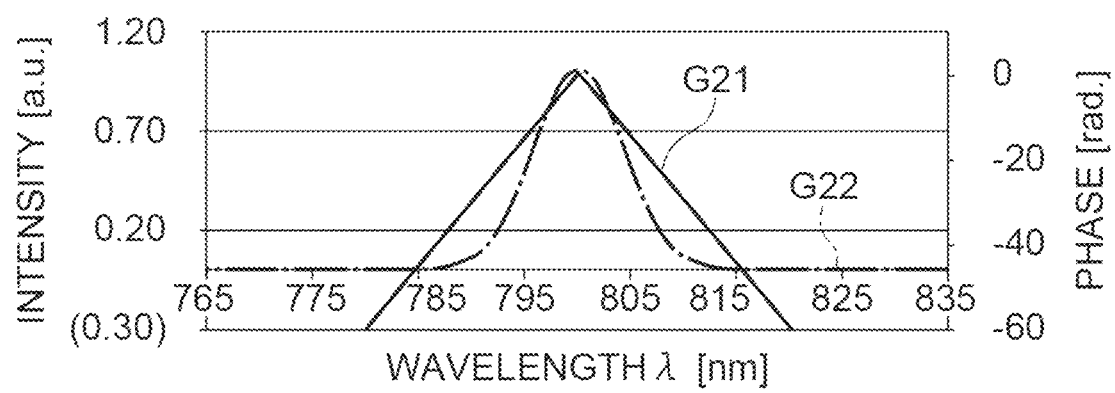
(b)
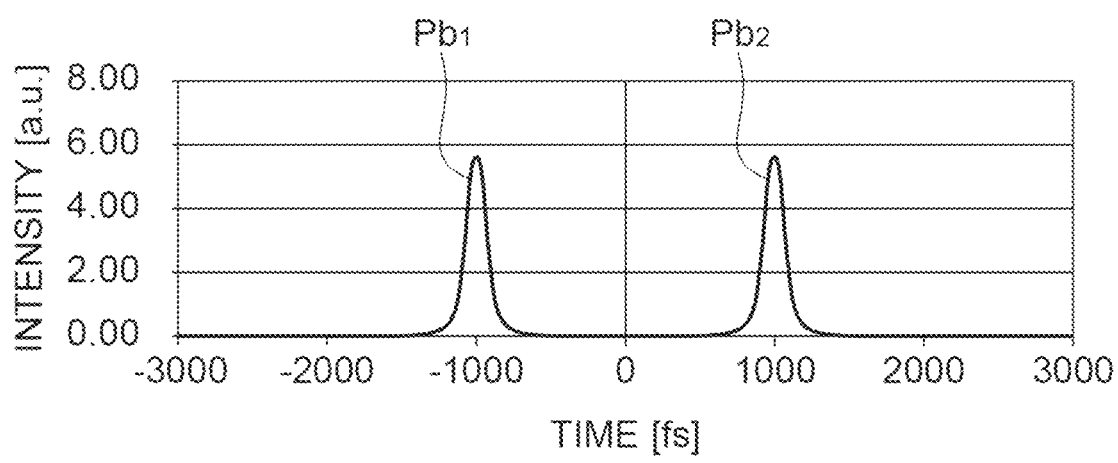

Fig.8
(a)
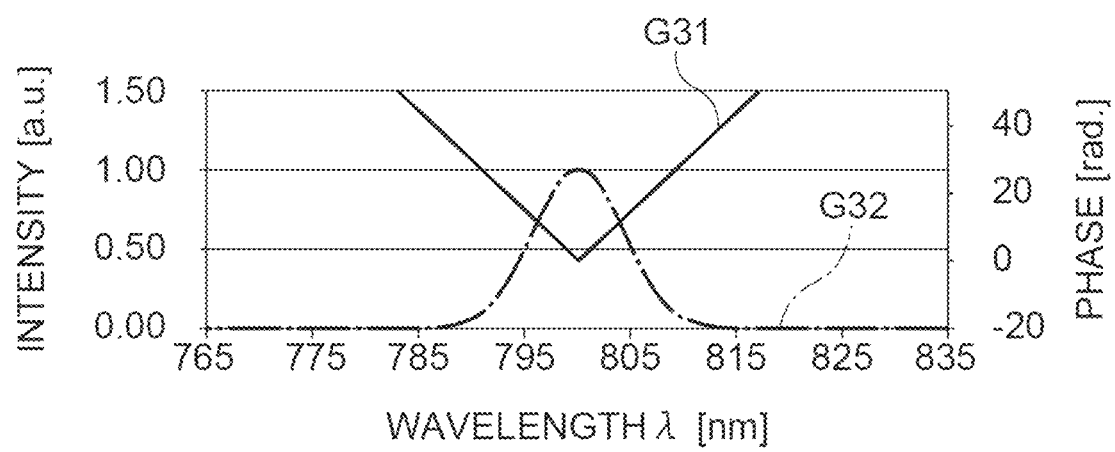
(b)
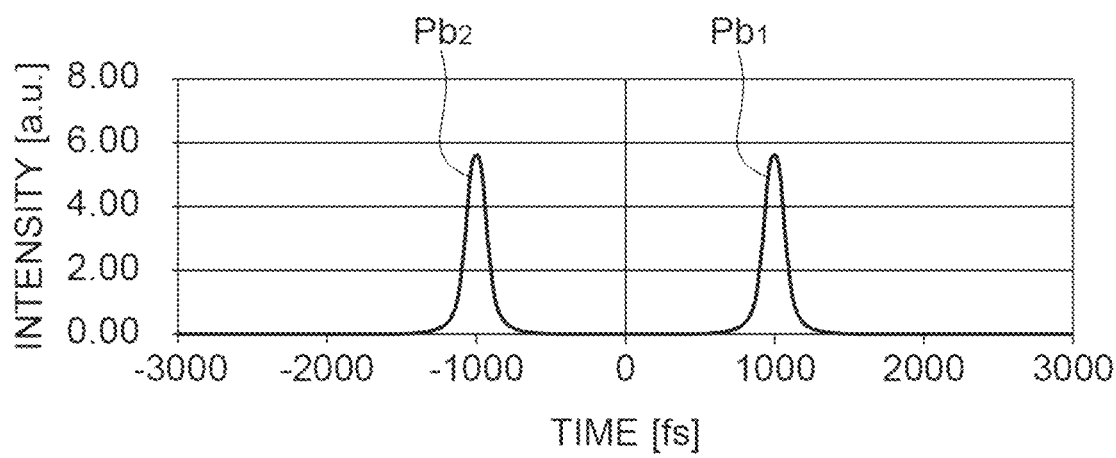

Fig.23
(a)
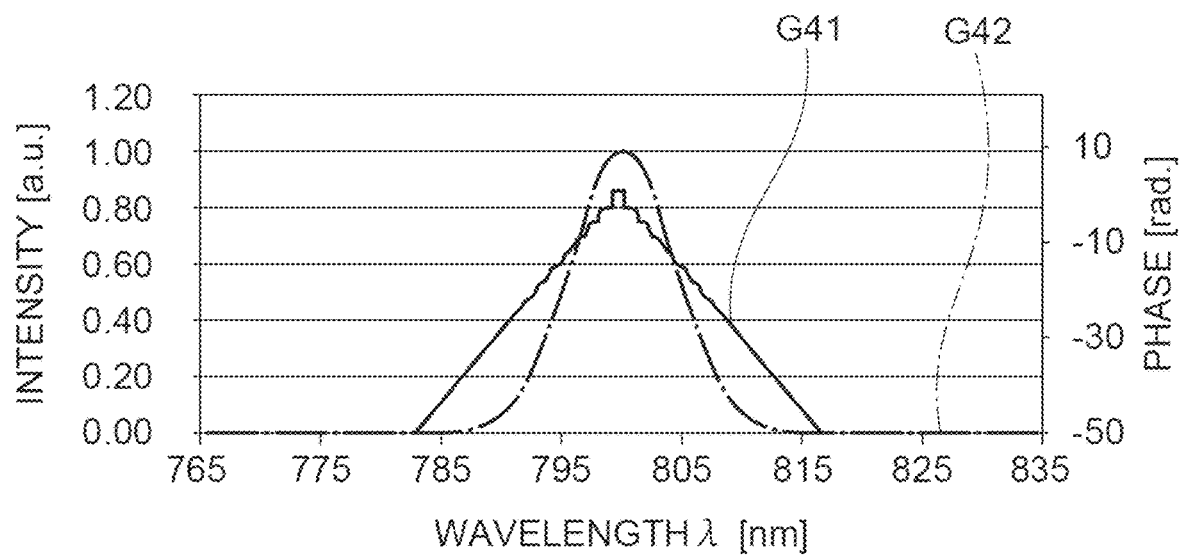
(b)
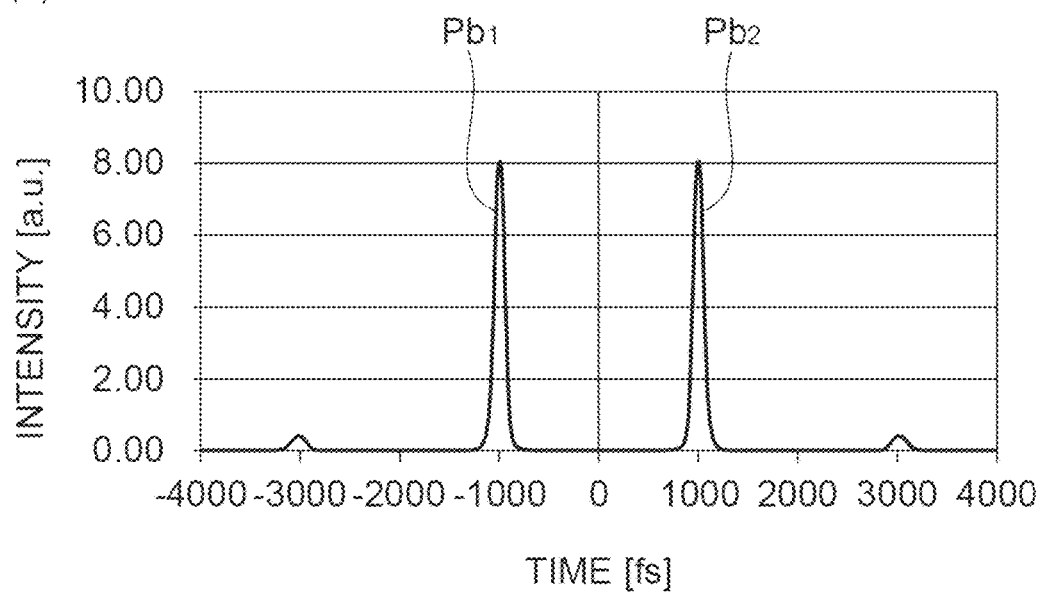

Fig.24
(a)
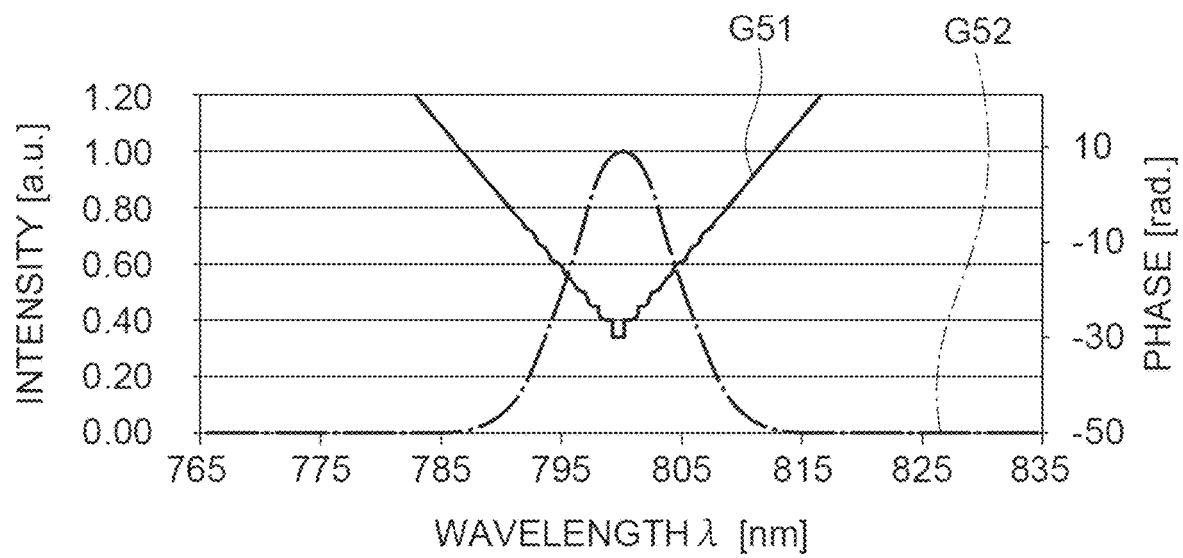
(b)
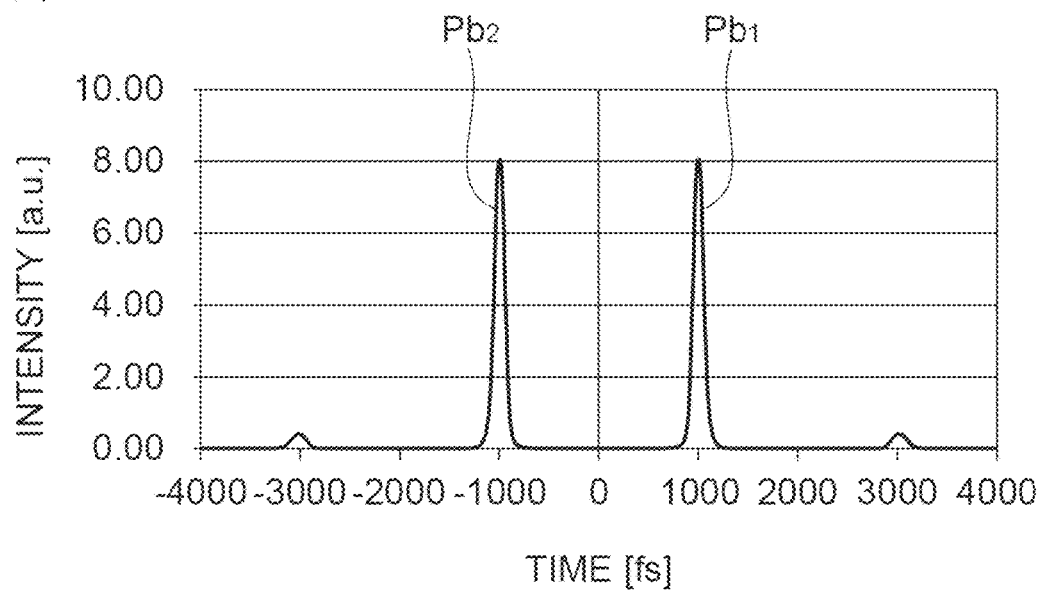

Fig.25
(a)
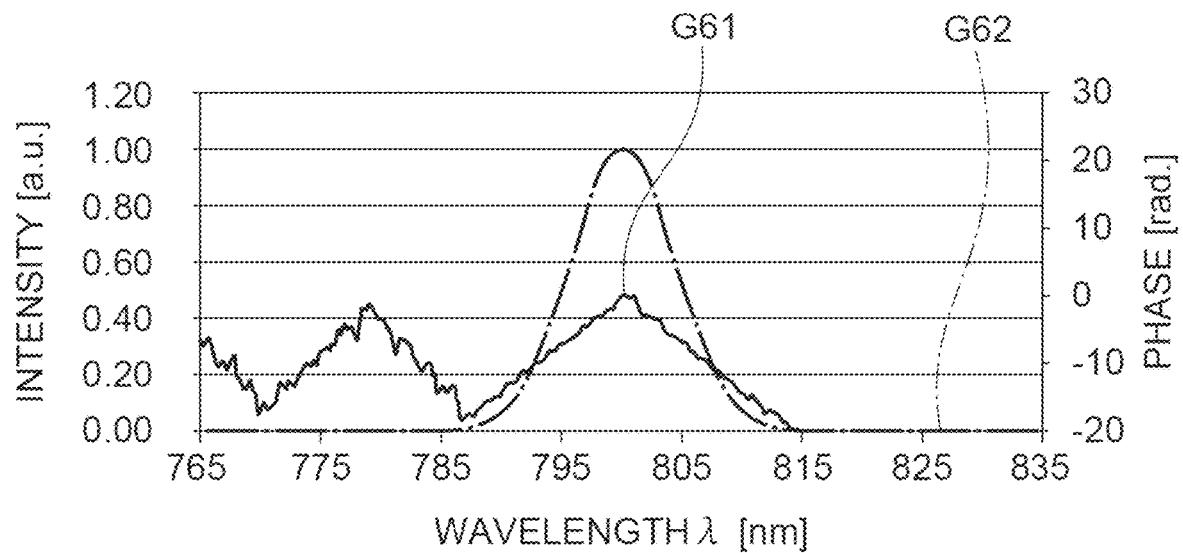
(b)
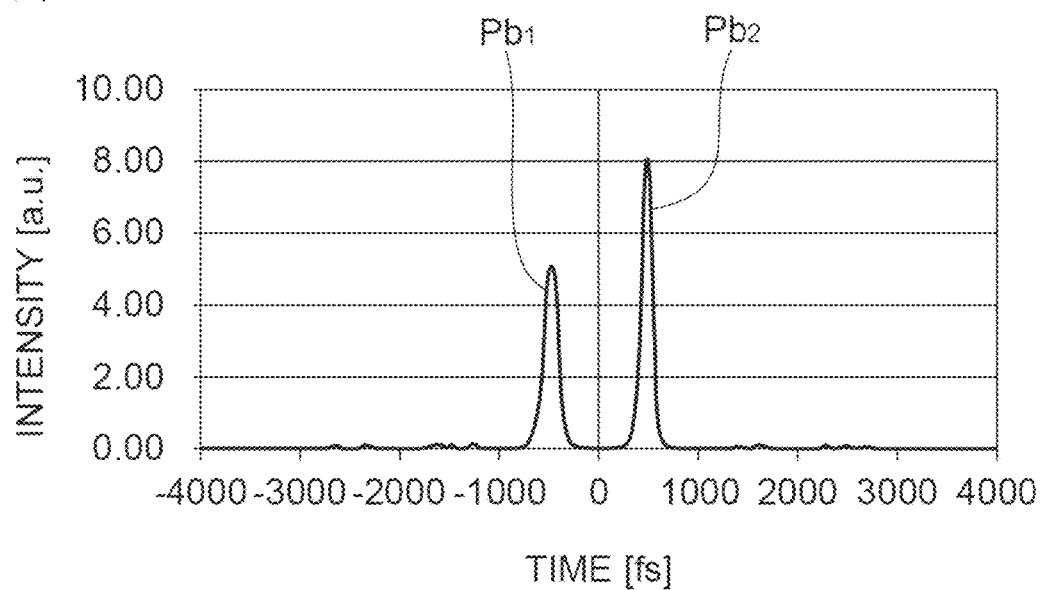

Fig.26
(a)
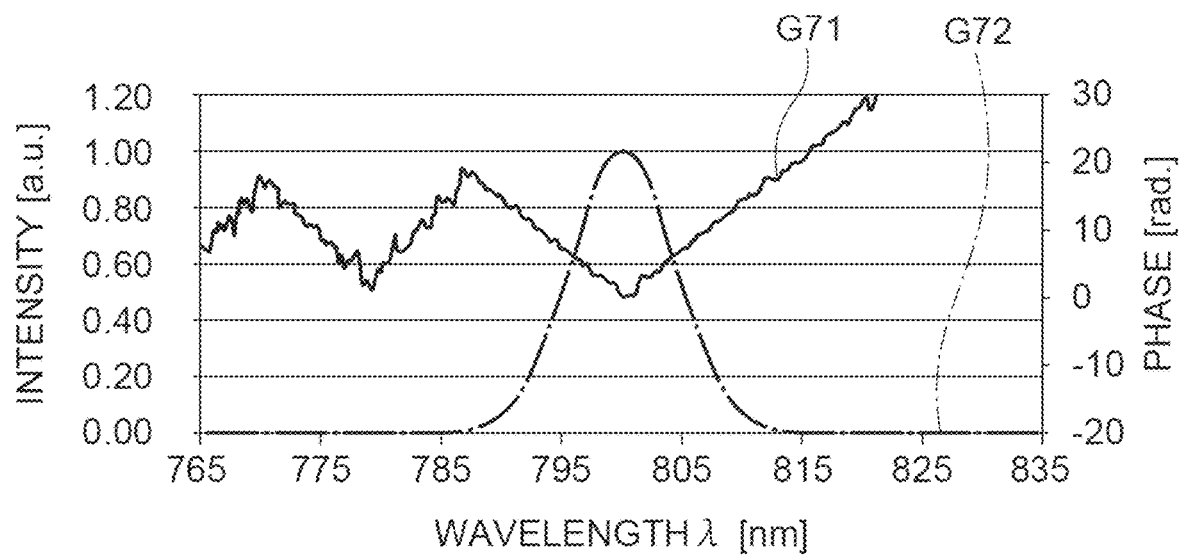
(b)
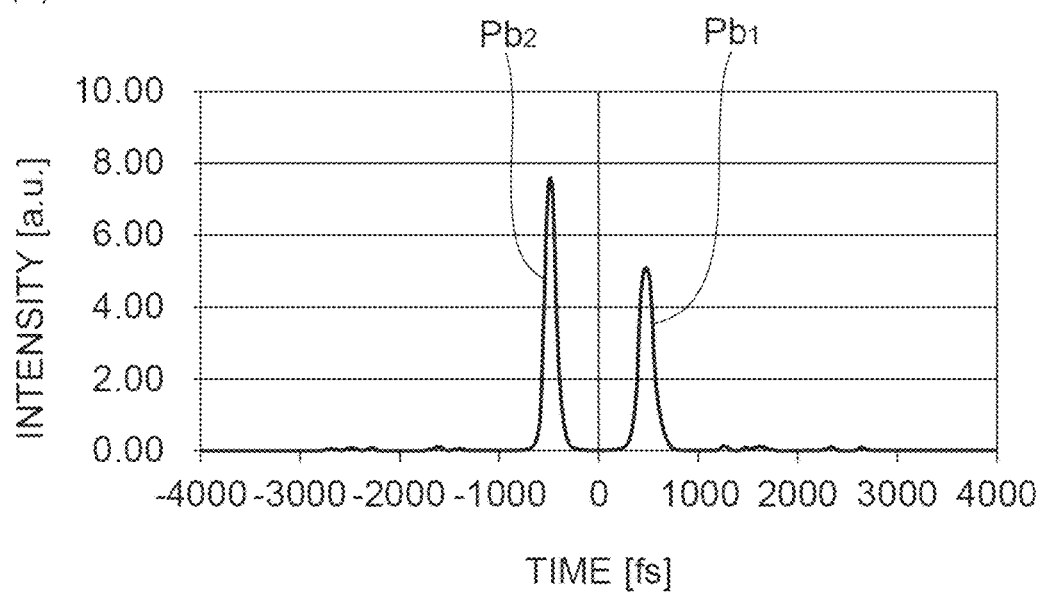

Fig.34
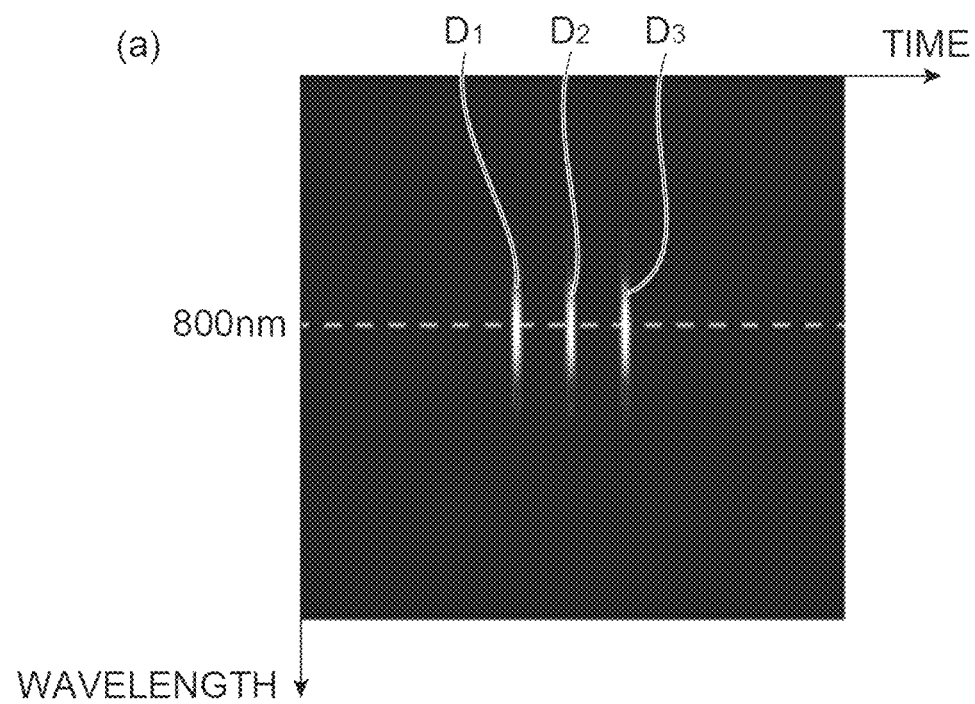
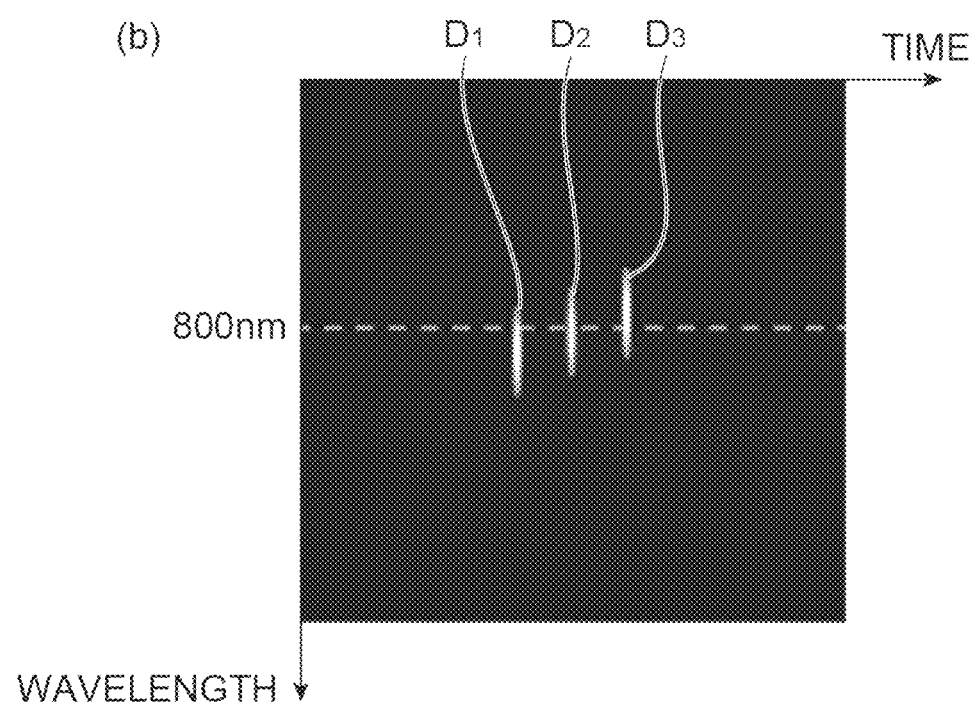

DISPERSION MEASUREMENT DEVICE AND DISPERSION MEASUREMENT METHOD

TECHNICAL FIELD

The present disclosure relates to a dispersion measuring device and a dispersion measuring method.

BACKGROUND ART

Patent Literature 1 discloses a dispersion measuring device and a dispersion measuring method capable of measuring a wavelength dispersion amount of a pulsed laser light source. In the device and the method, first, an optical pulse train is formed from an optical pulse to be measured output from a pulsed laser light source. The optical pulse train includes a plurality of optical pulses having a time difference from each other and having different center wavelengths from each other. Then, the optical pulse train enters into a correlation optical system. Then, correlated light including cross-correlation or autocorrelation of the optical pulse train is output from the correlation optical system. Finally, the temporal waveform of the correlated light is detected, and the wavelength dispersion amount of the pulsed laser light source is estimated from the feature amount of the temporal waveform of the detected correlated light. By inserting a measurement object such as an optical component into the optical system, it is also possible to estimate the wavelength dispersion amount of the measurement object from the temporal waveform of the correlated light.

CITATION LIST

Patent Literature

Patent Literature 1: Japanese Unexamined Patent Publication No. 2020-169946

SUMMARY OF INVENTION

Technical Problem

When the wavelength dispersion amount of a measurement object such as an optical component is measured, for example, an optical pulse train including a plurality of optical pulses having center wavelengths different from each other is transmitted through the measurement object. At this time, since the plurality of optical pulses are shifted by different times due to the wavelength dispersion of the measurement object, the time difference between the optical pulses changes. The wavelength dispersion amount of the measurement object can be measured based on the change in the time difference. However, in a case where the plurality of optical pulses are shifted to approach each other and at least some of the optical pulses interfere with each other, there is a concern that it is not possible to accurately measure the wavelength dispersion amount of the measurement object.

An object of one aspect of the present disclosure is to provide a dispersion measuring device and a dispersion measuring method capable of accurately measuring a wavelength dispersion amount of a measurement object.

Solution to Problem

In order to solve the above-described problem, according to an aspect of the present disclosure, a dispersion measuring device includes a light source, a control unit, a pulse forming unit, a light detection unit, and an arithmetic operation unit. The light source outputs initial pulsed light. The control unit stores a first phase pattern and a second phase pattern which are phase patterns presented in a spatial light modulator in order to generate modulated light by applying a predetermined phase shift for each wavelength to the initial pulsed light. The control unit selectively outputs a first phase pattern and a second phase pattern. The pulse forming unit includes a spatial light modulator that presents the phase patterns output by the control unit. The pulse forming unit forms, from the initial pulsed light, an optical pulse train that is modulated light including a first optical pulse of which a center wavelength is a first wavelength and a second optical pulse of which a center wavelength is a second wavelength shorter than the first wavelength. The light detection unit detects a temporal waveform of the optical pulse train. The arithmetic operation unit is electrically connected to the light detection unit. A measurement object is disposed on an optical path between the light source and the pulse forming unit or an optical path between the pulse forming unit and the light detection unit. The arithmetic operation unit estimates a wavelength dispersion amount of the measurement object based on a feature amount of the temporal waveform. The first optical pulse and the second optical pulse have a time difference from each other. The first phase pattern is a phase pattern for applying a predetermined phase shift for each wavelength to the initial pulsed light so that the first optical pulse is generated after the second optical pulse. The second phase pattern is a phase pattern for applying a predetermined phase shift for each wavelength to the initial pulsed light so that the second optical pulse is generated after the first optical pulse.

In this device, the control unit selectively outputs the first phase pattern and the second phase pattern. The output phase pattern is presented in the spatial light modulator of the pulse forming unit. Then, in the pulse forming unit, the optical pulse train including the first optical pulse and the second optical pulse having a center wavelength shorter than that of the first optical pulse is formed. In a case where the control unit outputs the first phase pattern, the first optical pulse is generated after the second optical pulse in the pulse forming unit. In a case where the control unit outputs the second phase pattern, the second optical pulse is generated after the first optical pulse in the pulse forming unit. When the wavelength dispersion amount of the measurement object is negative, if the second optical pulse is output before the first optical pulse, the time difference between the first optical pulse and the second optical pulse is widened when the optical pulse train is transmitted through the measurement object. When the wavelength dispersion amount of the measurement object is positive, if the first optical pulse is output before the second optical pulse, the time difference between the first optical pulse and the second optical pulse is widened when the optical pulse train is transmitted through the measurement object. Therefore, even in a case where the wavelength dispersion amount of the measurement object is either positive or negative, it is possible to widen the time difference between the first optical pulse and the second optical pulse when the optical pulse train is transmitted through the measurement object. This makes it possible to prevent interference of the first optical pulse and the second optical pulse with each other. In view of the above, it is possible to accurately measure the wavelength dispersion amount of the measurement object.

According to another aspect of the present disclosure, a dispersion measuring method includes an output step, a control step, a pulse forming step, a detection step, and an arithmetic operation step. In the output step, initial pulsed light is output. In the control step, a first phase pattern and a second phase pattern which are phase patterns presented in a spatial light modulator in order to generate modulated light by applying a predetermined phase shift for each wavelength to the initial pulsed light are stored. In the control step, one of the first phase pattern and the second phase pattern is selectively output. In the pulse forming step, in the spatial light modulator that presents a phase pattern output in the control step, an optical pulse train that is modulated light including a first optical pulse of which a center wavelength is a first wavelength and a second optical pulse of which a center wavelength is a second wavelength shorter than the first wavelength is formed from the initial pulsed light. In the detection step, a temporal waveform of the optical pulse train is detected. In the arithmetic operation step, a feature amount of the temporal waveform is acquired. In the pulse forming step, an optical pulse train is formed from the initial pulsed light after the initial pulsed light is transmitted through a measurement object. Alternatively, in the detection step, the temporal waveform of the optical pulse train is detected after the optical pulse train is transmitted through the measurement object. In the arithmetic operation step, a wavelength dispersion amount of the measurement object is estimated based on the feature amount of the temporal waveform. The first optical pulse and the second optical pulse have a time difference from each other. The first phase pattern is a phase pattern for applying a predetermined phase shift for each wavelength to the initial pulsed light so that the first optical pulse is generated after the second optical pulse. The second phase pattern is a phase pattern for applying a predetermined phase shift for each wavelength to the initial pulsed light so that the second optical pulse is generated after the first optical pulse.

In this method, in the control step, the first phase pattern and the second phase pattern are selectively output. The output phase pattern is presented in the spatial light modulator in the pulse forming step. Then, in the pulse forming step, the optical pulse train including the first optical pulse and the second optical pulse having a center wavelength shorter than that of the first optical pulse is formed. In a case where the first phase pattern is output in the control step, the first optical pulse is generated after the second optical pulse in the pulse forming step. In a case where the second phase pattern is output in the control step, the second optical pulse is generated after the first optical pulse in the pulse forming step. When the wavelength dispersion amount of the measurement object is negative, if the second optical pulse is output before the first optical pulse, the time difference between the first optical pulse and the second optical pulse is widened when the optical pulse train is transmitted through the measurement object. When the wavelength dispersion amount of the measurement object is positive, if the first optical pulse is output before the second optical pulse, the time difference between the first optical pulse and the second optical pulse is widened when the optical pulse train is transmitted through the measurement object. Therefore, even in a case where the wavelength dispersion amount of the measurement object is either positive or negative, it is possible to widen the time difference between the first optical pulse and the second optical pulse when the optical pulse train is transmitted through the measurement object. This makes it possible to prevent interference of the first optical pulse and the second optical pulse with each other. From the above, it is possible to accurately measure the wavelength dispersion amount of the measurement object.

In the above device, the control unit may output the first phase pattern in a case where the wavelength dispersion amount of the measurement object is negative, and may output the second phase pattern in a case where the wavelength dispersion amount of the measurement object is positive. According to this device, when the optical pulse train is transmitted through the measurement object, the first optical pulse and the second optical pulse are shifted in a direction in which the time difference between the first optical pulse and the second optical pulse is widened. Thus, the interference of the first optical pulse and the second optical pulse with each other is suppressed. Therefore, it is possible to accurately measure the wavelength dispersion amount of the measurement object.

In the above device, in a case where one of the first phase pattern and the second phase pattern is output, and then it is determined that the first optical pulse and the second optical pulse interfere with each other in the temporal waveform of the optical pulse train detected by the light detection unit, the control unit may output the other phase pattern. In this device, one of the phase patterns is output first, and the temporal waveform of the optical pulse train is detected. In a case where it is determined that the first optical pulse and the second optical pulse do not interfere with each other in the detected temporal waveform, the wavelength dispersion amount of the measurement object is estimated from the feature amount of the temporal waveform. In a case where it is determined that the first optical pulse and the second optical pulse interfere with each other, the other phase pattern is output, the temporal waveform of the optical pulse train is detected, and the wavelength dispersion amount of the measurement object is estimated from the feature amount of the temporal waveform. Therefore, even in a case where the wavelength dispersion amount of the measurement object is either positive or negative, the wavelength dispersion amount of the measurement object is estimated from the feature amount of the temporal waveform of the optical pulse train in which the first optical pulse and the second optical pulse do not interfere with each other. Thus, it is possible to accurately measure the wavelength dispersion amount of the measurement object.

In the above device, the arithmetic operation unit may estimate the wavelength dispersion amount of the measurement object based on a temporal waveform of an optical pulse train in which a time difference between peaks is larger among a temporal waveform of an optical pulse train detected by the light detection unit when the first phase pattern is output by the control unit and a temporal waveform of an optical pulse train detected by the light detection unit when the second phase pattern is output by the control unit. According to this device, the wavelength dispersion amount of the measurement object is estimated based on the temporal waveform of the optical pulse train in which the time difference between the first optical pulse and the second optical pulse is widened and the pulses do not interfere with each other. Therefore, it is possible to accurately measure the wavelength dispersion amount of the measurement object.

In the above device, the light detection unit may include a correlation optical system that receives an optical pulse train and outputs correlated light including cross-correlation or autocorrelation of the optical pulse train, and may detect a temporal waveform of the correlated light as the temporal waveform of the optical pulse train. The arithmetic operation unit may estimate the wavelength dispersion amount of the measurement object based on a feature amount of the temporal waveform of the correlated light. Similarly, in the detection step of the method, correlated light including cross-correlation or autocorrelation of the optical pulse train may be generated, and a temporal waveform of the correlated light may be detected as the temporal waveform of the optical pulse train. In the arithmetic operation step, the wavelength dispersion amount of the measurement object may be estimated based on the feature amount of the temporal waveform of the correlated light. According to the device and method, since the feature amount of the temporal waveform is accurately measured, it is possible to more accurately measure the wavelength dispersion amount of the measurement object.

In the above device, the first phase pattern and the second phase pattern may indicate a phase value, which is a value indicating the magnitude of the phase shift applied to the initial pulsed light, at each wavelength. At each wavelength, the phase value in the first phase pattern may have a symmetrical relationship with the phase value of the second phase pattern with respect to a predetermined phase value. According to this device, it is possible to simplify the design of the phase pattern and the like, and the design becomes easy.

In the above device, the measurement object may be disposed on an optical path between the pulse forming unit and the light detection unit. According to the above device, for example, as described above, it is possible to dispose the measurement object at any position on the optical path. Therefore, since the degree of freedom in spatial design of the device is high, it is possible to reduce the size of the device and to design the device for improving convenience such as ease of mounting and removal of the measurement object.

Advantageous Effects of Invention

According to the dispersion measuring device and the dispersion measuring method according to the aspect of the present disclosure, it is possible to accurately measure a wavelength dispersion amount of a measurement object.

Figure 4:
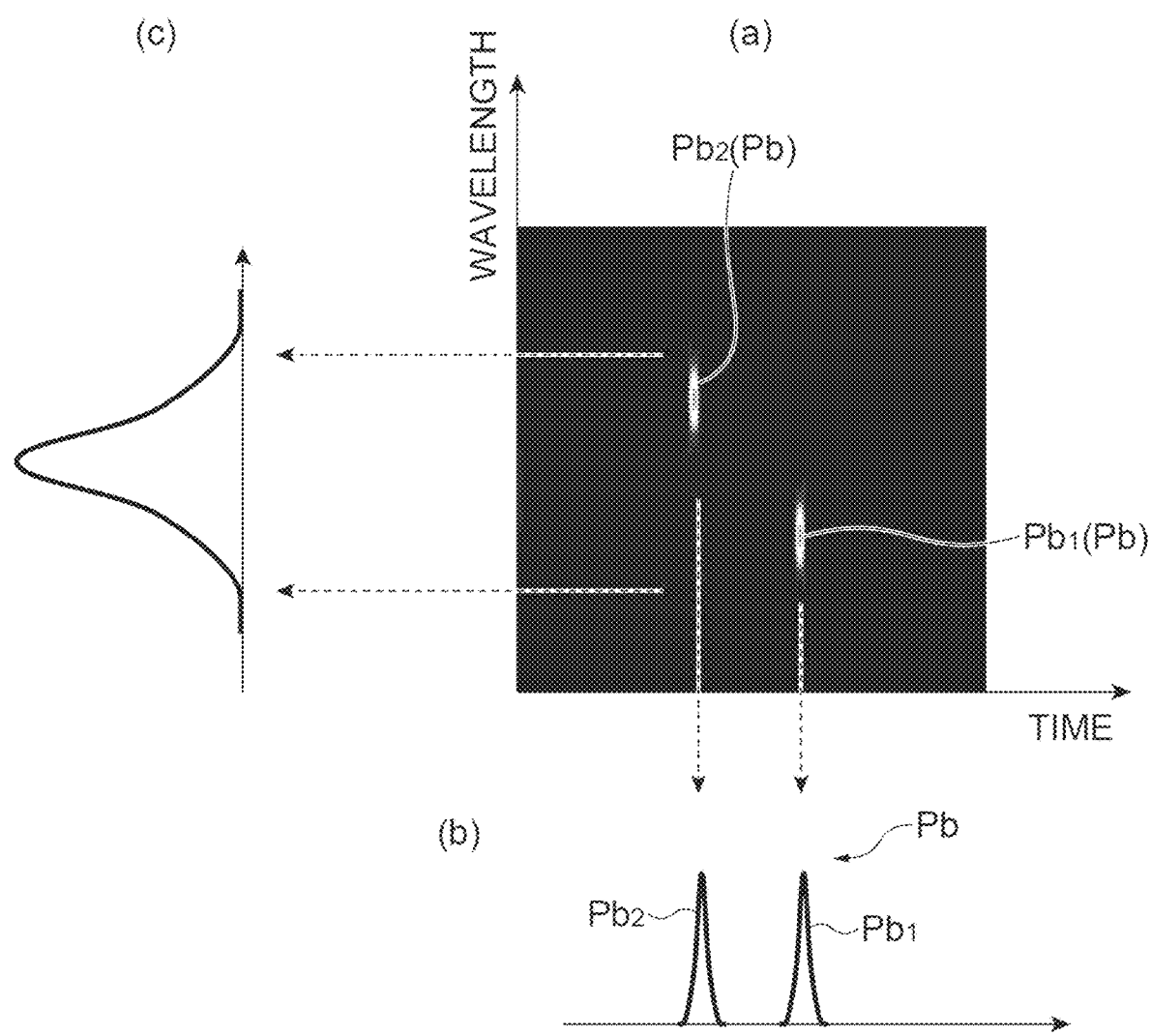

(a), (b), and (c) of FIG. 4 are diagrams illustrating examples of a band-controlled multi-pulse.

Figure 5:
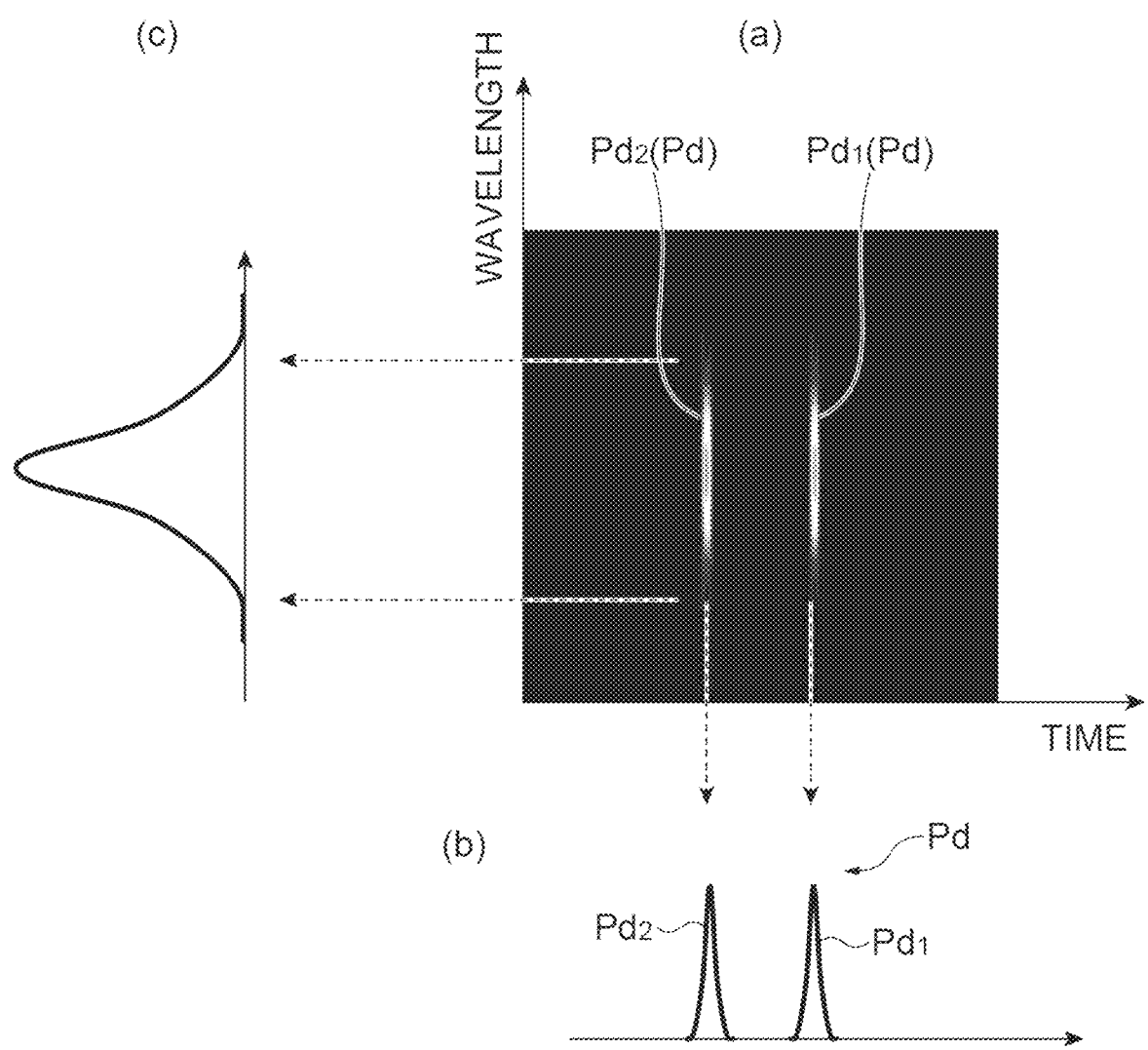

(a), (b), and (c) of FIG. 5 are diagrams illustrating examples of a multi-pulse of which a band is not controlled, as a comparative example.

(a) of FIG. 6 illustrates a spectral waveform of a single-pulsed initial pulsed light. (b) of FIG. 6 illustrates a temporal intensity waveform of the initial pulsed light.

(a) of FIG. 7 illustrates a spectral waveform of output light from the pulse forming unit when triangular wave-shaped phase spectrum modulation is applied in the SLM. (b) of FIG. 7 illustrates a temporal intensity waveform of the output light from the pulse forming unit.

(a) of FIG. 8 illustrates a spectral waveform of output light from the pulse forming unit when triangular wave-shaped phase spectrum modulation is applied in the SLM. (b) of FIG. 8 illustrates a temporal intensity waveform of the output light from the pulse forming unit.

Figure 9:
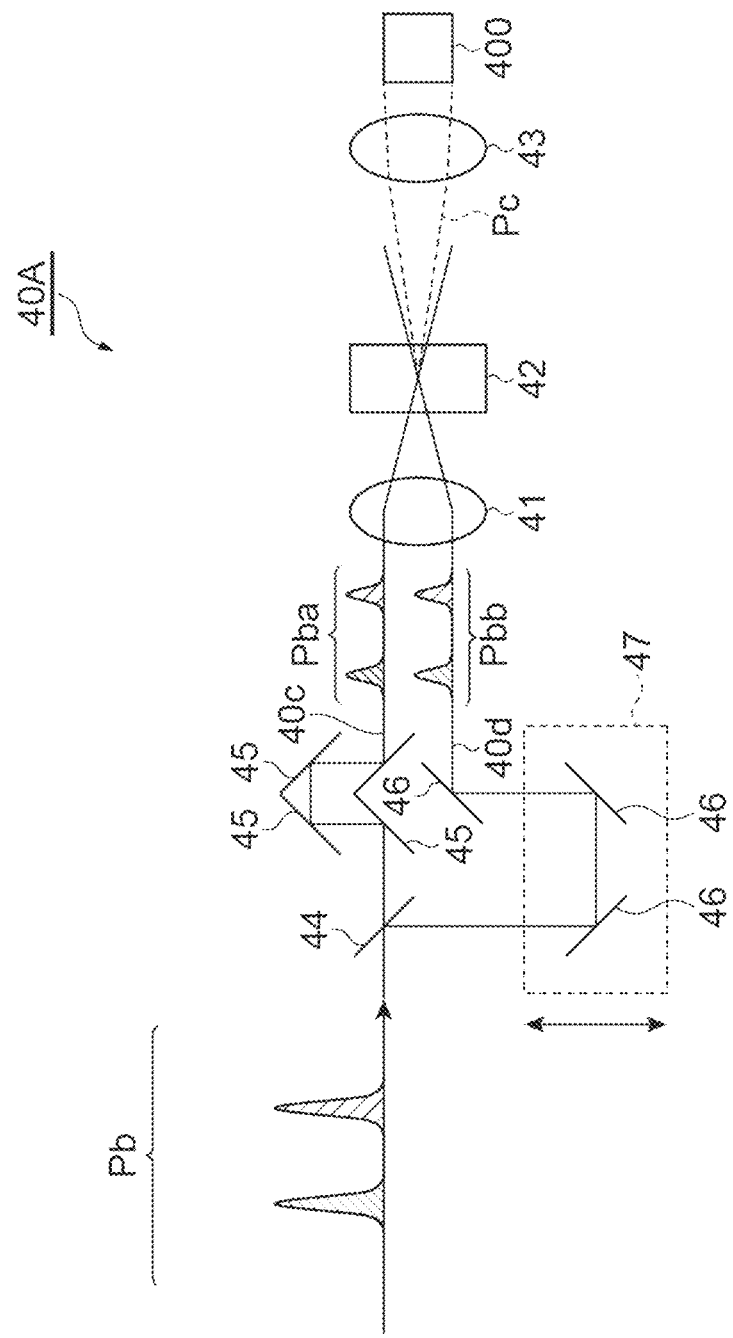

FIG. 9 is a schematic diagram illustrating a correlation optical system for generating correlated light including autocorrelation of an optical pulse train, as a configuration example of the correlation optical system.

Figure 10:
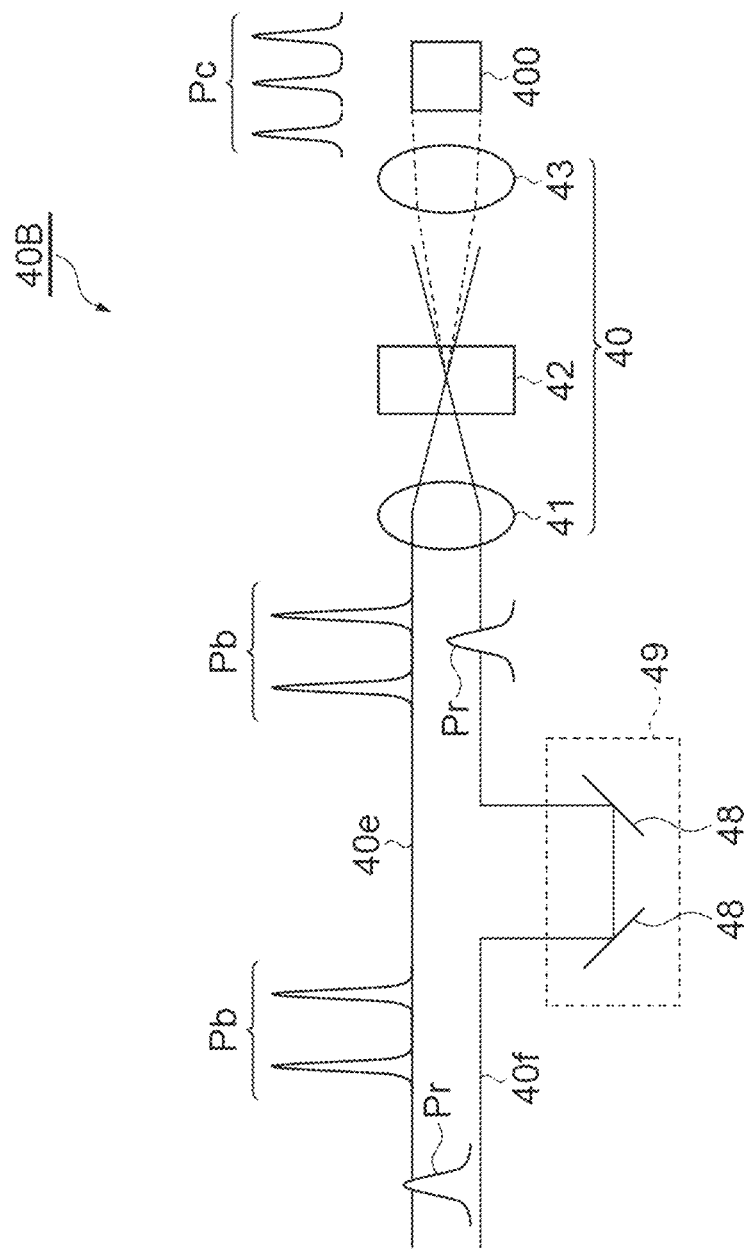

FIG. 10 is a schematic diagram illustrating a correlation optical system for generating correlated light including cross-correlation of an optical pulse train, as another configuration example of the correlation optical system.

Figure 11:
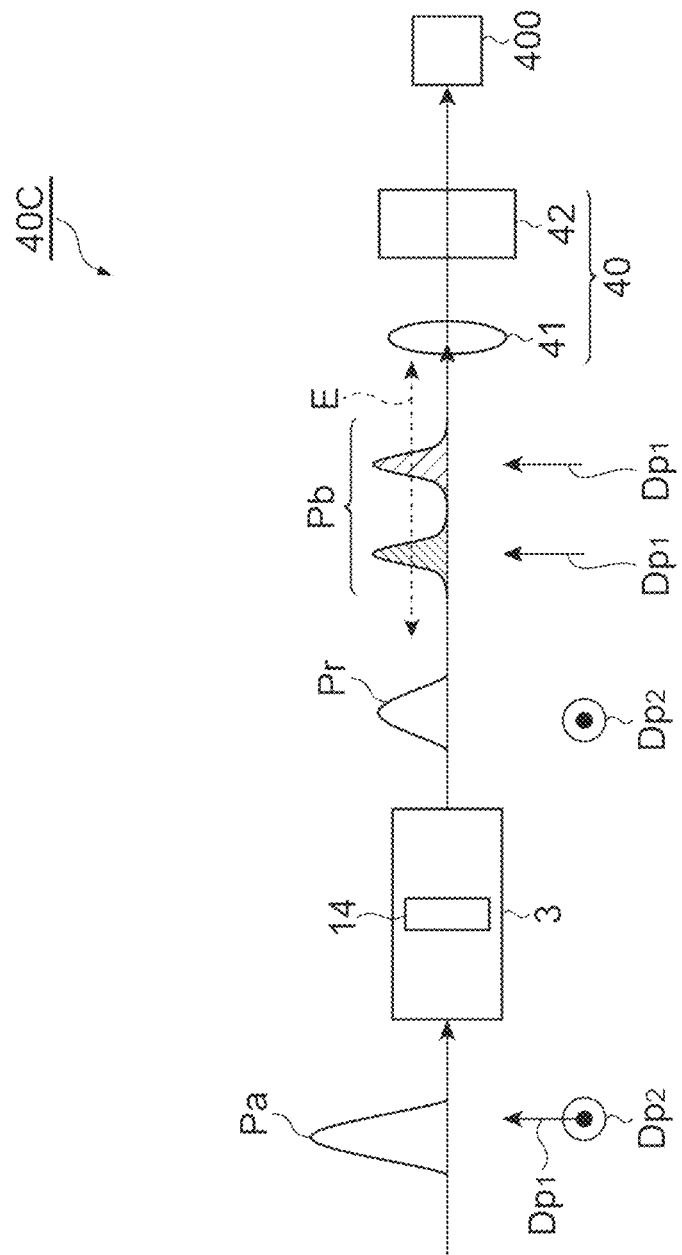

FIG. 11 is a schematic diagram illustrating a correlation optical system for generating correlated light including cross-correlation of an optical pulse train, as still another configuration example of the correlation optical system.

Figure 12:
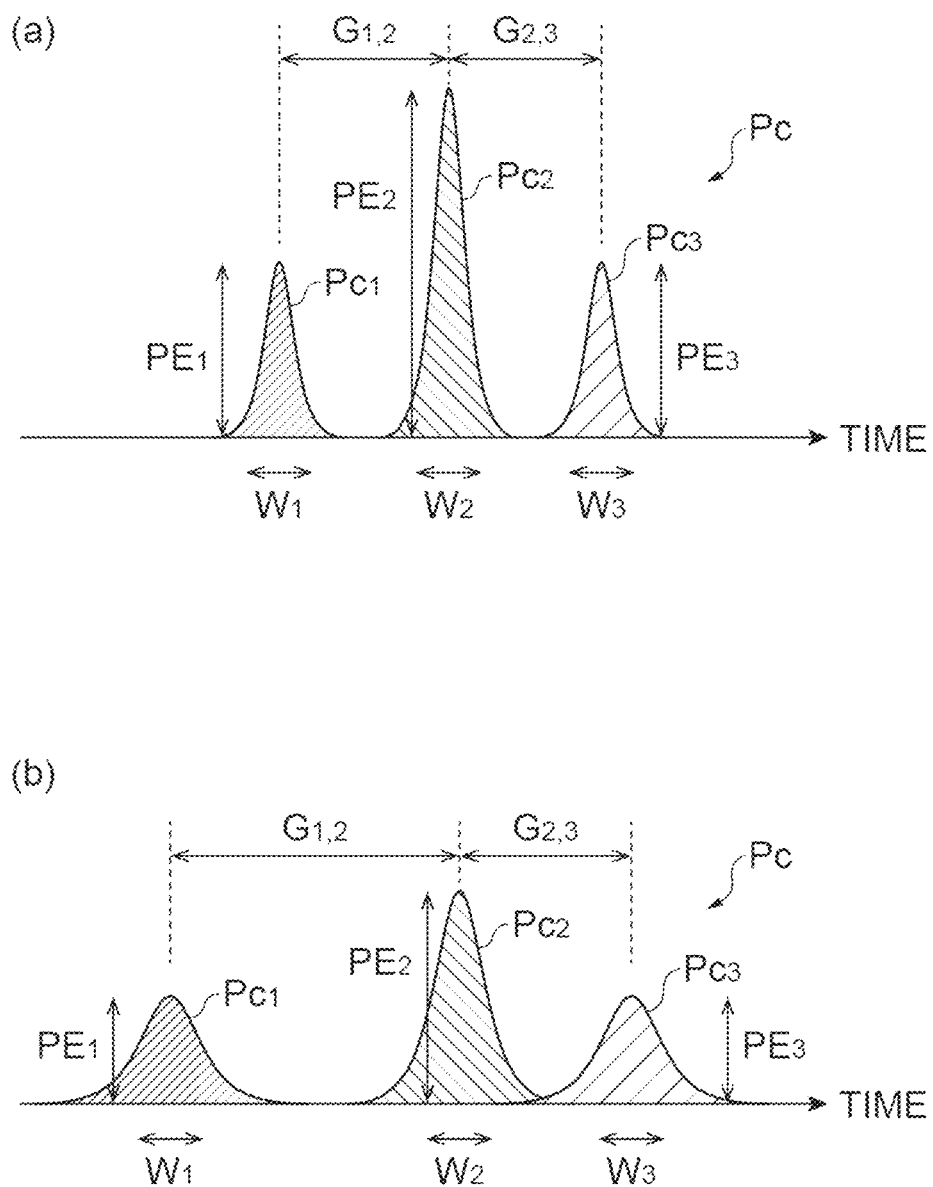

FIG. 12 is a view for conceptually describing a feature amount of the correlated light. (a) of FIG. 12 illustrates an example of a temporal waveform of the correlated light in a case where a wavelength dispersion of an optical component is zero. (b) of FIG. 12 illustrates an example of the temporal waveform of the correlated light in a case where the wavelength dispersion of the optical component is not zero.

Figure 13:
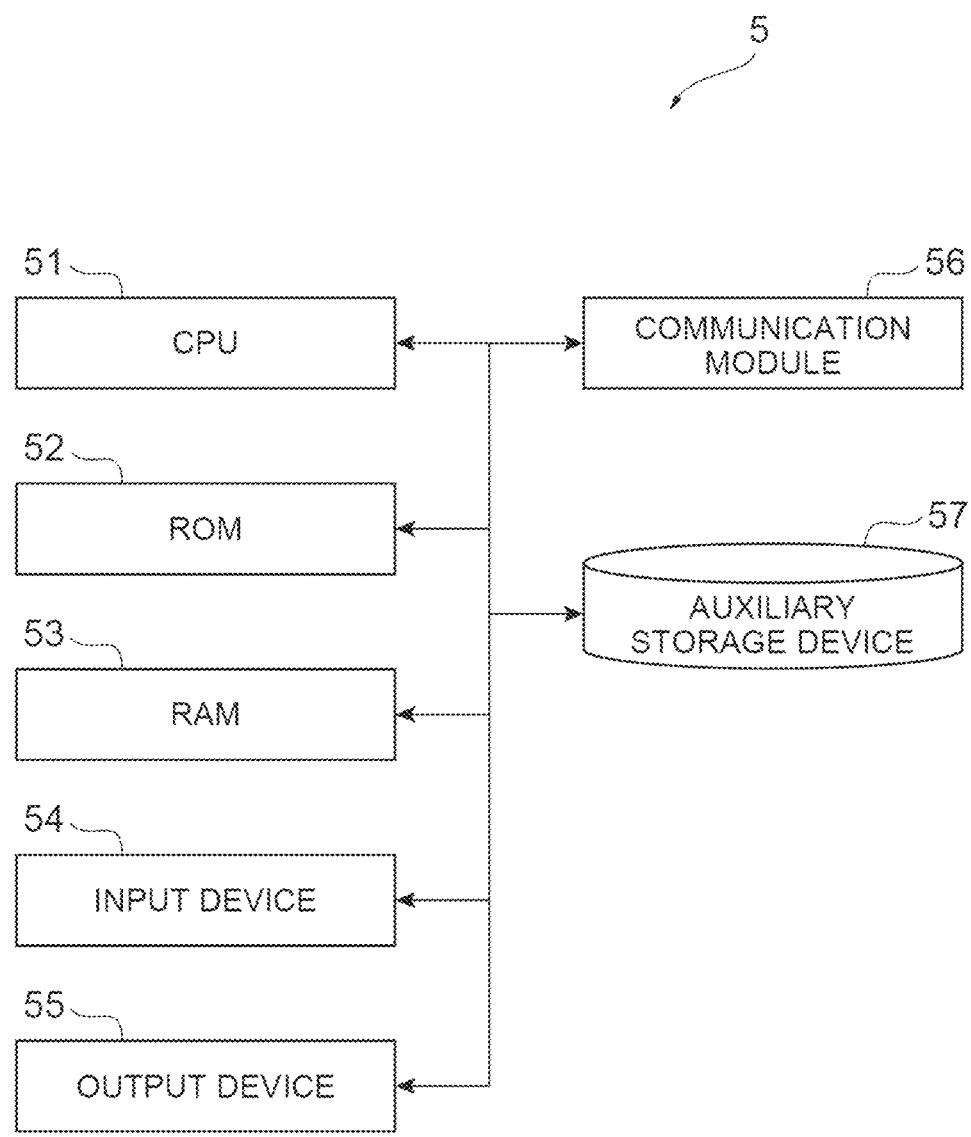

FIG. 13 is a schematic diagram illustrating a configuration example of hardware of a control device.

Figure 14:
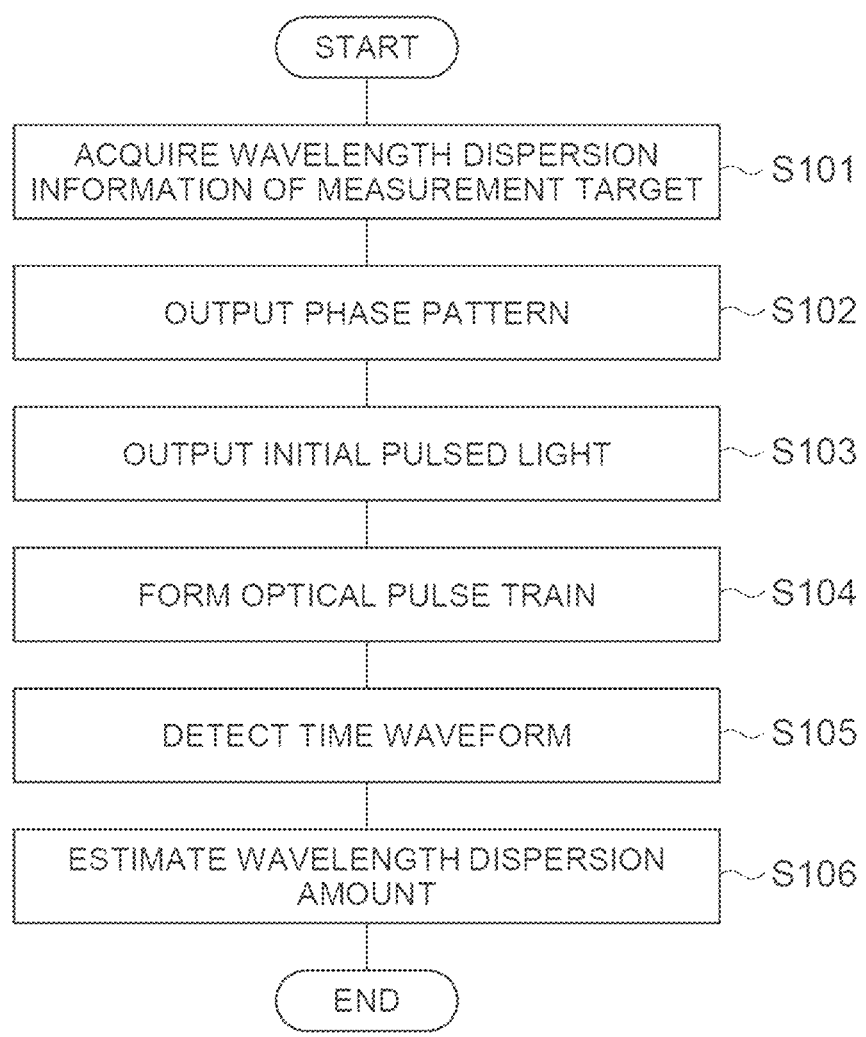

FIG. 14 is a flowchart illustrating a dispersion measuring method using the dispersion measuring device.

Figure 15:
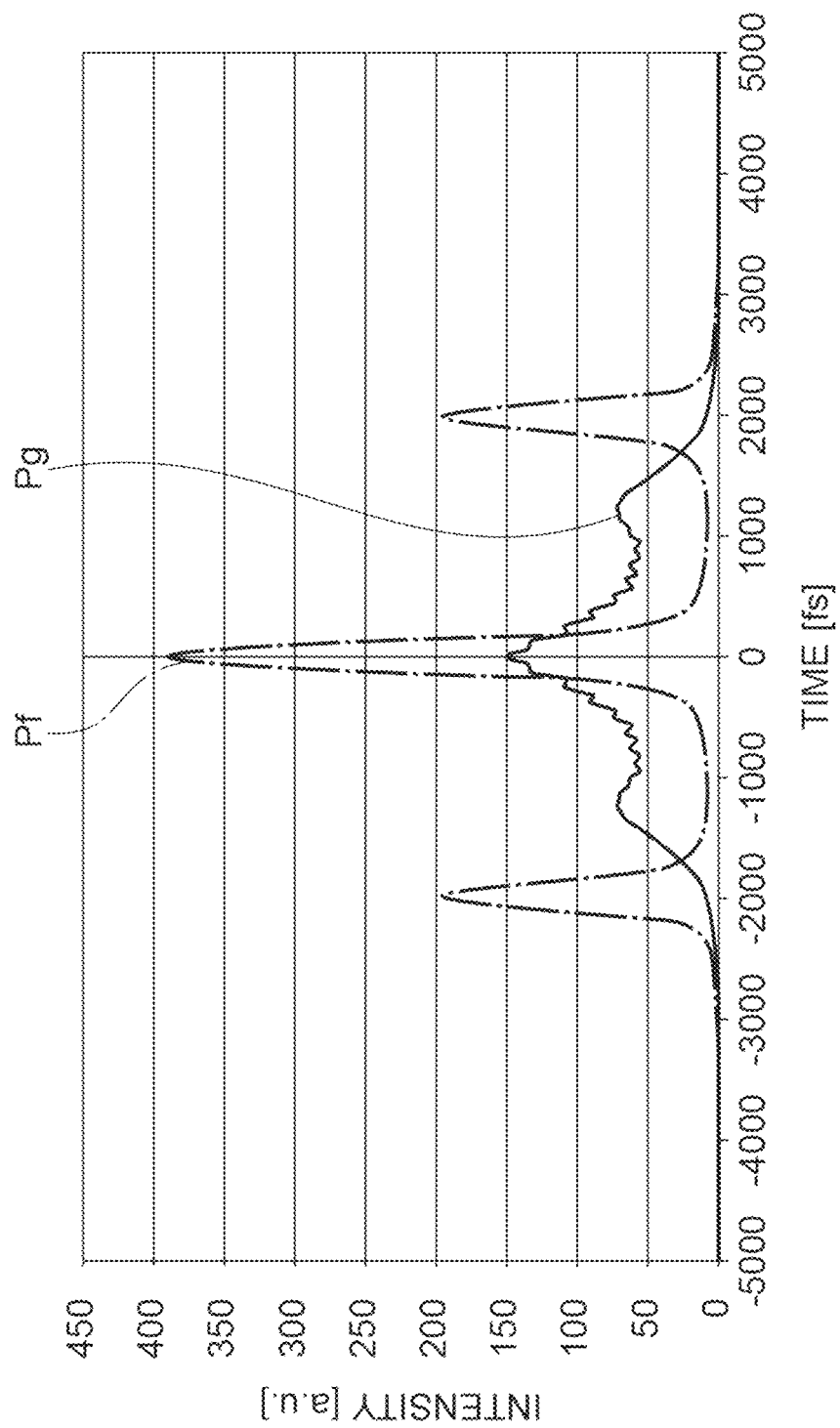

FIG. 15 is a diagram illustrating the correlated light in a case where the wavelength dispersion of the optical component is not zero and the correlated light in a case where the wavelength dispersion amount of the optical component is zero.

Figure 16:
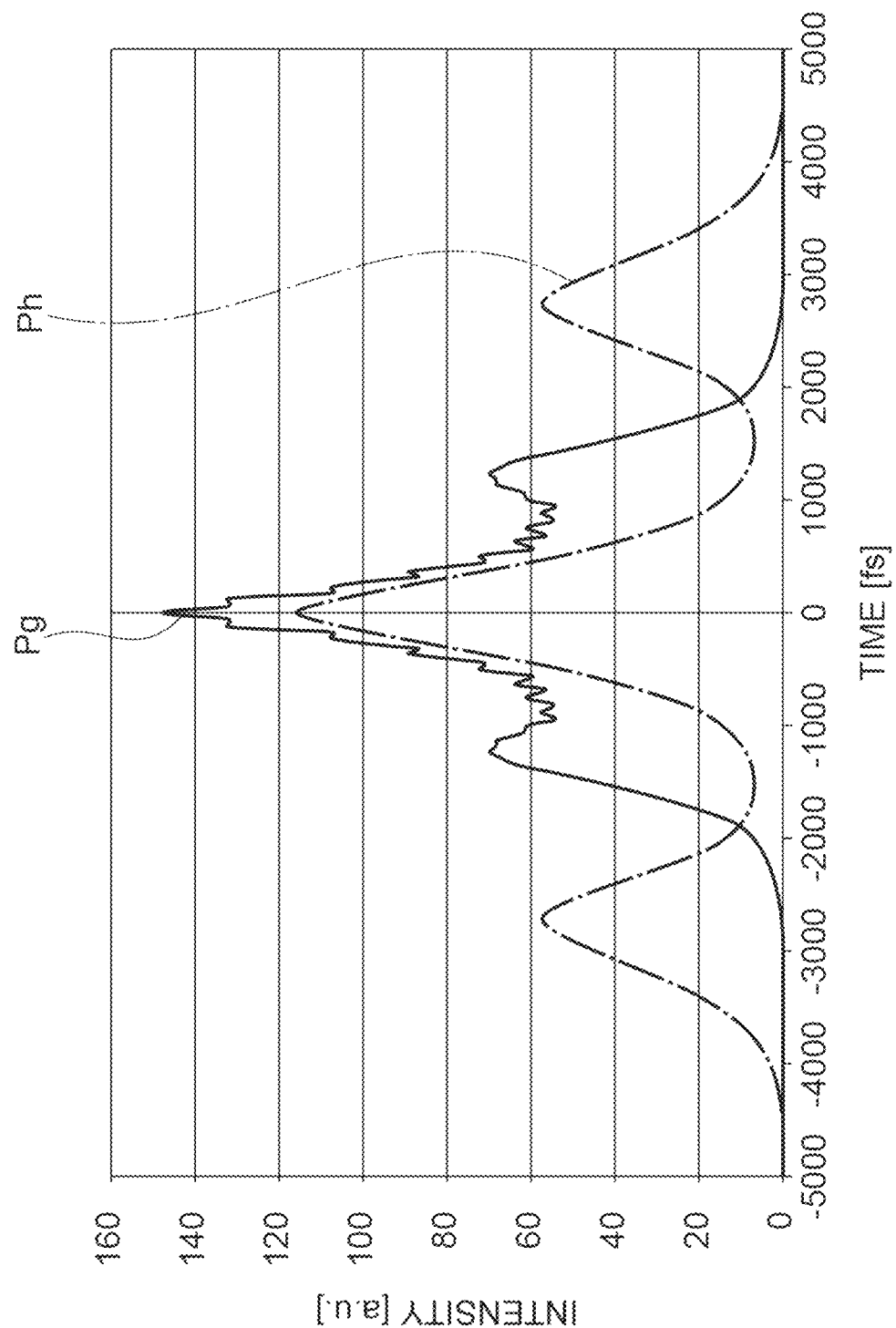

FIG. 16 is a diagram illustrating the correlated light in a case where the wavelength dispersion of the optical component is not zero.

Figure 17:
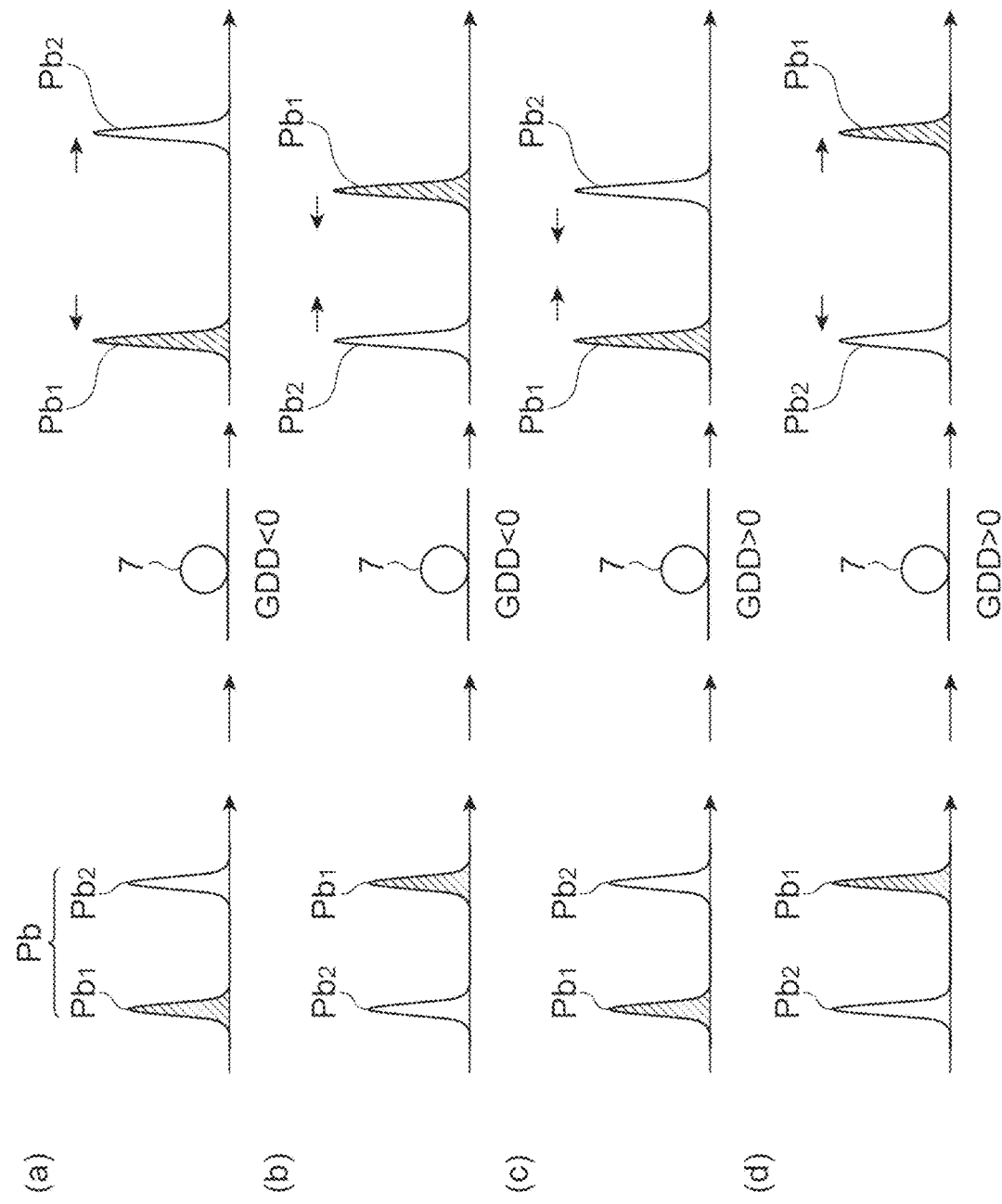

(a) and (b) of FIG. 17 illustrate a change in a temporal position of a peak in a temporal waveform of an optical pulse train when the optical pulse train is transmitted through an optical component having a negative wavelength dispersion amount. (c) and (d) of FIG. 17 illustrate a change in the temporal position of the peak in the optical pulse train when the optical pulse train is transmitted through an optical component having a positive wavelength dispersion amount.

Figure 18:
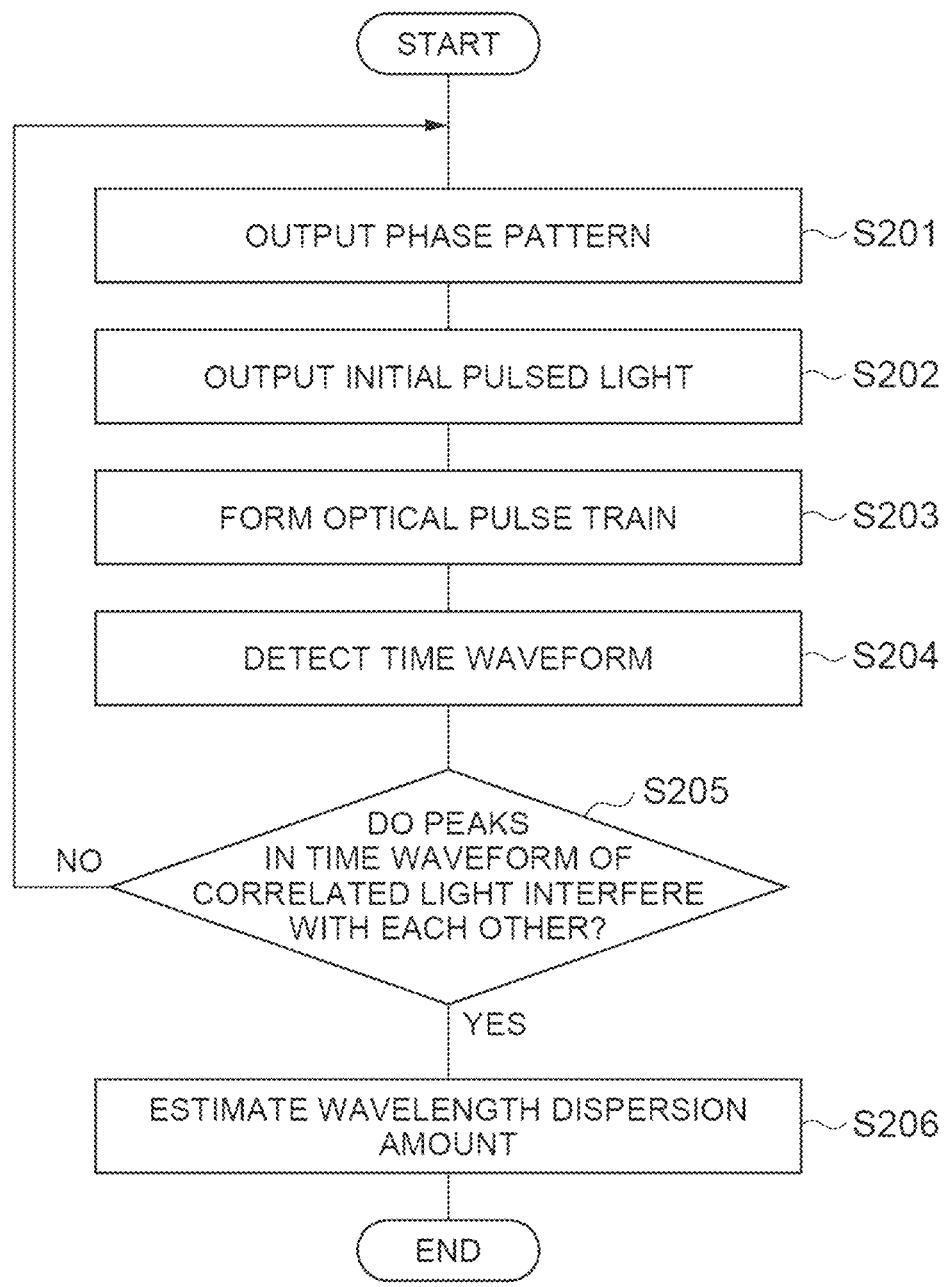

FIG. 18 is a flowchart illustrating a dispersion measuring method using the dispersion measuring device.

Figure 19:
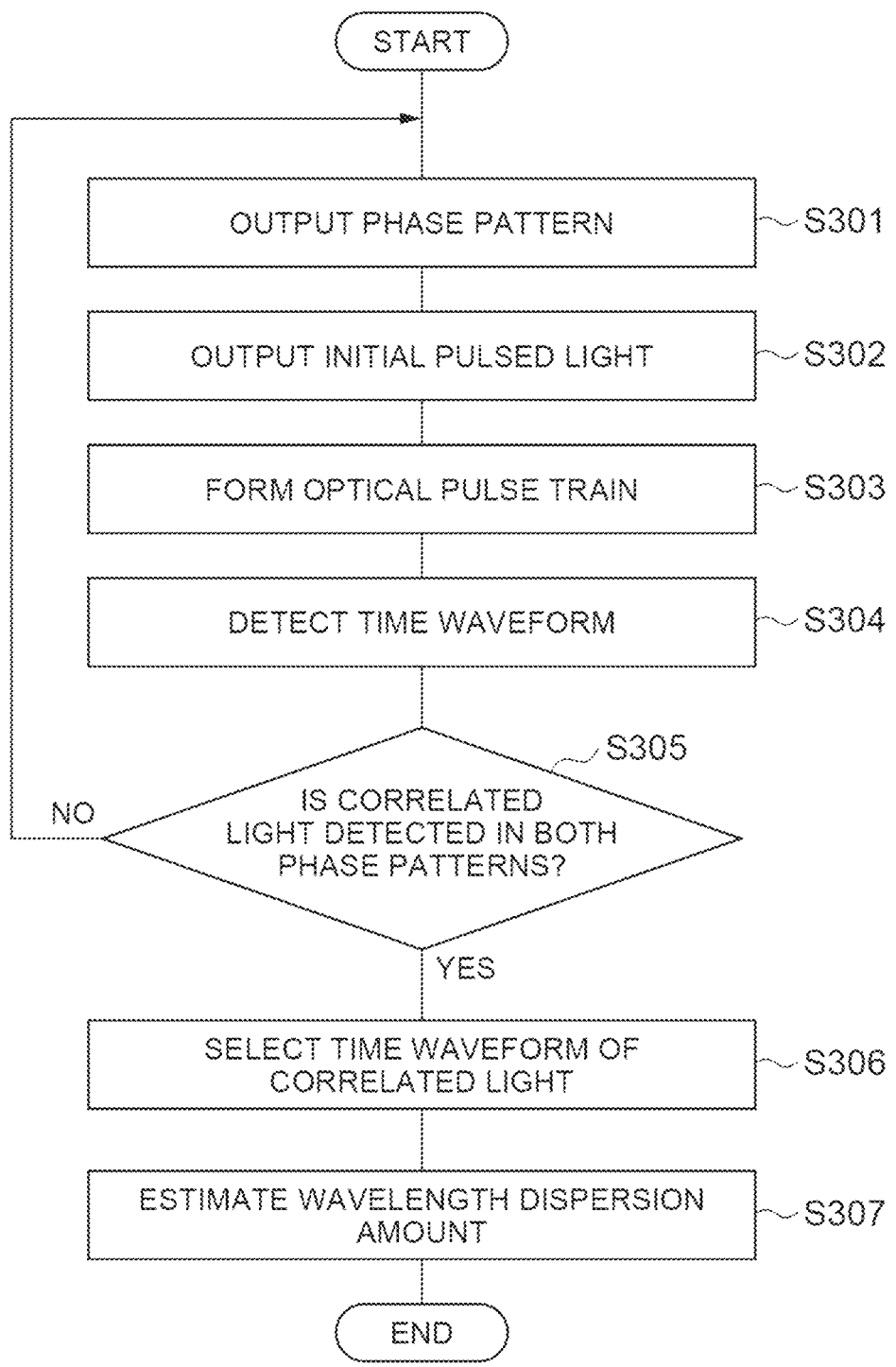

FIG. 19 is a flowchart illustrating the dispersion measuring method using the dispersion measuring device.

Figure 20:
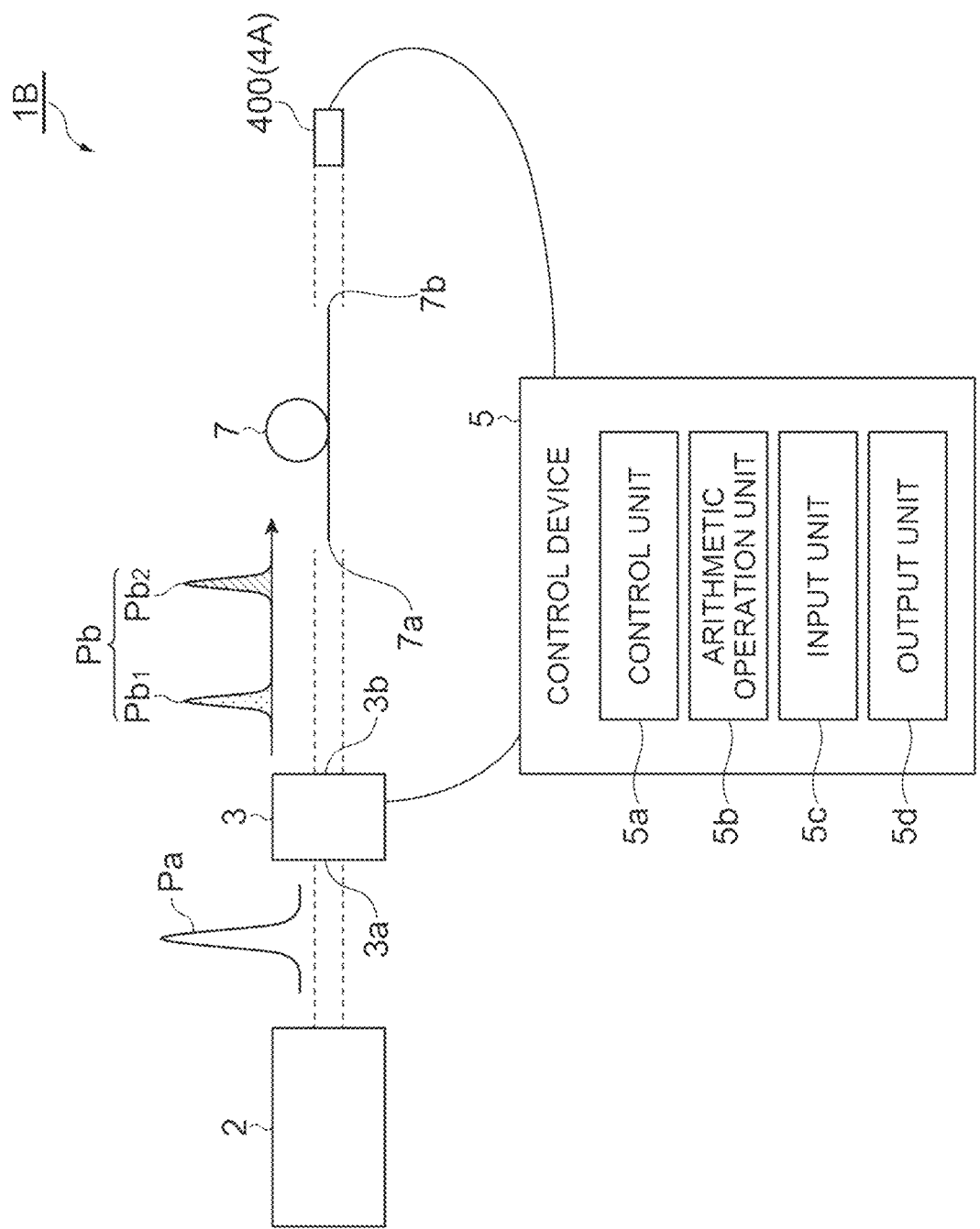

FIG. 20 is a diagram illustrating another configuration of the dispersion measuring device as a first modification.

Figure 21:
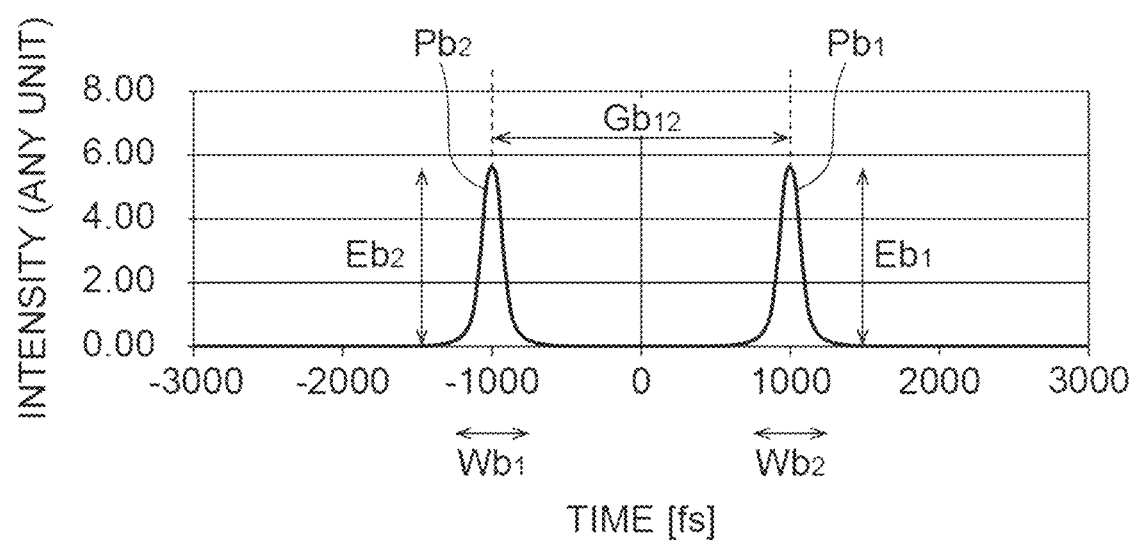

FIG. 21 is a diagram illustrating a waveform of an optical pulse train.

Figure 22:
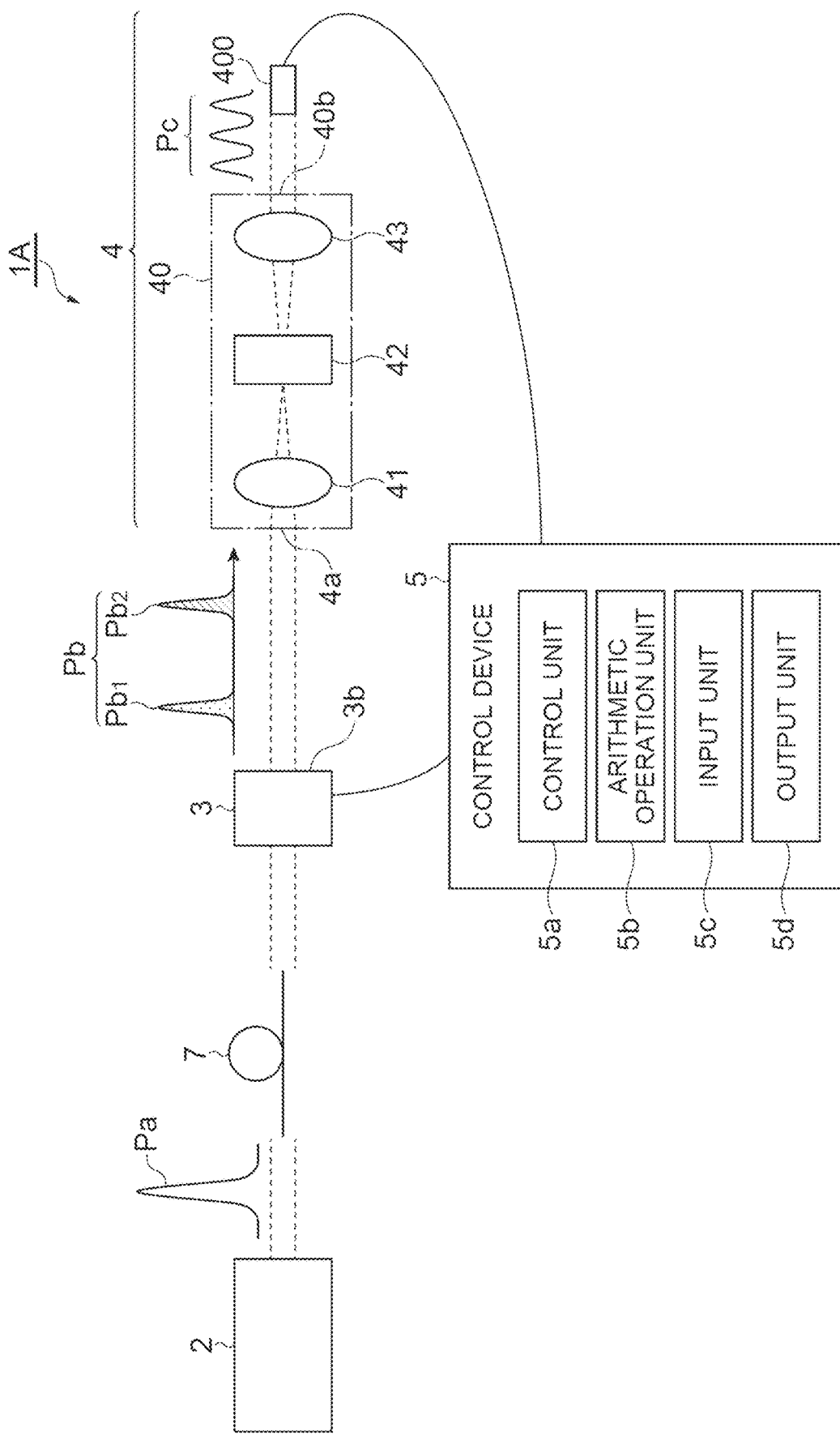

FIG. 22 is a diagram illustrating still another configuration of the dispersion measuring device as a second modification.

(a) of FIG. 23 illustrates a spectral waveform of output light from the pulse forming unit when triangular wave-shaped phase spectrum modulation is applied in the SLM. (b) of FIG. 23 illustrates a temporal intensity waveform of the output light from the pulse forming unit.

(a) of FIG. 24 illustrates a spectral waveform of output light from the pulse forming unit when triangular wave-shaped phase spectrum modulation is applied in the SLM. (b) of FIG. 24 illustrates a temporal intensity waveform of the output light from the pulse forming unit.

(a) of FIG. 25 illustrates a spectral waveform of output light from the pulse forming unit when triangular wave-shaped phase spectrum modulation is applied in the SLM. (b) of FIG. 25 illustrates a temporal intensity waveform of the output light from the pulse forming unit.

(a) of FIG. 26 illustrates a spectral waveform of output light from the pulse forming unit when triangular wave-shaped phase spectrum modulation is applied in the SLM. (b) of FIG. 26 illustrates a temporal intensity waveform of the output light from the pulse forming unit.

Figure 27:
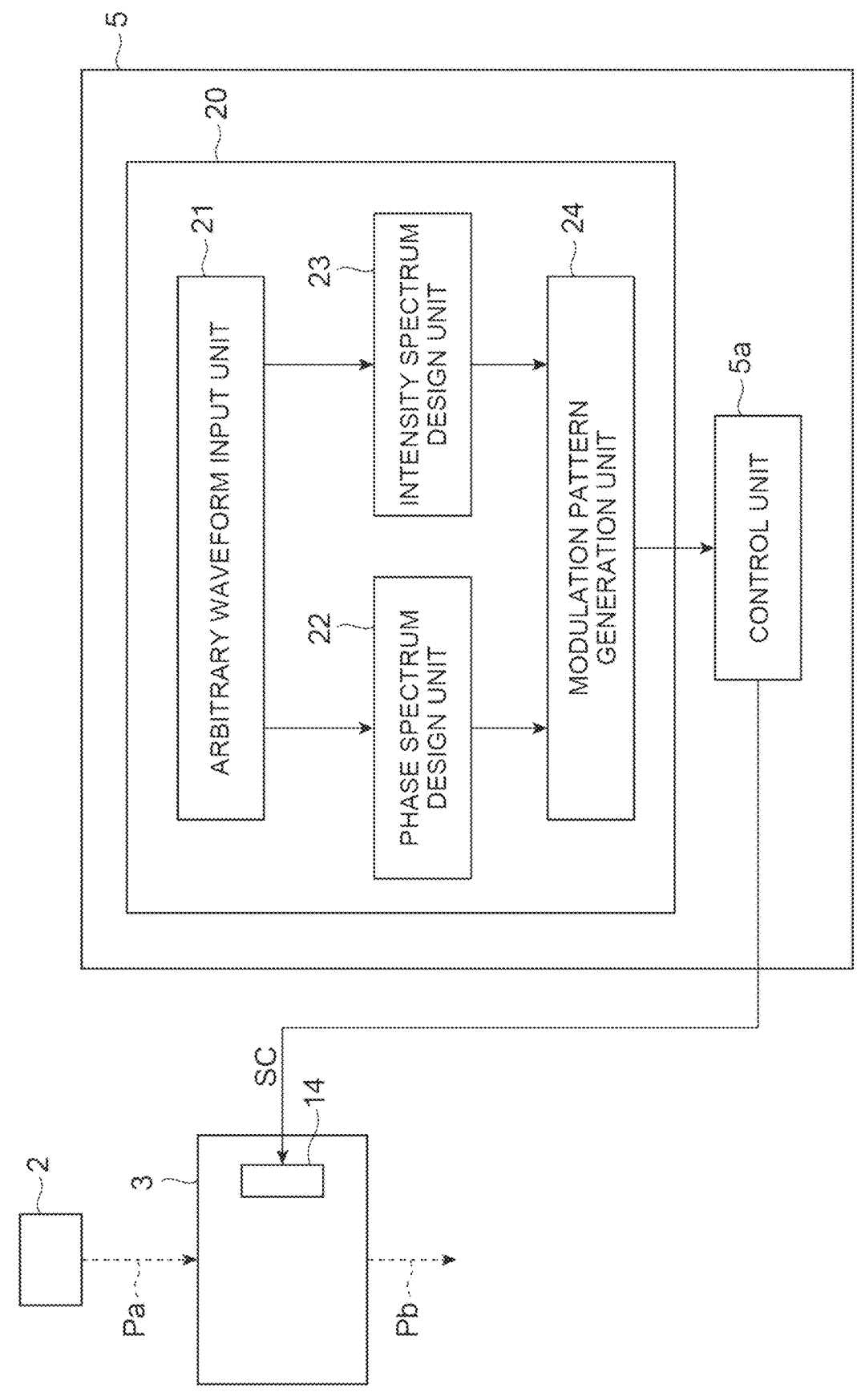

FIG. 27 is a diagram illustrating a configuration of a control device that performs an arithmetic operation of a modulation pattern of the SLM.

Figure 28:
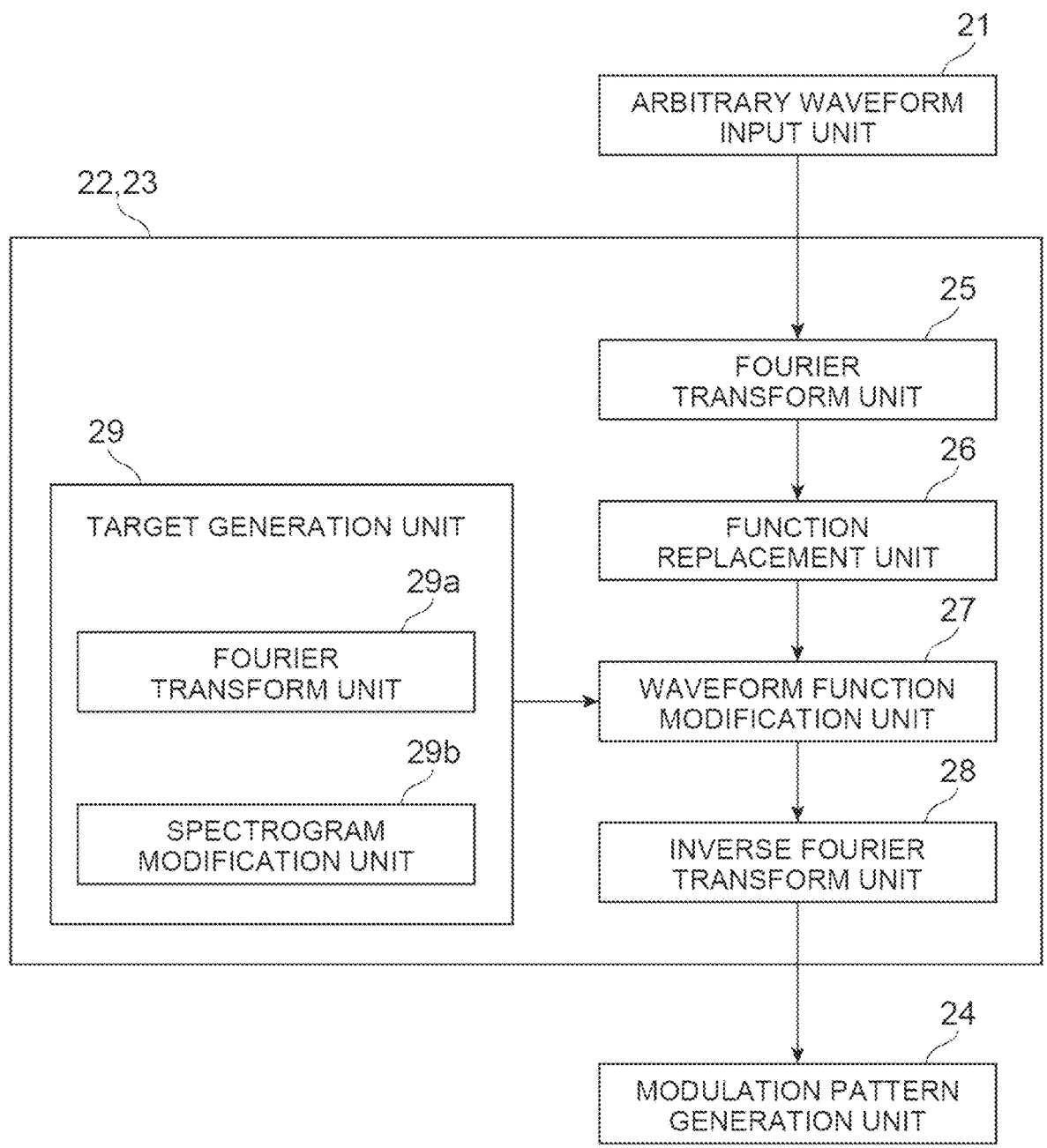

FIG. 28 is a block diagram illustrating internal configurations of a phase spectrum design unit and an intensity spectrum design unit.

Figure 29:
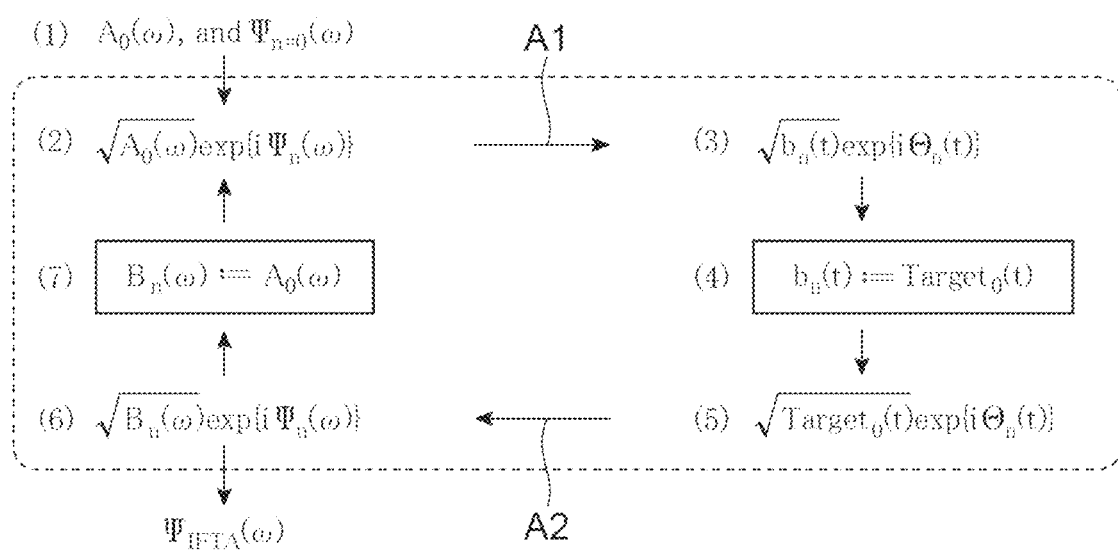

FIG. 29 is a diagram illustrating a calculation procedure of a phase spectrum by an iterative Fourier transform method.

Figure 30:
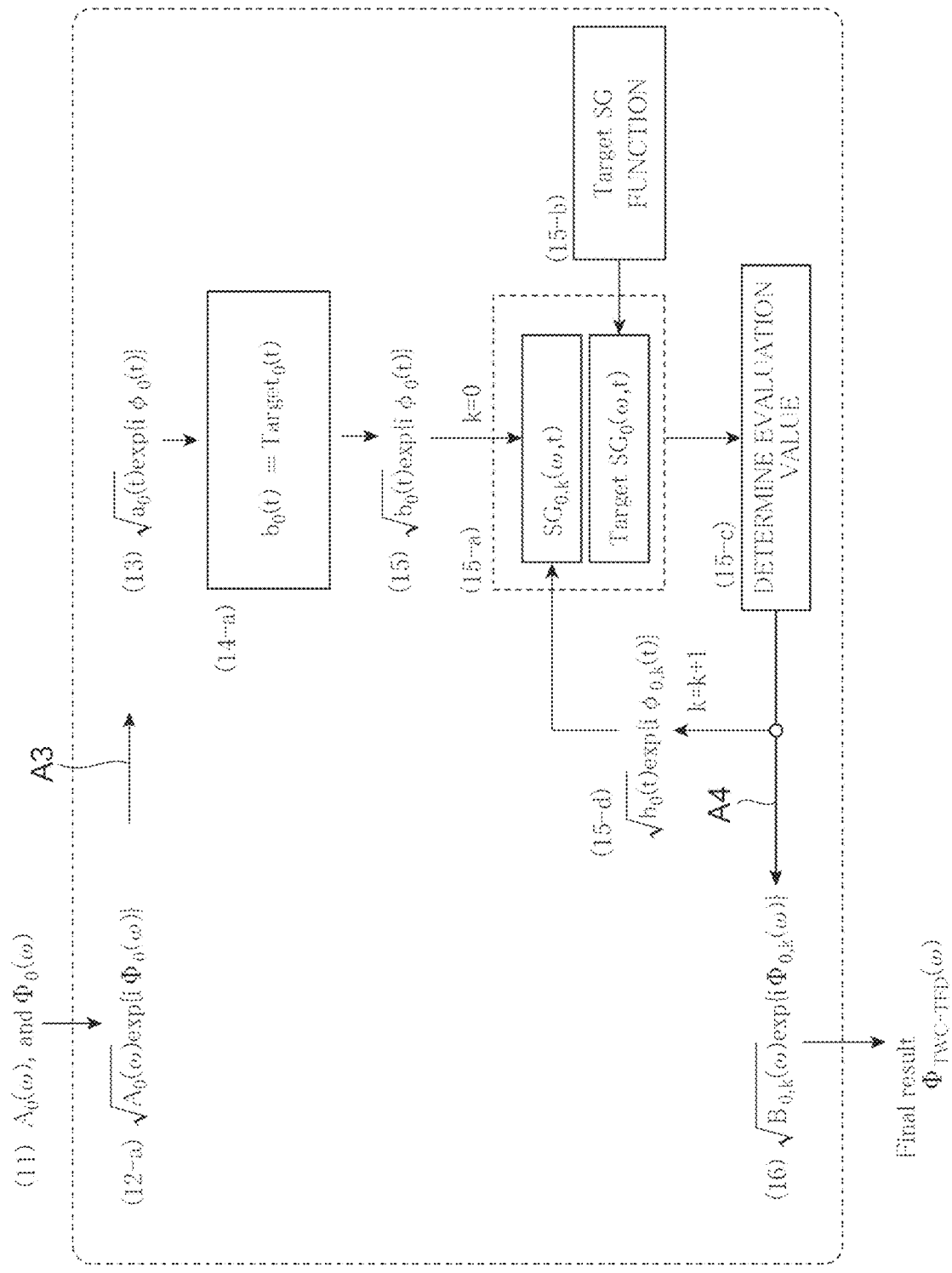

FIG. 30 is a diagram illustrating a calculation procedure of a phase spectrum function in the phase spectrum design unit.

Figure 31:
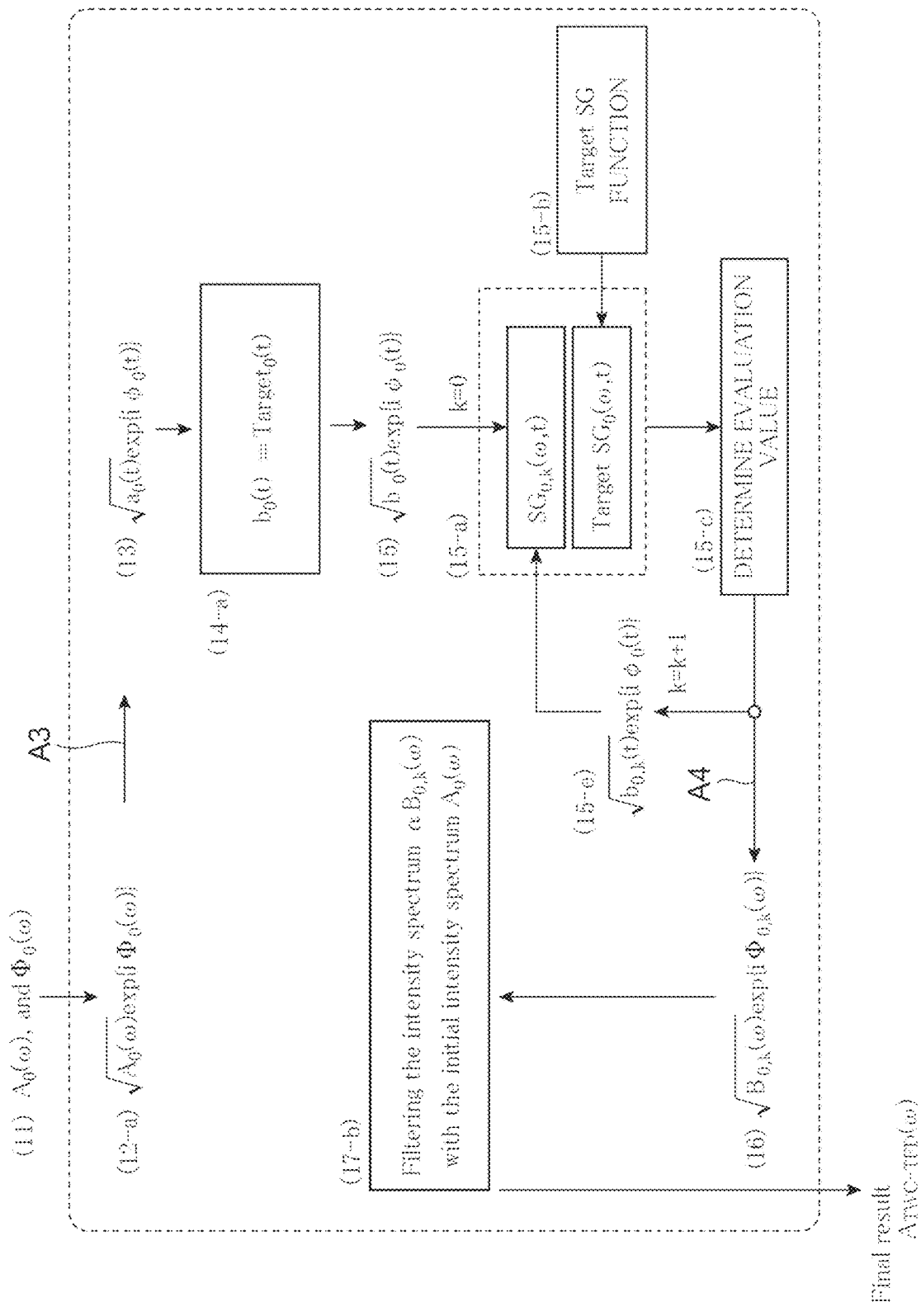

FIG. 31 is a diagram illustrating a calculation procedure of an intensity spectrum function in the intensity spectrum design unit.

Figure 32:
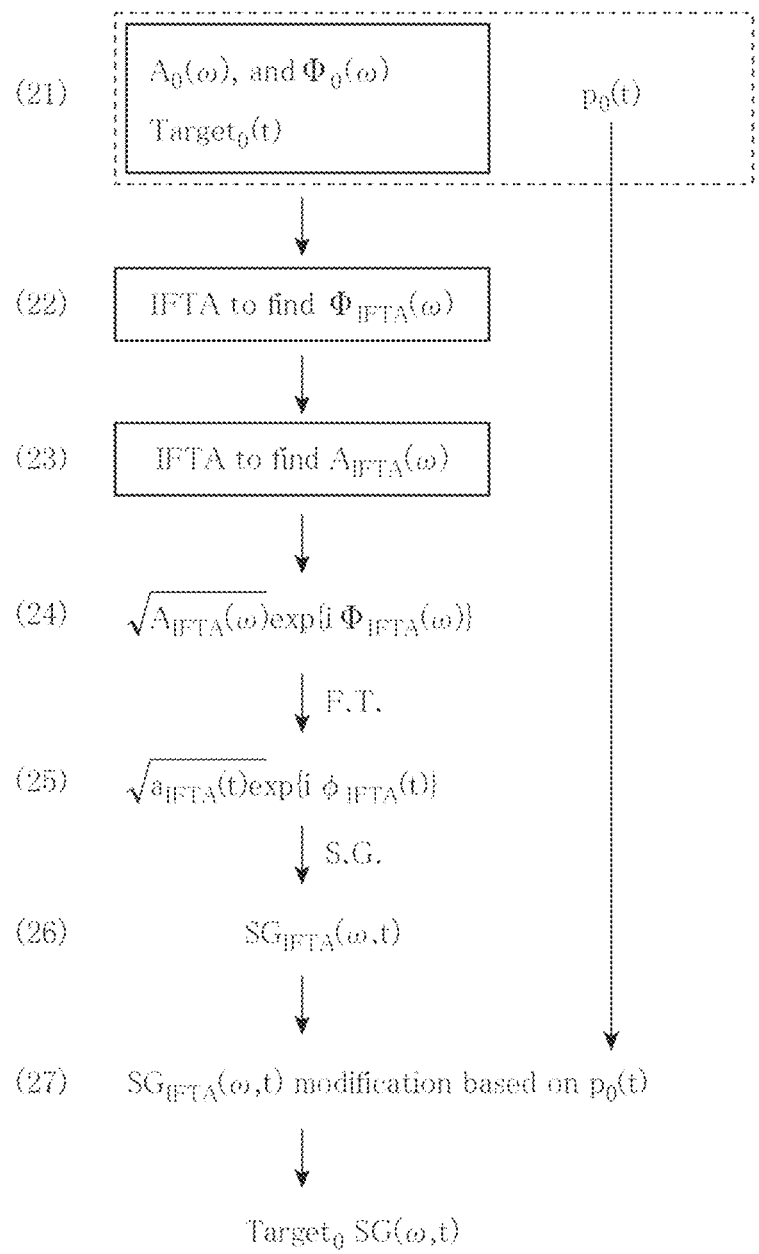

FIG. 32 is a diagram illustrating an example of a generation procedure of a target spectrogram in a target generation unit.

Figure 33:
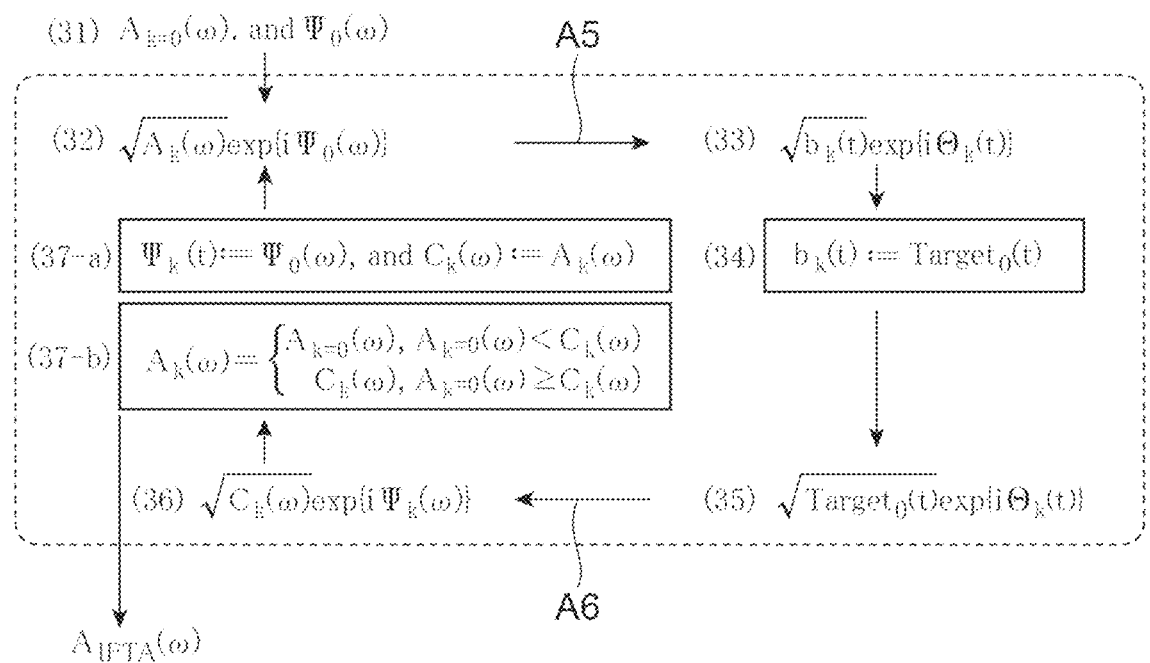

FIG. 33 is a diagram illustrating an example of a procedure of calculating the intensity spectrum function.

(a) of FIG. 34 is a diagram illustrating a spectrogram. (b) of FIG. 34 is a diagram illustrating a target spectrogram in which the spectrogram is changed.

DESCRIPTION OF EMBODIMENTS

Hereinafter, embodiments of a dispersion measuring device and a dispersion measuring method according to the present disclosure will be described in detail with reference to the accompanying drawings. The same elements are denoted by the same reference signs in description of drawings, and the repetitive descriptions are omitted.

Figure 1:
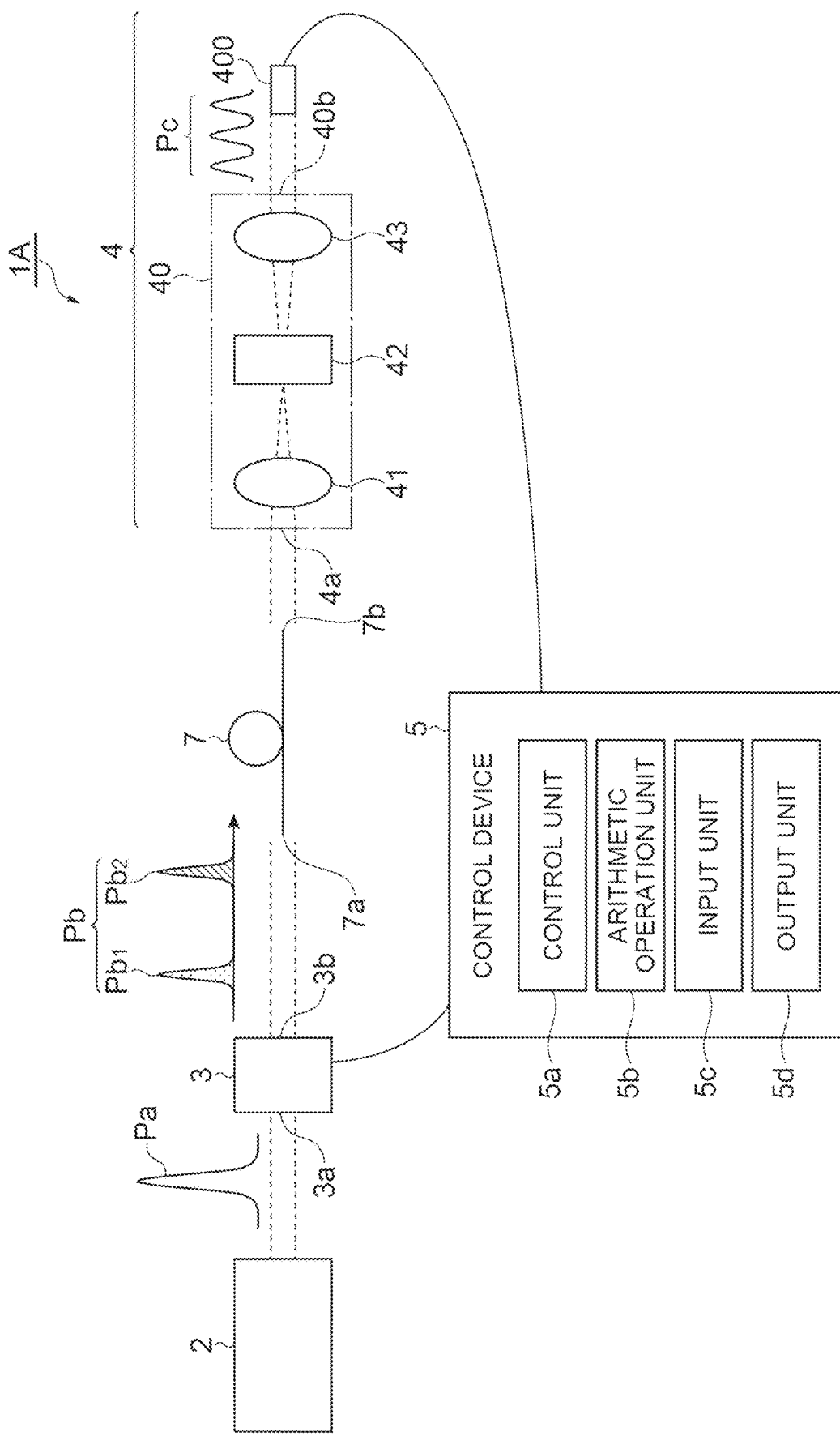
FIG. 1 is a schematic diagram illustrating a configuration of a dispersion measuring device according to an embodiment of the present disclosure.

FIG. 1 is a schematic diagram illustrating a configuration of a dispersion measuring device 1A according to an embodiment of the present disclosure. The dispersion measuring device 1A is a device that measures a wavelength dispersion amount of an optical component 7 as a measurement object. The dispersion measuring device 1A includes a pulsed laser light source 2 (light source), a pulse forming unit 3, a light detection unit 4, and a control device 5. A light input end 3a of the pulse forming unit 3 is optically coupled to the pulsed laser light source 2 spatially or via an optical waveguide such as an optical fiber. A light input end 7a of the optical component 7 is optically coupled to a light output end 3b of the pulse forming unit 3 spatially or via an optical waveguide such as an optical fiber. A light input end 4a of the light detection unit 4 is optically coupled to a light output end 7b of the optical component 7 spatially or via an optical waveguide such as an optical fiber. The control device 5 is electrically connected to the pulse forming unit 3 and the light detection unit 4. The light detection unit 4 includes a correlation optical system 40 and a detector 400. A light output end 40b of the correlation optical system 40 is optically coupled to the detector 400 spatially or via an optical waveguide such as an optical fiber. The control device 5 includes a control unit 5a, an arithmetic operation unit 5b, an input unit 5c, and an output unit 5d. The optical component 7 is, for example, an optical waveguide such as an optical fiber.

The pulsed laser light source 2 outputs a coherent initial pulsed light Pa. The pulsed laser light source 2 is, for example, a femtosecond laser, and is a solid-state laser light source such as an LD direct excitation Yb:YAG pulsed laser in an example. The temporal waveform of the initial pulsed light Pa has, for example, a Gaussian function shape. The full width at half maximum (FWHM) of the initial pulsed light Pa is, for example, in the range of 10 fs to 10,000 fs, and is 100 fs in an example. The initial pulsed light Pa is an optical pulse having a certain bandwidth and includes a plurality of continuous wavelength components. In an example, the bandwidth of the initial pulsed light Pa is 10 nm and the center wavelength of the initial pulsed light Pa is 1030 nm.

The pulse forming unit 3 is a part that forms an optical pulse train Pb including a plurality of optical pulses from initial pulsed light Pa. The optical pulse train Pb is a single pulse group generated by dividing a spectrum constituting the initial pulsed light Pa into a plurality of wavelength bands and using each wavelength band. At boundaries among the plurality of wavelength bands, the plurality of wavelength bands may overlap each other. In the following description, the optical pulse train Pb may be referred to as a "band-controlled multi-pulse".

Figure 2:
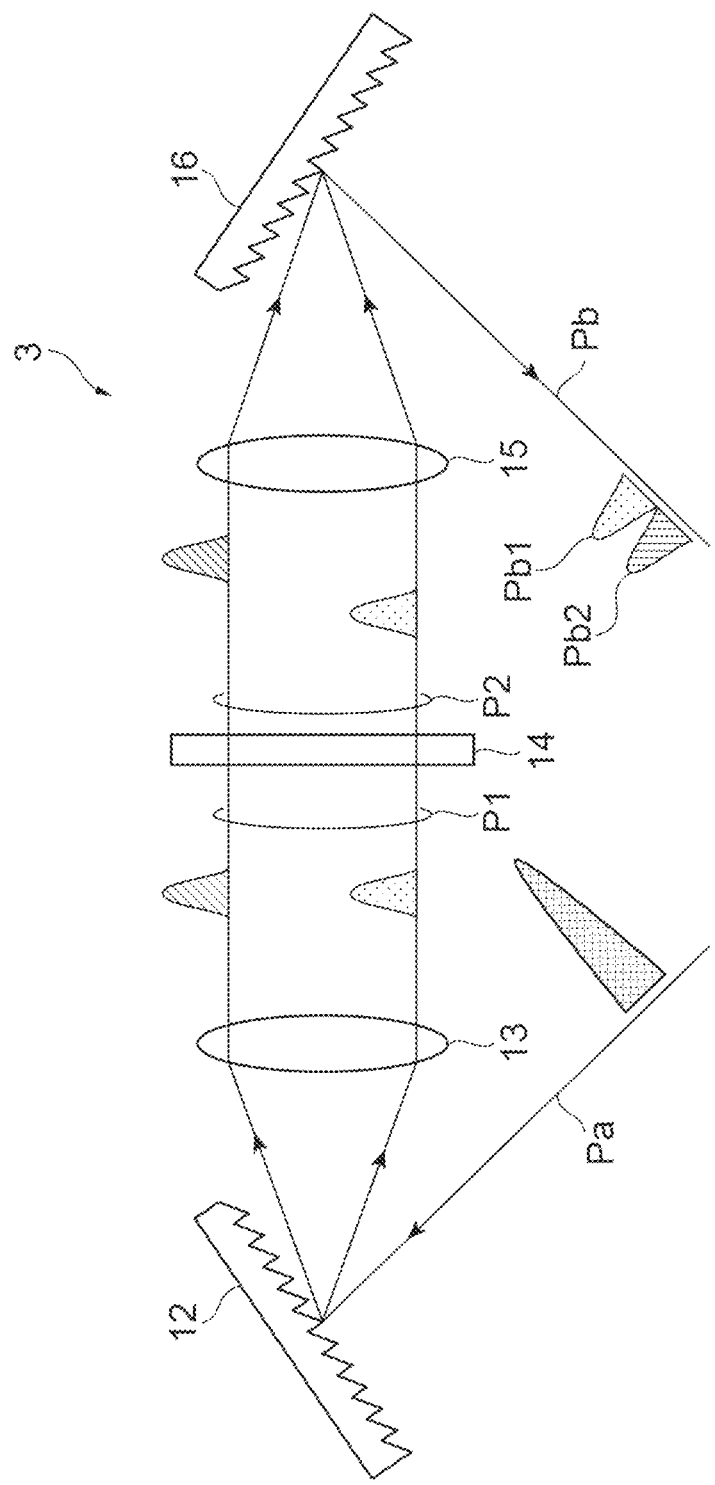
FIG. 2 is a diagram illustrating a configuration example of a pulse forming unit.

FIG. 2 is a diagram illustrating a configuration example of the pulse forming unit 3. The pulse forming unit 3 includes a diffraction grating 12, a lens 13, a spatial light modulator (SLM) 14, a lens 15, and a diffraction grating 16. The diffraction grating 12 is a spectroscopic element in the present embodiment, and is optically coupled to the pulsed laser light source 2. The SLM 14 is optically coupled to the diffraction grating 12 via the lens 13. The diffraction grating 12 spatially separates a plurality of wavelength components included in the initial pulsed light Pa from each other for each wavelength. As the spectroscopic element, another optical component such as a prism may be used instead of the diffraction grating 12. The initial pulsed light Pa obliquely enters to the diffraction grating 12 and is dispersed into a plurality of wavelength components. Light P1 including the plurality of wavelength components is focused by the lens 13 for each wavelength component, and an image is formed on the modulation surface of the SLM 14. The lens 13 may be a convex lens made of a light transmitting member or a concave mirror having a concave light reflection surface.

The SLM 14 applies a predetermined phase shift for each wavelength to the initial pulsed light Pa in order to convert the initial pulsed light Pa into the optical pulse train Pb (modulated light). Specifically, the SLM 14 receives a control signal from the control unit 5a (see FIG. 1) in order to generate the optical pulse train Pb by applying a phase shift to the initial pulsed light Pa. The SLM 14 presents a phase pattern output from the control unit 5a. The SLM 14 simultaneously performs phase modulation and intensity modulation of the light P1 by using the presented phase pattern. In this manner, the SLM 14 shifts the phases of the plurality of wavelength components output from the diffraction grating 12 from each other. The SLM 14 may perform only phase modulation or only intensity modulation. The SLM 14 is, for example, a phase modulation type. In an example, the SLM 14 is a liquid crystal on silicon (LCOS) type. Although the transmissive SLM 14 is illustrated in the drawings, the SLM 14 may be a reflective type.

Figure 3:
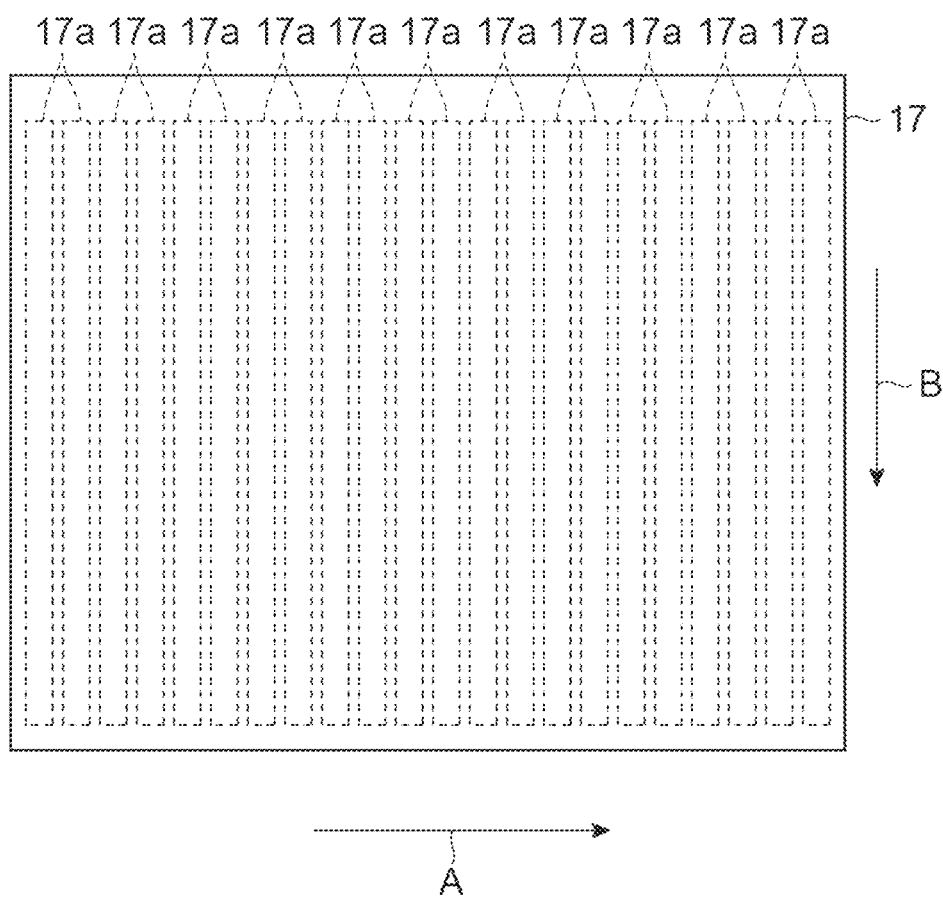
FIG. 3 is a diagram illustrating a modulation surface of an SLM.

FIG. 3 is a diagram illustrating the modulation surface 17 of the SLM 14. As illustrated in FIG. 3, on the modulation surface 17, a plurality of modulation regions 17a are arranged along a certain direction A, and each modulation region 17a extends in a direction B intersecting the direction A. The direction A is a spectral direction by the diffraction grating 12. The modulation surface 17 functions as a Fourier transform surface, and each corresponding wavelength component after being dispersed is incident on each of the plurality of modulation regions 17a. The SLM 14 modulates the phase and the intensity of each incident wavelength component independently from the other wavelength components in each modulation region 17a. Since the SLM 14 in the present embodiment is the phase modulation type, the intensity modulation is realized by the phase pattern (phase image) presented on the modulation surface 17.

Each wavelength component of the modulated light P2 modulated by the SLM 14 is focused at a point on the diffraction grating 16 by the lens 15. At this time, the lens 15 functions as a focusing optical system for focusing the modulated light P2. The lens 15 may be a convex lens made of a light transmitting member or a concave mirror having a concave light reflection surface. The diffraction grating 16 functions as a combining optical system and combines the modulated wavelength components. That is, the plurality of wavelength components of the modulated light P2 are focused and combined with each other by the lens 15 and the diffraction grating 16 to obtain a band-controlled multi-pulse (optical pulse train Pb).

The SLM 14 forms the optical pulse train Pb including optical pulses $Pb_1$ and $Pb_2$ from the initial pulsed light Pa. FIG. 4 is a diagram illustrating an example of a band-controlled multi-pulse. In this example, an optical pulse train Pb including an optical pulse $Pb_1$ (first optical pulse) and an optical pulse $Pb_2$ (second optical pulse) is illustrated. FIG. 4(a) is a spectrogram, in which the horizontal axis indicates the time and the vertical axis indicates the wavelength, and light intensity is represented by color gradation. FIG. 4(b) illustrates the temporal waveform of the optical pulse train Pb. The temporal waveform of each of the optical pulses $Pb_1$ and $Pb_2$ has, for example, a Gaussian function shape. As illustrated in FIGS. 4(a) and 4(b), peaks of the optical pulses $Pb_1$ and $Pb_2$ are temporally separated from each other, and propagation timings of the optical pulses $Pb_1$ and $Pb_2$ are shifted from each other. In other words, one optical pulse $Pb_2$ has a time delay with respect to another optical pulse $Pb_1$, and the optical pulses $Pb_1$ and $Pb_2$ have a time difference from each other. The center wavelength of the optical pulse $Pb_1$ is a first wavelength $\lambda_L$. The center wavelength of the optical pulse $Pb_2$ is a second wavelength $\lambda_S$ shorter than the first wavelength $\lambda_L$. The first wavelength $\lambda_L$ is, for example, 805 nm. The second wavelength $\lambda_S$ is, for example, 795 nm. The time interval (peak interval) between the optical pulses $Pb_1$ and $Pb_2$ is, for example, in a range of 10 fs to 10,000 fs, and is 2000 fs in an example. The FWHM of the optical pulses $Pb_1$ and $Pb_2$ is, for example, in a range of 10 fs to 5000 fs, and is 300 fs in an example.

FIG. 4(c) illustrates a spectrum obtained by combining two optical pulses $Pb_1$ and $Pb_2$. As illustrated in FIG. 4(c), the spectrum obtained by combining the two optical pulses $Pb_1$ and $Pb_2$ has a single peak. However, referring to FIG. 4(a), the center wavelengths of the two optical pulses $Pb_1$ and $Pb_2$ are shifted from each other. The single peak illustrated in FIG. 4(c) substantially corresponds to the spectrum of the initial pulsed light Pa. The peak wavelength interval between the adjacent optical pulses $Pb_1$ and $Pb_2$ is determined by the spectral bandwidth of the initial pulsed light Pa and is approximately in a range of twice the full width at half maximum. In an example, in a case where the full width at half maximum (FWHM), which is the spectral bandwidth of the initial pulsed light Pa, is 10 nm, the peak wavelength interval is 10 nm. As a specific example, in a case where the center wavelength of the initial pulsed light Pa is 800 nm, the peak wavelengths of the optical pulses $Pb_1$ and $Pb_2$ can be 805 nm and 795 nm, respectively. The temporal positions of the optical pulses $Pb_1$ and $Pb_2$ may be interchanged with each other.

FIG. 5 is a diagram illustrating an example of a multi-pulse of which a band is not controlled, as a comparative example. In this example, an optical pulse train Pd including two optical pulses $Pd_1$ and $Pd_2$ is illustrated. Similarly to FIG. 4(a), FIG. 5(a) is a spectrogram, in which the horizontal axis indicates the time and the vertical axis indicates the wavelength, and the light intensity is represented by color gradation. FIG. 5(b) illustrates the temporal waveform of the optical pulse train Pd. FIG. 5(c) illustrates a spectrum obtained by combining the two optical pulses $Pd_1$ and $Pd_2$. As illustrated in FIGS. 5(a) to 5(c), the peaks of the two optical pulses $Pd_1$ and $Pd_2$ are temporally separated from each other, but the center wavelengths of the two optical pulses $Pd_1$ and $Pd_2$ coincide with each other. The pulse forming unit 3 in the present embodiment does not generate such an optical pulse train Pd, but generates an optical pulse train Pb having different center wavelengths as illustrated in FIG. 4.

Phase modulation for generating a band-controlled multi-pulse in the SLM 14 of the pulse forming unit 3 illustrated in FIG. 2 will be described in detail. A region (spectral domain) before the lens 15 and a region (time domain) behind the diffraction grating 16 are in a Fourier transform relationship with each other. The phase modulation in the spectral domain has an influence on a temporal intensity waveform in the time domain. Therefore, the output light from the pulse forming unit 3 can have various temporal intensity waveforms different from the initial pulsed light Pa, in accordance with a modulation pattern of the SLM 14.

FIG. 6(a) illustrates a spectral waveform (spectrum phase G11 and spectrum intensity G12) of the single-pulsed initial pulsed light Pa as an example. FIG. 6(b) illustrates a temporal intensity waveform of the initial pulsed light Pa. FIG. 7(a) illustrates a spectral waveform (spectrum phase G21 and spectrum intensity G22) of the output light from the pulse forming unit 3 when upward convex triangular wave-shaped phase spectrum modulation is applied in the SLM 14, as an example. FIG. 7(b) illustrates a temporal intensity waveform of the output light. FIG. 8(a) illustrates a spectral waveform (spectrum phase G31 and spectrum intensity G32) of the output light from the pulse forming unit 3 when downward convex triangular wave-shaped phase spectrum modulation is applied in the SLM 14, as an example. FIG. 8(b) illustrates a temporal intensity waveform of the output light. In FIGS. 6(a), 7(a), and 8(a), the horizontal axis indicates the wavelength (nm), the left vertical axis indicates the intensity value (arbitrary unit) of an intensity spectrum, and the right vertical axis indicates the phase value (rad) of a phase spectrum. In FIGS. 6(b), 7(b), and 8(b), the horizontal axis indicates the time (femtosecond), and the vertical axis indicates the light intensity (arbitrary unit).

In the example illustrated in FIG. 7, the SLM 14 presents an upward convex triangular wave-shaped phase spectral waveform. In this case, the pulse forming unit 3 converts a single pulse of the initial pulsed light Pa into a double pulse including the optical pulses $Pb_1$ and $Pb_2$. Then, in the double pulse, the optical pulse $Pb_2$ is generated after the optical pulse $Pb_1$. In the example illustrated in FIG. 8, the SLM 14 presents a downward convex triangular wave-shaped phase spectral waveform. In this case, the pulse forming unit 3 converts a single pulse of the initial pulsed light Pa into a double pulse including the optical pulses $Pb_1$ and $Pb_2$. Then, in the double pulse, the optical pulse $Pb_1$ is generated after the optical pulse $Pb_2$. The spectrum and the waveform illustrated in FIGS. 7 and 8 are one example, and the order of the optical pulses $Pb_1$ and $Pb_2$ included in the output light from the pulse forming unit 3 is controlled by a combination of various phase spectra and intensity spectra.

Refer to FIG. 1 again. The control unit 5a stores a first phase pattern and a second phase pattern, and selectively outputs the first phase pattern and the second phase pattern. Specifically, the control unit 5a stores the first phase pattern and the second phase pattern in advance. The control unit 5a acquires information regarding the positiveness or negativeness of the wavelength dispersion amount of the optical component 7 from the input unit 5c (described later). In a case where the wavelength dispersion amount of the optical component 7 is negative in the acquired information, the control unit 5a outputs the first phase pattern. The output phase pattern is presented in the SLM 14. In a case where the wavelength dispersion amount of the optical component 7 is positive in the acquired information, the control unit 5a outputs the second phase pattern. The output phase pattern is presented in the SLM 14. The first phase pattern and the second phase pattern indicate a phase value, which is a value indicating the magnitude of the phase shift applied to the initial pulsed light Pa, at each wavelength.

The first phase pattern is, for example, the spectrum phase G31 illustrated in FIG. 8, and the second phase pattern is, for example, the spectrum phase G21 illustrated in FIG. 7. That is, the first phase pattern is a phase pattern for applying a predetermined phase shift for each wavelength to the initial pulsed light Pa so that the optical pulse $Pb_1$ is generated after the optical pulse $Pb_2$. The second phase pattern is a phase pattern for applying a predetermined phase shift for each wavelength to the initial pulsed light Pa so that the optical pulse $Pb_2$ is generated after the optical pulse $Pb_1$. At each wavelength, the phase value in the spectrum phase G21 has a symmetric relationship with the phase value of the spectrum phase G31 with respect to a predetermined phase value.

Here, the symmetric relationship will be specifically described. A difference between the phase value at each wavelength of the spectrum phase G21 and the predetermined phase value is compared with a difference between the phase value at each wavelength of the spectrum phase G31 and the predetermined phase value. In this case, the two differences have the same absolute value. The signs of the two differences are opposite to each other.

The point that the wavelength dispersion amount of the optical component 7 is positive means that the group delay dispersion (GDD) of the optical component 7 is positive (normal). The group velocity dispersion is a value per unit length of the group delay dispersion. Thus, the point that the wavelength dispersion amount of the optical component 7 is positive means that the group velocity dispersion of the optical component 7 is positive. The point that the wavelength dispersion amount of the optical component 7 is negative means that the group delay dispersion and the group velocity dispersion of the optical component 7 are negative(anomalous), similarly.

The correlation optical system 40 receives the optical pulse train Pb output from the pulse forming unit 3 and outputs correlated light Pc including cross-correlation or autocorrelation of the optical pulse train Pb. In the present embodiment, the correlation optical system 40 includes a lens 41, an optical element 42, and a lens 43. The lens 41 is provided on an optical path between the pulse forming unit 3 and the optical element 42, and focuses the optical pulse train Pb output from the pulse forming unit 3 on the optical element 42. The optical element 42 is, for example, a light-emitting object including one or both of a phosphor and a non-linear optical crystal that generates a second harmonic wave (SHG). Examples of the non-linear optical crystal include a KTP ($KTiOPO_4$) crystal, an LBO ($LiB_3O_5$) crystal, and a BBO ($\beta\text{-}BaB_2O_4$) crystal. Examples of the phosphor include coumarin, stilbene, and rhodamine. The optical element 42 generates correlated light Pc including cross-correlation or autocorrelation of the optical pulse train Pb by receiving an input of the optical pulse train Pb. The lens 43 collimates or focuses the correlated light Pc output from the optical element 42. The correlated light Pc is light generated to more accurately calculate the feature amount of the temporal waveform of the optical pulse train Pb. Although details will be described later, the correlation optical system 40 may not be included in the dispersion measuring device 1A.

Here, a configuration example of the correlation optical system 40 will be described in detail. FIG. 9 is a schematic diagram illustrating a correlation optical system 40A for generating correlated light Pc including autocorrelation of the optical pulse train Pb, as the configuration example of the correlation optical system 40. The correlation optical system 40A includes a beam splitter 44 as an optical branching component that branches the optical pulse train Pb into two pieces. The beam splitter 44 is optically coupled to the pulse forming unit 3 illustrated in FIG. 1, transmits a part of the optical pulse train Pb input from the pulse forming unit 3, and reflects the remaining part. The branching ratio of the beam splitter 44 is, for example, 1:1. One optical pulse train Pba branched by the beam splitter 44 reaches the lens 41 through an optical path 40c including a plurality of mirrors 45. The other optical pulse train Pbb branched by the beam splitter 44 reaches the lens 41 through an optical path 40d including a plurality of mirrors 46. The optical length of the optical path 40c is different from the optical length of the optical path 40d. Therefore, the plurality of mirrors 45 and the plurality of mirrors 46 constitute a delay optical system that applies a time difference to one optical pulse train Pba and the other optical pulse train Pbb branched by the beam splitter 44. Further, at least some of the plurality of mirrors 46 are mounted on a moving stage 47, and thus the optical length of the optical path 40d becomes variable. Therefore, in this configuration, it is possible to make the time difference between the optical pulse train Pba and the optical pulse train Pbb variable.

In this example, the optical element 42 includes a non-linear optical crystal. The lens 41 focuses each of the optical pulse trains Pba and Pbb toward the optical element 42, and causes the optical axes of the optical pulse trains Pba and Pbb to intersect each other at a predetermined angle in the optical element 42. As a result, in the optical element 42 which is a non-linear optical crystal, a second harmonic wave is generated starting from the intersection of the optical pulse trains Pba and Pbb. The second harmonic wave is the correlated light Pc and includes autocorrelation of the optical pulse train Pb. The correlated light Pc is collimated or focused by the lens 43 and then input to the detector 400.

FIG. 10 is a schematic diagram illustrating a correlation optical system 40B for generating correlated light Pc including cross-correlation of the optical pulse train Pb, as another configuration example of the correlation optical system 40. In the correlation optical system 40B, the optical pulse train Pb reaches the lens 41 through an optical path 40e, and a reference optical pulse Pr, which is a single pulse, reaches the lens 41 through an optical path 40f. The optical path 40f includes a plurality of mirrors 48 and is bent in a U shape. Further, at least some of the plurality of mirrors 48 are mounted on a moving stage 49, and thus the optical length of the optical path 40f becomes variable. Therefore, in this configuration, it is possible to make the time difference between the optical pulse train Pb and the reference optical pulse Pr (timing difference to reach the lens 41) variable.

Also in this example, the optical element 42 includes a non-linear optical crystal. The lens 41 focuses the optical pulse train Pb and the reference optical pulse Pr toward the optical element 42, and causes the optical axis of the optical pulse train Pb to intersect the optical axis of the reference optical pulse Pr at a predetermined angle in the optical element 42. As a result, in the optical element 42 which is a non-linear optical crystal, a second harmonic wave is generated starting from the intersection of the optical pulse train Pb and the reference optical pulse Pr. The second harmonic wave is the correlated light Pc and includes cross-correlation of the optical pulse train Pb. The correlated light Pc is collimated or focused by the lens 43 and then input to the detector 400.

FIG. 11 is a schematic diagram illustrating a correlation optical system 40C for generating correlated light Pc including cross-correlation of the optical pulse train Pb, as still another configuration example of the correlation optical system 40. In this example, the SLM 14 of the pulse forming unit 3 is a polarization-dependent spatial light modulator having a modulation effect in a first polarization direction. Regarding this, the deflection plane of the initial pulsed light Pa input to the pulse forming unit 3 is inclined with respect to the polarization direction in which the SLM 14 has a modulation function. The initial pulsed light Pa includes a polarization component (arrow $Dp_1$ in FIG.) in the first polarization direction and a polarization component (symbol $Dp_2$ in FIG.) in a second polarization direction perpendicular to the first polarization direction. The polarization of the initial pulsed light Pa is not limited to the above-described polarization (inclined linear polarization), and may be elliptically polarized light.

The polarization component of the initial pulsed light Pa in the first polarization direction is modulated in the SLM 14 and output from the pulse forming unit 3 as the optical pulse train Pb. The polarization component of the initial pulsed light Pa in the second polarization direction is output from the pulse forming unit 3 as it is without being modulated in the SLM 14. The unmodulated polarization component is provided to the correlation optical system 40 coaxially with the optical pulse train Pb as the reference optical pulse Pr that is a single pulse. The correlation optical system 40 generates correlated light Pc including cross-correlation of the optical pulse train Pb from the optical pulse train Pb and the reference optical pulse Pr. In this configuration example, since a delay is applied to the optical pulse train Pb in the SLM 14 and a delay time is made variable (arrow E in FIG.), it is possible to make the time difference between the optical pulse train Pb and the reference optical pulse Pr (timing difference to reach the lens 41) variable. Therefore, it is possible to suitably generate the correlated light Pc including the cross-correlation of the optical pulse train Pb in the correlation optical system 40.

As illustrated in FIGS. 9 to 11, the correlation optical system 40 is an optical system that spatially and temporally superimposes the optical pulse train Pb with the optical pulse train Pb itself or another pulse train. Specifically, by temporally sweeping one pulse train, a correlation waveform conforming to the temporal waveform shape of the optical pulse train Pb is detected. Here, in general, since the pulse is swept by spatially changing the optical path length by a driving stage or the like, the movement amount of the stage corresponds to the time delay amount of the correlation waveform. At this time, the time delay amount with respect to the stage movement amount is very small. Therefore, by adopting the correlation optical system 40, in the detector 400 (described later), the pulse shape is observed on a high time-resolved scale reaching the femtosecond order. As a result, the feature amount of the temporal waveform of the optical pulse train Pb is measured more accurately.

FIG. 12(a) illustrates the temporal waveform of the correlated light Pc in a case where the wavelength dispersion amount of the optical component 7 is zero. FIG. 12(b) illustrates the temporal waveform of the correlated light Pc in a case where the wavelength dispersion amount of the optical component 7 is not zero. In this example, peak intensities $PE_1$ to $PE_3$ of optical pulses $Pc_1$ to $Pc_3$ in FIG. 12(b) are greatly reduced as compared with those of FIG. 12(a). In addition, the full widths at half maximum $W_1$ to $W_3$ of the optical pulses $Pc_1$ to $Pc_3$ in FIG. 12(b) are significantly enlarged compared to those of FIG. 12(a). Furthermore, a peak time interval $G_{1,2}$ in FIG. 12(b) is largely longer than that in FIG. 12(a).

As described above, in a case where the wavelength dispersion of the optical component 7 is not zero, the peak intensities $PE_1$ to $PE_3$, the full widths at half maximum $W_1$ to $W_3$, and the peak time intervals $G_{1,2}$, and $G_{2,3}$, which are the feature amounts of the temporal waveform of the correlated light Pc, greatly change as compared with a case where the wavelength dispersion amount of the optical component 7 is zero. The amount of change depends on the wavelength dispersion amount of the optical component 7. Therefore, it is possible to accurately and easily know the wavelength dispersion amount of the optical component 7 by observing a change in the feature amount of the temporal waveform of the correlated light Pc or a change in the feature amount of the temporal waveform of the optical pulse train Pb that is a state before the correlated light Pc is generated. However, in the above observation, the wavelength dispersion amount of the optical component 7 may be corrected by using a known wavelength dispersion amount of the pulsed laser light source 2.

Refer to FIG. 1 again. The detector 400 is a part that receives the correlated light Pc output from the correlation optical system 40 and detects the temporal waveform of the correlated light Pc. The detector 400 is configured to include, for example, a photodetector such as a photodiode. The detector 400 detects the temporal waveform of the correlated light Pc by converting the intensity of the correlated light Pc into an electrical signal. The electric signal that is the detection result is provided to the arithmetic operation unit 5b.

The arithmetic operation unit 5b is electrically connected to the detector 400. The arithmetic operation unit 5b estimates the wavelength dispersion amount of the optical component 7 based on the feature amount of the temporal waveform provided from the detector 400. As described above, according to the knowledge of the present inventor, in a case where the correlated light Pc including the cross-correlation or the autocorrelation of the optical pulse train Pb is generated, various feature amounts (for example, pulse interval, peak intensity, pulse width, and the like) in the temporal waveform of the correlated light Pc have a significant correlation with the wavelength dispersion amount of the measurement object. Therefore, the arithmetic operation unit 5b can accurately estimate the wavelength dispersion amount of the optical component 7 as the measurement object by evaluating the feature amount of the temporal waveform of the correlated light Pc.

The optical component 7 is, for example, a light guide member such as an optical fiber or a waveguide. In the present embodiment, the optical component 7 is disposed on an optical path between the pulse forming unit 3 and the light detection unit 4.

The input unit 5c receives an input from a user of the dispersion measuring device 1A. The input unit 5c acquires information regarding the positiveness or negativeness of the wavelength dispersion amount of the optical component 7. The information regarding the positiveness or negativeness of the wavelength dispersion amount of the optical component 7 is information that the wavelength dispersion amount of the optical component 7 is positive or information that the wavelength dispersion amount of the optical component 7 is negative.

The output unit 5d outputs the estimation result of the wavelength dispersion amount obtained by the arithmetic operation unit 5b. The output unit 5d is, for example, a display device that displays the estimation result of the wavelength dispersion amount.

FIG. 13 is a schematic diagram illustrating a configuration example of hardware of the control device 5. As illustrated in FIG. 13, the control device 5 may be physically configured as a normal computer including a processor (CPU) 51, a main storage device such as a ROM 52 and a RAM 53, an input device 54 such as a keyboard, a mouse, and a touch screen, an output device 55 such as a display (including a touch screen), a communication module 56 (such as a network card) for transmitting and receiving data to and from other devices, an auxiliary storage device 57 such as a hard disk, and the like.

The processor 51 of the computer can realize the function of the arithmetic operation unit 5b by a wavelength dispersion amount calculation program. In other words, the wavelength dispersion amount calculation program causes the processor 51 of the computer to operate as the arithmetic operation unit 5b. The wavelength dispersion amount calculation program is stored in a storage device (storage medium) inside or outside the computer, for example, the auxiliary storage device 57. The storage device may be a non-transitory recording medium. Examples of the recording medium include a recording medium such as a flexible disk, a CD, and a DVD, a recording medium such as a ROM, a semiconductor memory, and a cloud server. The auxiliary storage device 57 may store the first phase pattern and the second phase pattern.

An input device 54 such as a keyboard, a mouse, and a touch screen operates as the input unit 5c. An output device 55 such as a display (including a touch screen) operates as the output unit 5d.

The auxiliary storage device 57 stores the feature amount of the temporal waveform of the correlated light Pc theoretically calculated in advance (or measured in advance) on the assumption that the wavelength dispersion amount of the optical component 7 is zero. By comparing the stored feature amount with the feature amount of the temporal waveform of the correlated light Pc detected by the detector 400, it can be seen how much the feature amount of the correlated light Pc has changed due to the wavelength dispersion amount of the optical component 7. Therefore, the arithmetic operation unit 5b can estimate the wavelength dispersion amount of the optical component 7 by comparing the feature amount stored in the auxiliary storage device 57 with the feature amount of the temporal waveform of the correlated light Pc detected by the detector 400.

FIG. 14 is a flowchart illustrating a dispersion measuring method using the dispersion measuring device 1A having the above configuration. In the dispersion measuring method, the control unit 5a stores the first phase pattern and the second phase pattern in advance. In this method, first, in an input step S101, the input unit 5c acquires information regarding the positiveness or negativeness of the wavelength dispersion amount of the optical component 7. Then, in a control step S102, the control unit 5a acquires information regarding the positiveness and negativeness of the wavelength dispersion amount of the optical component 7 from the input unit 5c, and selectively outputs the first phase pattern and the second phase pattern based on the information. Subsequently, in an output step S103, the pulsed laser light source 2 outputs initial pulsed light Pa.

Subsequently, in a pulse forming step S104, the pulse forming unit 3 forms an optical pulse train Pb. Specifically, the optical pulse train Pb is formed from the initial pulsed light Pa output from the pulsed laser light source 2. The optical pulse train Pb includes a plurality of optical pulses $Pb_1$ and $Pb_2$ having a time difference from each other and having different center wavelengths from each other. For example, the pulse forming unit 3 spatially separates a plurality of wavelength components included in the initial pulsed light Pa for each wavelength, and shifts the phases of the plurality of wavelength components from each other by using the SLM 14. Then, the pulse forming unit 3 focuses the plurality of wavelength components. Thus, it is possible to easily generate the optical pulse train Pb.

Subsequently, in a detection step S105, the temporal waveform of correlated light Pc is detected. Specifically, after the optical pulse train Pb is transmitted through the optical component 7, the correlation optical system 40 generates the correlated light Pc from the optical pulse train Pb, and the detector 400 detects the temporal waveform of the correlated light Pc. As an example, after the optical pulse train Pb is transmitted through the optical component 7, in the correlation optical system 40, the correlated light Pc including cross-correlation or autocorrelation of the optical pulse train Pb is generated by using the optical element 42 including one or both of the non-linear optical crystal and the phosphor.

For example, as illustrated in FIG. 9, the optical pulse train Pb is branched into two pieces, and one branched optical pulse train Pbb is swept with respect to the other optical pulse train Pba in time. Then, correlated light Pc including autocorrelation of the optical pulse train Pb is generated from one optical pulse train Pbb and the other optical pulse train Pba. Alternatively, for example, as illustrated in FIG. 10, the reference optical pulse Pr is swept with respect to the optical pulse train Pb in time. Then, correlated light Pc including cross-correlation of the optical pulse train Pb is generated from the reference optical pulse Pr and the optical pulse train Pb. Alternatively, for example, as illustrated in FIG. 11, the optical pulse train Pb is generated by modulating only the polarization component of the initial pulsed light Pa in the first polarization direction in the SLM 14. The polarization component of the initial pulsed light Pa in the second polarization direction is used as the reference optical pulse Pr. Then, in the SLM 14, the optical pulse train Pb is swept with respect to the reference optical pulse Pr in time. Then, correlated light Pc including cross-correlation of the optical pulse train Pb is generated from the optical pulse train Pb and the reference optical pulse Pr.

Subsequently, in an arithmetic operation step S106, the arithmetic operation unit 5b estimates the wavelength dispersion amount of the optical component 7 based on the feature amount of the temporal waveform of the correlated light Pc. Specifically, first, the arithmetic operation unit 5b acquires the feature amount of the temporal waveform of the correlated light Pc theoretically calculated in advance (or measured in advance) on the assumption that the wavelength dispersion of the optical component 7 is zero. Then, the arithmetic operation unit 5b acquires at least one feature amount selected from the group consisting of peak intensities $E_1$ to $E_3$, the full widths at half maximum $W_1$ to $W_3$, and the peak time intervals $G_{1,2}$, and $G_{2,3}$, peak intensities $E_1$ to $E_3$, the full widths at half maximum $W_1$ to $W_3$, and the peak time intervals $G_{1,2}$, and $G_{2,3}$ being the feature amount of the temporal waveform of the correlated light Pc detected in the detection step S105. Subsequently, the arithmetic operation unit 5b estimates the wavelength dispersion amount of the optical component 7 by comparing the acquired feature amounts of the two temporal waveforms.

Effects obtained by the dispersion measuring device 1A and the dispersion measuring method in the present embodiment described above will be described.

When the wavelength dispersion amount of the optical component 7 is measured, the optical pulse train Pb is transmitted through a measurement object in which the wavelength dispersion amount is not zero. At this time, the optical pulses $Pb_1$ and $Pb_2$ are shifted from each other by different times, and the time difference between the optical pulses $Pb_1$ and $Pb_2$ changes. Here, in a case where the optical pulses $Pb_1$ and $Pb_2$ are shifted to approach each other and at least some of the optical pulse $Pb_1$ and the optical pulse $Pb_2$ interfere with each other, there is a concern that it is not possible to accurately measure the wavelength dispersion amount of the optical component 7.

Now, it is assumed that a long-wavelength optical pulse is transmitted through the optical component 7 before a short-wavelength optical pulse. FIG. 15 illustrates a temporal waveform Pf as an example of the temporal waveform of the correlated light Pc in a case where the wavelength dispersion of the optical component 7 is zero, and a temporal waveform Pg as an example of the temporal waveform of the correlated light in a case where the wavelength dispersion of the optical component 7 is negative. In FIG. 15, the vertical axis indicates the intensity, and the horizontal axis indicates the time. In a case where the wavelength dispersion of the optical component 7 is negative, the temporal relative positions of the two optical pulses are shifted in a direction of approaching each other due to the influence of the wavelength dispersion of the optical component 7, as compared with a case where the wavelength dispersion of the optical component 7 is zero. As a result, as illustrated in FIG. 15, a plurality of peaks included in the temporal waveform Pg may approach and interfere with each other from the respective positions in the temporal waveform Pf. In this case, since the temporal waveform Pg is distorted, it is not possible to accurately obtain the feature amount and it is not possible to accurately measure the wavelength dispersion amount of the optical component 7.

FIG. 16 illustrates the temporal waveform Pg illustrated in FIG. 15 and a temporal waveform Ph as an example of a temporal waveform of correlated light in a case where an optical pulse having a short wavelength is transmitted through the optical component 7 before an optical pulse having a long wavelength. In FIG. 16, the vertical axis indicates the intensity, and the horizontal axis indicates the time. In a case where the wavelength dispersion of the optical component 7 is negative, when the optical pulse having a short wavelength is transmitted through the optical component 7 before the optical pulse having a long wavelength, the temporal relative positions of the two optical pulses are shifted away from each other due to the influence of the wavelength dispersion of the optical component 7, as compared with a case where the wavelength dispersion of the optical component 7 is zero. As a result, as illustrated in FIG. 16, a plurality of peaks included in the temporal waveform Ph are separated from each other and do not interfere with each other.

FIGS. 17(a) to 17(d) illustrate the positiveness and negativeness of the wavelength dispersion amount of the optical component 7, the temporal positional relationship between the optical pulse $Pb_1$ and the optical pulse $Pb_2$ in the optical pulse train Pb before being transmitted through the optical component 7, and a shift direction of the optical pulse $Pb_1$ and the optical pulse $Pb_2$ in the optical pulse train Pb after being transmitted through the optical component 7. In the example illustrated in FIG. 17(a), the optical pulse $Pb_2$ having a center wavelength shorter than that of the optical pulse $Pb_1$ is output before the optical pulse $Pb_1$. Since the wavelength dispersion amount of the optical component 7 is negative, the time difference between the optical pulse $Pb_1$ and the optical pulse $Pb_2$ is widened when the optical pulse train Pb is transmitted through the optical component 7. In the example illustrated in FIG. 17(b), the optical pulse $Pb_1$ is output before the optical pulse $Pb_2$. In this case, since the wavelength dispersion of the optical component 7 is negative, the time difference between the optical pulse $Pb_1$ and the optical pulse $Pb_2$ is narrowed when the optical pulse train Pb is transmitted through the optical component 7.

In the example illustrated in FIG. 17(c), similarly to FIG. 17(a), the optical pulse $Pb_2$ is output before the optical pulse $Pb_1$. In FIG. 17(c), since the wavelength dispersion amount of the optical component 7 is positive, the time difference between the optical pulse $Pb_1$ and the optical pulse $Pb_2$ is narrowed when the optical pulse train Pb is transmitted through the optical component 7. In the example illustrated in FIG. 17(d), the optical pulse Pb is output before the optical pulse $Pb_2$. In this case, since the wavelength dispersion of the optical component 7 is positive, the time difference between the optical pulse $Pb_1$ and the optical pulse $Pb_2$ is widened when the optical pulse train Pb is transmitted through the optical component 7. In the present disclosure, it is assumed that the absolute value of the group delay dispersion of the optical component 7 is sufficiently large. Therefore, in a wavelength band for forming the optical pulse $Pb_1$ and a wavelength band for forming the optical pulse $Pb_2$, the group delay dispersion of the optical component 7 is positive in all wavelength bands or negative in all wavelength bands.

In the dispersion measuring device 1A and the dispersion measuring method in the present embodiment, the first phase pattern and the second phase pattern are selectively output in the control unit 5a (control step S102). Then, the output phase pattern is presented in the SLM 14 of the pulse forming unit 3 (pulse forming step S104). Then, in the pulse forming unit 3, the optical pulse train Pb including the optical pulse $Pb_1$ and the optical pulse $Pb_2$ having a center wavelength shorter than that of the optical pulse $Pb_1$ is formed. When the control unit 5a outputs the first phase pattern, the optical pulse $Pb_1$ is generated after the optical pulse $Pb_2$ in the pulse forming unit 3. When the control unit 5a outputs the second phase pattern, the optical pulse $Pb_2$ is generated after the optical pulse $Pb_1$ in the pulse forming unit 3. As illustrated in FIG. 17(a), when the wavelength dispersion amount of the optical component 7 is negative, if the optical pulse $Pb_2$ is output before the optical pulse $Pb_1$, the time difference between the optical pulse $Pb_1$ and the optical pulse $Pb_2$ is widened when the optical pulse train Pb is transmitted through the optical component 7. As a result, as illustrated in the temporal waveform Ph of FIG. 16, the time difference between the plurality of optical pulses included in the correlated light Pc is widened. As illustrated in FIG. 17(d), when the wavelength dispersion amount of the optical component 7 is positive, if the optical pulse $Pb_1$ is output before the optical pulse $Pb_2$, the time difference between the optical pulse $Pb_1$ and the optical pulse $Pb_2$ is widened when the optical pulse train Pb is transmitted through the optical component 7. As a result, similarly to the temporal waveform Ph of FIG. 16, the time difference between the plurality of optical pulses included in the correlated light Pc is widened. Thus, even in a case where the wavelength dispersion amount of the optical component 7 is either positive or negative, it is possible to widen the time difference between the optical pulse Pb and the optical pulse $Pb_2$ when the optical pulse train Pb is transmitted through the optical component 7. Therefore, it is possible to widen the time difference between the plurality of optical pulses included in the correlated light Pc. As a result, it is possible to suppress interference of the plurality of optical pulses included in the correlated light Pc with each other. From the above, it is possible to accurately measure the wavelength dispersion amount of the optical component 7.

In the present embodiment, interference of the optical pulses with each other may mean that the temporal positions of the plurality of optical pulses change to approach each other, and at least some of the optical pulses overlap each other. Interference of the optical pulses with each other may mean that the temporal waveform of the correlated light Pc is distorted due to overlapping or the like, or that the feature amount (such as the half width or the peak value) of the plurality of optical pulses changes. An example of the temporal waveform of the correlated light Pc in a case where the optical pulses interfere with each other is a temporal waveform Pg illustrated in FIGS. 15 and 16. An example of the temporal waveform of the correlated light Pc in a case where the optical pulses do not interfere with each other is the temporal waveform Ph illustrated in FIG. 16.

As in the present embodiment, the control unit 5a may output the first phase pattern in a case where the wavelength dispersion amount of the optical component 7 is negative, and may output the second phase pattern in a case where the wavelength dispersion amount of the optical component 7 is positive. According to this device, as illustrated in FIGS. 17(a) and 17(d), when the optical pulse train Pb is transmitted through the measurement object, the optical pulse $Pb_1$ and the optical pulse $Pb_2$ are shifted in a direction in which the time difference between the optical pulse $Pb_1$ and the optical pulse $Pb_2$ is widened. Therefore, since the plurality of optical pulses are shifted in the direction in which the time difference between the plurality of optical pulses included in the correlated light Pc is widened, interference of the plurality of optical pulses with each other is suppressed. Therefore, it is possible to accurately measure the wavelength dispersion amount of the measurement object.

As in the present embodiment, the light detection unit 4 may include the correlation optical system 40 that receives the optical pulse train Pb and outputs the correlated light Pc including cross-correlation or autocorrelation of the optical pulse train Pb, and may detect the temporal waveform of the correlated light Pc. Then, the control unit 5a may estimate the wavelength dispersion amount of the optical component 7 based on the feature amount of the temporal waveform of the correlated light Pc. Similarly, in the detection step S105, the correlated light Pc including cross-correlation or autocorrelation of the optical pulse train Pb may be generated, and the temporal waveform of the correlated light Pc may be detected. Then, in an arithmetic operation step S106, the wavelength dispersion amount of the optical component 7 may be estimated based on the feature amount of the temporal waveform of the correlated light Pc. As a result, since the feature amount of the temporal waveform is measured more accurately, it is possible to more accurately measure the wavelength dispersion amount of the optical component 7.

As in the present embodiment, the first phase pattern and the second phase pattern may indicate a phase value, which is a value indicating the magnitude of the phase shift applied to the initial pulsed light Pa, at each wavelength. At each wavelength, the phase value in the first phase pattern may have a symmetrical relationship with the phase value in the second phase pattern with respect to a predetermined phase value. Thus, it is possible to simplify the design of the phase pattern and the like, and thus the design of the dispersion measuring device 1A becomes easy.

As in the present embodiment, the optical component 7 may be disposed on the optical path between the pulse forming unit 3 and the light detection unit 4. According to the present embodiment, for example, as described above, it is possible to dispose the optical component 7 as the measurement object at any position on the optical path. Therefore, since the degree of freedom in spatial design of the device is high, it is possible to reduce the size of the device and to design the device for improving convenience such as ease of mounting and removal of the optical component 7.

Second Embodiment

In a second embodiment, the control unit 5a stores the first phase pattern and the second phase pattern, and outputs one of the first phase pattern and the second phase pattern. Then, in a case where it is determined that the optical pulses interfere with each other in the temporal waveform of the correlated light Pc detected by the light detection unit 4, the control unit 5a outputs the other phase pattern. Specifically, first, the control unit 5a stores the first phase pattern and the second phase pattern in advance. Then, the control unit 5a outputs one of the first phase pattern and the second phase pattern. Subsequently, the correlated light Pc is detected by the light detection unit 4. In a case where the control unit 5a determines that the optical pulses do not interfere with each other in the correlated light Pc, the arithmetic operation unit 5b estimates the wavelength dispersion amount of the optical component 7 from the temporal waveform of the correlated light Pc. In a case where the control unit 5a determines that the optical pulses interfere with each other in the correlated light Pc, the control unit 5a outputs the other phase pattern of the first phase pattern and the second phase pattern. Then, the light detection unit 4 detects the correlated light Pc, and the arithmetic operation unit 5b estimates the wavelength dispersion amount of the optical component 7 from the temporal waveform of the correlated light Pc.

FIG. 18 is a flowchart illustrating a dispersion measuring method according to the second embodiment. In this method, first, in a control step S201, the control unit 5a outputs one of the first phase pattern and the second phase pattern. Then, in an output step S202, the pulsed laser light source 2 outputs initial pulsed light Pa. Subsequently, in a pulse forming step S203, the pulse forming unit 3 forms an optical pulse train Pb similarly to the pulse forming step S104. Subsequently, in a detection step S204, the light detection unit 4 detects the temporal waveform of correlated light Pc. Subsequently, in a determination step S205, the control unit 5a determines whether or not the optical pulses included in the temporal waveform of the correlated light Pc interfere with each other. In a case where the optical pulses included in the temporal waveform of the correlated light Pc interfere with each other (determination step S205: NO), the process returns to the control step S201. Then, the other phase pattern is output in control step S201. In a case where the optical pulses included in the temporal waveform of the correlated light Pc do not interfere with each other (determination step S205: YES), in an arithmetic operation step S206, the arithmetic operation unit 5b estimates the wavelength dispersion amount of the optical component 7 based on the feature amount of the temporal waveform of the correlated light Pc similarly to the arithmetic operation step S106.

Effects obtained by the dispersion measuring device and the dispersion measuring method in the second embodiment will be described. In the dispersion measuring device and the dispersion measuring method in the second embodiment, first, one of the phase patterns is output, and the temporal waveform of the correlated light Pc is detected. Then, in a case where it is determined that the optical pulses do not interfere with each other in the detected temporal waveform, the wavelength dispersion amount of the optical component 7 is estimated from the feature amount of the temporal waveform. In a case where it is determined that the optical pulses interfere with each other in the detected temporal waveform, the other phase pattern is output. Then, the temporal waveform of the correlated light Pc is detected, and the wavelength dispersion amount of the optical component 7 is estimated from the feature amount of the temporal waveform. Therefore, even in a case where the wavelength dispersion amount of the measurement object is either positive or negative, the wavelength dispersion amount of the optical component 7 is estimated from the feature amount of the temporal waveform of the correlated light Pc in which the optical pulses do not interfere with each other. Thus, it is possible to accurately measure the wavelength dispersion amount of the optical component 7.

Third Embodiment

In a third embodiment, the control unit 5a outputs the first phase pattern, and the light detection unit 4 detects the temporal waveform of the correlated light Pc. Furthermore, the control unit 5a outputs the second phase pattern, and the light detection unit 4 detects the temporal waveform of the correlated light Pc. Then, the arithmetic operation unit 5b estimates the wavelength dispersion amount of the optical component 7 based on the temporal waveform having a larger time difference between the optical pulses among the two temporal waveforms detected by the light detection unit 4. Specifically, first, the control unit 5a stores the first phase pattern and the second phase pattern in advance. Then, the control unit 5a outputs the first phase pattern. Subsequently, the light detection unit 4 detects the temporal waveform of the correlated light Pc. Subsequently, the control unit 5a outputs the second phase pattern. Subsequently, the light detection unit 4 detects the temporal waveform of the correlated light Pc. Finally, amount of the optical component 7 from the temporal waveform having a larger time difference between the optical pulses among the two detected temporal waveforms. In the control unit 5a, the order of outputting the two phase patterns may be opposite to the above description.

FIG. 19 is a flowchart illustrating a dispersion measuring method using a dispersion measuring device according to the third embodiment. In this method, first, in a control step S301, the control unit 5a outputs one of the first phase pattern or the second phase pattern. Then, in an output step S302, the pulsed laser light source 2 outputs initial pulsed light Pa. Subsequently, in a pulse forming step S303, the pulse forming unit 3 forms an optical pulse train Pb in a similar manner to the pulse forming step S104. Subsequently, in a detection step S304, the light detection unit 4 detects the temporal waveform of correlated light Pc. Subsequently, in a determination step S305, the control unit 5a determines whether or not both the first and second phase patterns have been output. At this stage, since the control unit 5a outputs only one of the first and second phase patterns (determination step S305: NO), the process returns to the control step S301, and the other phase pattern is output in the control step S301. Then, the output step S302, the pulse forming step S303, and the detection step S304 are performed again. In this manner, after the control unit 5a have output both the first and second phase patterns (determination step S305: YES), in a selection step S306, the arithmetic operation unit 5b selects a temporal waveform having a large time difference between the optical pulses among two temporal waveforms corresponding to the first and second phase patterns. Finally, in an arithmetic operation step S307, amount of the optical component 7 based on the feature amount of the temporal waveform selected in the selection step S306 in a similar manner to the arithmetic operation step S106.

Effects obtained by the dispersion measuring device and the dispersion measuring method in the third embodiment will be described. In the dispersion measuring device and the dispersion measuring method according to the third embodiment, the arithmetic operation unit 5b estimates the wavelength dispersion amount of the optical component 7 based on the temporal waveform having a larger time difference between optical pulses among the temporal waveform of the correlated light Pc detected by the light detection unit 4 in a case where the first phase pattern is output by the control unit 5a and the temporal waveform of the correlated light Pc detected by the light detection unit 4 in a case where the second phase pattern is output by the control unit 5a. According to this device, the wavelength dispersion amount of the optical component 7 is estimated based on the temporal waveform in which the time difference between the plurality of optical pulses included in the correlated light Pc is wide and the optical pulses do not interfere with each other. Therefore, it is possible to accurately measure the wavelength dispersion amount of the optical component 7.

First Modification

According to findings of the present inventor, various feature amounts (for example, a pulse interval, peak intensities, pulse widths, and the like of the optical pulses $Pb_1$ and $Pb_2$) in the temporal waveform of the optical pulse train Pb also have a significant correlation with the wavelength dispersion amount of the optical component 7. Thus, it is possible to estimate the wavelength dispersion amount of the optical component 7 even by evaluating the temporal waveform of the optical pulse train Pb instead of the correlated light Pc.

FIG. 20 is a diagram illustrating a configuration of a first modification of each of the above embodiments (first to third embodiments). A dispersion measuring device 1B in the present modification includes a light detection unit 4A instead of the light detection unit 4 in each of the above embodiments. The light detection unit 4A includes the detector 400, but does not include the correlation optical system 40 in each of the above embodiments. Currently, a detector capable of directly detecting the temporal waveform of an optical pulse having a time width on the order of nanoseconds already exists. Thus, by using such a detector, the light detection unit 4A can accurately detect the temporal waveform of the optical pulse train Pb without including the correlation optical system 40. However, in a case where the response speed of the detector 400 is not sufficient, for example, a case where the time width of the optical pulse train Pb is on the order of femtoseconds, the correlation optical system 40 may be used as in each of the above embodiments.

In the present modification, since the light detection unit 4A does not include the correlation optical system 40, the light detection unit 4A (detection steps S105, S204, S304) detects the temporal waveform of the optical pulse train Pb instead of the correlated light Pc. Specifically, the detector 400 receives the optical pulse train Pb transmitted through the optical component 7, and detects a temporal waveform of the optical pulse train Pb. The detector 400 detects the temporal waveform of the optical pulse train Pb by converting the intensity of the optical pulse train Pb into an electrical signal. The electric signal is provided to the arithmetic operation unit 5b.

In the present modification, the arithmetic operation unit 5b estimates the wavelength dispersion amount of the optical component 7 from the temporal waveform of the optical pulse train Pb in any one of the arithmetic operation steps S106, S206, and S307. Specifically, the arithmetic operation unit 5b first acquires a feature amount of the temporal waveform of the optical pulse train Pb theoretically calculated in advance (or measured in advance) assuming that the wavelength dispersion amount of the optical component 7 is zero. This feature amount may be stored in advance in the auxiliary storage device 57 (see FIG. 13). The arithmetic operation unit 5b acquires the feature amount of the temporal waveform of the optical pulse train Pb detected in any one of the detection steps S105, S204, and S304. For example, as illustrated in FIG. 21, each of the feature amounts is at least one feature amount selected from the group consisting of the peak intensities $Eb_1$ and $Eb_2$ of the optical pulse $Pb_1$ and the optical pulse $Pb_2$, the full width at half maximum $Wb_1$ and $Wb_2$, and the peak time interval $Gb_{12}$. Subsequently, the arithmetic operation unit 5b estimates the wavelength dispersion amount of the optical component 7 by comparing the feature amount of the temporal waveform of the optical pulse train Pb theoretically calculated in advance (or measured in advance) on the assumption that the wavelength dispersion amount of the optical component 7 is zero, with the feature amount of the temporal waveform of the optical pulse train Pb detected in any of the detection steps S105, S204, and S304. In the present modification, in the determination step S205 in the second embodiment, it is determined whether or not the optical pulse $Pb_1$ and the optical pulse $Pb_2$ interfere with each other. In the selection step S306 in the third embodiment, the temporal waveform in which the optical pulse $Pb_1$ and the optical pulse $Pb_2$ do not interfere with each other is selected from two temporal waveforms corresponding to the first and second phase patterns.

In the present modification, as in each of the above embodiments, even in a case where the wavelength dispersion amount of the optical component 7 is either positive or negative, it is possible to widen the time difference between the optical pulse $Pb_1$ and the optical pulse $Pb_2$ when the optical pulse train Pb is transmitted through the optical component 7. This makes it possible to prevent interference of the optical pulse $Pb_1$ and the optical pulse $Pb_2$ with each other. Therefore, it is possible to accurately measure the wavelength dispersion amount of the optical component 7.

Second Modification

FIG. 22 is a diagram illustrating a configuration of a second modification of the embodiment. The present modification is different from each of the above embodiments in that the optical component 7 as the measurement object is disposed not on the optical path between the pulse forming unit 3 and the light detection unit 4 but on an optical path between the pulsed laser light source 2 and the pulse forming unit 3, and is identical to each of the above embodiments in other points. In the present modification, the initial pulsed light Pa output from the pulsed laser light source 2 is transmitted through the optical component 7 and then enters to the pulse forming unit 3.

In the present modification, after the initial pulsed light Pa is transmitted through the optical component 7, in the pulse forming steps S104, S203, and S303, the pulse forming unit 3 forms the optical pulse train Pb is formed from the initial pulsed light Pa. Then, in the detection steps S105, S204, and S304, the correlation optical system 40 generates the correlated light Pc from the optical pulse train Pb, and the detector 400 detects the temporal waveform of the correlated light Pc. Alternatively, as in the first modification, the temporal waveform of the optical pulse train Pb may be detected by the detector 400 without providing the correlation optical system 40. The arithmetic operation unit 5b estimates the wavelength dispersion amount of the optical component 7 from the temporal waveform of the correlated light Pc or the optical pulse train Pb.

As in the present modification, the optical component 7 as the measurement object may be disposed on the optical path between the pulsed laser light source 2 and the pulse forming unit 3. Even in this case, it is possible to widen the time difference between the optical pulse $Pb_1$ and the optical pulse $Pb_2$ regardless of whether the wavelength dispersion amount of the optical component 7 is positive or negative. Then, it is possible to widen the time difference between the plurality of optical pulses included in the correlated light Pc. As a result, it is possible to suppress interference of the plurality of optical pulses included in the correlated light Pc (or the optical pulse train Pb) with each other, and it is possible to accurately measure the wavelength dispersion amount of the optical component 7. As in the present modification, the optical component 7 as the measurement object may be disposed on the optical path between the pulsed laser light source 2 and the pulse forming unit 3. For example, as described above, it is possible to dispose the optical component 7 as the measurement object at any position on the optical path. Therefore, since the degree of freedom in spatial design of the device is high, it is possible to reduce the size of the device and to design the device for improving convenience such as ease of mounting and removal of the optical component 7.

Third Modification

Each of FIGS. 23(a), 24(a), 25(a), and 26(a) illustrates an example of a spectral waveform (spectrum phase G41, G51, G61, or G71 and spectrum intensity G42, G52, G62, or G72) of the output light from the pulse forming unit 3. Each of FIGS. 23(b), 24(b), 25(b), and 26(b) illustrates an example of a temporal waveform of the optical pulse train Pb corresponding to the spectral waveform. As described above, the first phase pattern is a phase pattern for generating the optical pulse train Pb (see FIG. 8(b)) in which the optical pulse $Pb_1$ is generated after the optical pulse $Pb_2$. The second phase pattern is a phase pattern for generating the optical pulse train Pb (see FIG. 7(b)) in which the optical pulse $Pb_2$ is generated after the optical pulse $Pb_1$.

In the temporal waveform of the optical pulse train Pb illustrated in FIGS. 23(b) and 25(b), the optical pulse $Pb_2$ is generated after the optical pulse $Pb_1$. Therefore, the second phase pattern may be a phase pattern corresponding to a spectrum phase G41 or G61 illustrated in FIG. 23(a) or FIG. 25(a). In the temporal waveform of the optical pulse train Pb illustrated in FIGS. 24(b) and 26(b), the optical pulse $Pb_1$ is generated after the optical pulse $Pb_2$. Therefore, the first phase pattern may be a phase pattern corresponding to a spectrum phase G51 or G71 illustrated in FIG. 24(a) or FIG. 26(a). The phase value of the spectrum phase G41 at each wavelength has a symmetrical relationship with the phase value of the spectrum phase G51 at each wavelength with respect to a predetermined phase value. The phase value of the spectrum phase G61 at each wavelength has a symmetrical relationship with the phase value of the spectrum phase G71 at each wavelength with respect to a predetermined phase value.

In each of the above embodiments, the first phase pattern may be a phase pattern corresponding to the spectrum phase G51 or G71 illustrated in the present modification. In each of the above embodiments, the second phase pattern may be a phase pattern corresponding to the spectrum phase G41 or G61 illustrated in the present modification. Even in this case, it is possible to exhibit the similar effects to those of the above embodiment.

Fourth Modification

FIG. 27 is a block diagram illustrating a configuration of a modulation pattern calculation unit 20 according to the present modification. The first phase pattern and the second phase pattern may be calculated by the modulation pattern calculation unit 20 illustrated in FIG. 27. In the present modification, the control device 5 includes the modulation pattern calculation unit 20, and the phase pattern calculated by the modulation pattern calculation unit 20 is stored by the control unit 5a.

The modulation pattern calculation unit 20 is, for example, a personal computer; a smart device such as a smartphone and a tablet terminal; or a computer such as a cloud server, that includes a processor. The arithmetic operation unit 5b illustrated in FIG. 1 may also serve as the modulation pattern calculation unit 20. The modulation pattern calculation unit 20 is electrically connected to the SLM 14 and calculates a phase modulation pattern for generating the optical pulse Pb, and provides a control signal including the calculated phase modulation pattern to the SLM 14. The modulation pattern is data for controlling the SLM 14, and is data including a table of intensity of complex amplitude distribution or intensity of phase distribution. The modulation pattern is, for example, a computer-generated hologram (CGH).

The modulation pattern calculation unit 20 in the modification causes the control unit 5a to store a phase pattern including a phase pattern for phase modulation and a phase pattern for intensity modulation. The phase pattern for phase modulation is a phase pattern that applies a phase spectrum for obtaining a desired waveform to the output light. The phase pattern for intensity modulation is a phase pattern that applies an intensity spectrum for obtaining a desired waveform to the output light. Therefore, as illustrated in FIG. 27, the modulation pattern calculation unit 20 includes an arbitrary waveform input unit 21, a phase spectrum design unit 22, an intensity spectrum design unit 23, and a modulation pattern generation unit 24. That is, the processor of a computer provided in the modulation pattern calculation unit 20 realizes the function of the arbitrary waveform input unit 21, the function of the phase spectrum design unit 22, the function of the intensity spectrum design unit 23, and the function of the modulation pattern generation unit 24. The respective functions may be realized by the same processor or may be realized by different processors.

The processor of the computer can implement the above functions by a modulation pattern calculation program. Thus, the modulation pattern calculation program causes the processor of the computer to operate as the arbitrary waveform input unit 21, the phase spectrum design unit 22, the intensity spectrum design unit 23, and the modulation pattern generation unit 24 in the modulation pattern calculation unit 20. The modulation pattern calculation program is stored in a storage device (storage medium) inside or outside the computer. The storage device may be a non-transitory recording medium. Examples of the recording medium include a recording medium such as a flexible disk, a CD, and a DVD, a recording medium such as a ROM, a semiconductor memory, a cloud server, and the like.

The arbitrary waveform input unit 21 receives the desired temporal intensity waveform input from an operator. The operator inputs information on the desired temporal intensity waveform (for example, a pulse interval, a pulse width, the number of pulses, and the like) to the arbitrary waveform input unit 21. The information on the desired temporal intensity waveform is provided to the phase spectrum design unit 22 and the intensity spectrum design unit 23. The phase spectrum design unit 22 calculates a phase spectrum of the output light of the pulse forming unit 3, which is suitable for realizing the given desired temporal intensity waveform. The intensity spectrum design unit 23 calculates an intensity spectrum of the output light of the pulse forming unit 3, which is suitable for realizing the given desired temporal intensity waveform. The modulation pattern generation unit 24 calculates a phase modulation pattern (for example, a computer-generated hologram) for applying the phase spectrum obtained in the phase spectrum design unit 22 and the intensity spectrum obtained in the intensity spectrum design unit 23 to the output light of the pulse forming unit 3. Then, the control unit 5a stores the calculated phase modulation pattern. Finally, a control signal SC is provided to the SLM 14 by the control unit 5a. The SLM 14 is controlled based on the control signal SC.

FIG. 28 is a block diagram illustrating an internal configuration of the phase spectrum design unit 22 and the intensity spectrum design unit 23. As illustrated in FIG. 28, the phase spectrum design unit 22 and the intensity spectrum design unit 23 include a Fourier transform unit 25, a function replacement unit 26, a waveform function modification unit 27, an inverse Fourier transform unit 28, and a target generation unit 29. The target generation unit 29 includes a Fourier transform unit 29a and a spectrogram modification unit 29b. The functions of each of the components will be described in detail later.

The desired temporal intensity waveform is expressed as a function in the time domain and the phase spectrum is expressed as a function in the frequency domain. Therefore, the phase spectrum corresponding to the desired temporal intensity waveform is obtained, for example, by an iterative Fourier transform based on the desired temporal intensity waveform. FIG. 29 is a diagram illustrating a calculation procedure of the phase spectrum using the iterative Fourier transform method. First, an initial intensity spectrum function $A_0(\omega)$ and an initial phase spectrum function $\Psi_0(\omega)$, which are functions of the frequency $\omega$, are prepared (process number (1) in FIG.). In an example, the intensity spectrum function $A_0(\omega)$ and the phase spectrum function $\Psi_0(\omega)$ represent the spectrum intensity and the spectrum phase of the input light, respectively. Then, a waveform function (a) in the frequency domain, which includes the intensity spectrum function $A_0(\omega)$ and the phase spectrum function $\Psi_n(\omega)$, is prepared (process number (2) in FIG.).

[Formula. 1]

$$\sqrt{A_0(\omega)}\exp\{i\Psi_n(\omega)\} \tag{a}$$

The subscript n indicates after the n-th Fourier transform process. Before a first Fourier transform process, the initial phase spectrum function $\Psi_0(\omega)$ described above is used as the phase spectrum function $\Psi_n(\omega)$. i is an imaginary number.

Then, Fourier transform from the frequency domain to the time domain is performed on the function (a) (arrow A1 in FIG.). As a result, a waveform function (b) in the time domain, which includes a temporal intensity waveform function $b_n(t)$ and a time-phase waveform function $\Theta_n(t)$, is obtained (process number (3) in FIG.).

[Formula. 2]

$$\sqrt{b_n(t)}\exp\{i\Theta_n(t)\} \tag{b}$$

Subsequently, the temporal intensity waveform function $b_n(t)$ included in the function (b) is replaced with a temporal intensity waveform function $\text{Target}_0(t)$ based on a desired waveform (process numbers (4) and (5) in FIG.).

[Formula. 3]

$$b_n(t):=\text{Target}_0(t) \tag{c}$$

[Formula. 4]

$$\sqrt{\text{Target}_0(t)}\exp\{i\Theta_n(t)\} \tag{d}$$

Subsequently, inverse Fourier transform from the time domain to the frequency domain is performed on a function (d) (arrow A2 in FIG.). As a result, a waveform function (e) in the frequency domain, which includes an intensity spectrum function $B_n(\omega)$ and the phase spectrum function $\Psi_n(\omega)$, is obtained (process number (6) in FIG.).

[Formula. 5]

$$\sqrt{B_n(\omega)}\exp\{i\Psi_n(\omega)\} \tag{e}$$

Subsequently, in order to restrain the intensity spectrum function $B_n(\omega)$ included in the function (e), the intensity spectrum function $B_n(\omega)$ is replaced with the initial intensity spectrum function $A_0(\omega)$ (process number (7) in FIG.).

[Formula. 6]

$$B_n(\omega)=A_0(\omega) \tag{f}$$

Thereafter, by repeatedly performing the above processes (2) to (7) a plurality of times, the phase spectrum shape represented by the phase spectrum function $\Psi_n(\omega)$ in the waveform function can be brought close to the phase spectrum shape corresponding to the desired temporal intensity waveform. The finally obtained phase spectrum function $\Psi_{IFTA}(\omega)$ is the basis of the modulation pattern for obtaining the desired temporal intensity waveform.

However, the iterative Fourier method as described above has a problem that, although the temporal intensity waveform can be controlled, it is not possible to control the frequency component (band wavelength) constituting the temporal intensity waveform. Therefore, the modulation pattern calculation unit 20 in the modification calculates the phase spectrum function and the intensity spectrum function that are the basis of the modulation pattern, by using a calculation method described below. FIG. 30 is a diagram illustrating a calculation procedure of the phase spectrum function in the phase spectrum design unit 22. First, an initial intensity spectrum function $A_0(\omega)$ and an initial phase spectrum function $\Phi_0(\omega)$, which are functions of the frequency $\omega$, are prepared (process number (11) in FIG.). In an example, the intensity spectrum function $A_0(\omega)$ and the phase spectrum function $\Phi_0(\omega)$ represent the spectrum intensity and the spectrum phase of input light, respectively. Then, a first waveform function (g) in the frequency domain, which includes the intensity spectrum function $A_0(\omega)$ and the phase spectrum function $\Phi_0(\omega)$, is prepared (process number (12-a)). Where i is an imaginary number.

[Formula. 7]

$$\sqrt{A_0(\omega)}\exp\{i\Phi_0(\omega)\} \tag{g}$$

Subsequently, the Fourier transform unit 25 of the phase spectrum design unit 22 performs the Fourier transform on the function (g) from the frequency domain to the time domain (arrow A3 in FIG.). As a result, a second waveform function (h) in the time domain, which includes the temporal intensity waveform function $a_0(t)$ and the time-phase waveform function $\varphi_0(t)$, is obtained (Fourier transform step, process number (13)).

[Formula. 8]

$$\sqrt{a_0(t)}\exp\{\varphi_0(t)\} \tag{h}$$

Subsequently, the function replacement unit 26 of the phase spectrum design unit 22 substitutes the temporal intensity waveform function $\text{Target}_0(t)$ based on the desired waveform input by the arbitrary waveform input unit 21 into a temporal intensity waveform function $b_0(t)$ as illustrated in the following formula (i) (process number (14-a)).

[Formula. 9]

$$b_0(t)=\text{Target}_0(t) \tag{i}$$

Subsequently, the function replacement unit 26 of the phase spectrum design unit 22 substitutes the temporal intensity waveform function $a_0(t)$ with the temporal intensity waveform function $b_0(t)$, as represented by the following formula (j). That is, the temporal intensity waveform function $a_0(t)$ included in the function (h) is replaced with the temporal intensity waveform function $\text{Target}_0(t)$ based on the desired waveform (function replacement step, process number (15)).

[Formula. 10]

$$\sqrt{b_0(t)}\exp\{i\varphi_0(t)\} \tag{j}$$

Subsequently, the waveform function modification unit 27 of the phase spectrum design unit 22 corrects the second waveform function such that the spectrogram of the second waveform function (j) after the replacement is close to the target spectrogram generated in advance in accordance with a desired wavelength band. First, by performing time-frequency transform on the second waveform function (j) after the replacement, the second waveform function (j) is converted into a spectrogram $SG_{0,k}(\omega, t)$ (process number (15-a) in FIG.). The subscript k indicates k-th conversion processing.

Here, the time-frequency transform refers to performing frequency filter processing or numerical arithmetic operation processing (processing of obtaining a spectrum for each time by performing multiplication while shifting a window function) on a composite signal such as a temporal waveform to convert the composite signal into three-dimensional information including time, frequency, and intensity (spectrum intensity) of a signal component. Further, in the present embodiment, the transform result (time, frequency, and spectrum intensity) is defined as a "spectrogram".

Examples of the time-frequency transform include short-time Fourier transform (STFT), wavelet transform (Halle wavelet transform, Gabor wavelet transform, Mexican-hat wavelet transform, Morley wavelet transform), and the like.

In addition, the target spectrogram $TargetSG_0(\omega, t)$ generated in advance in accordance with the desired wavelength band is read from the target generation unit 29. The target spectrogram $TargetSG_0(\omega, t)$ has substantially the same value as the target temporal waveform (the temporal intensity waveform and the frequency component constituting the temporal intensity waveform), and is generated in the target spectrogram function of the process number (15-b).

Then, the waveform function modification unit 27 of the phase spectrum design unit 22 performs pattern matching between the spectrogram $SG_{0,k}(\omega, t)$ and the target spectrogram $TargetSG_0(\omega, t)$, and examines the similarity (how much the spectrogram $SG_{0,k}(\omega, t)$ and the target spectrogram $TargetSG_0(\omega, t)$ match with each other). In the present embodiment, an evaluation value is calculated as an index representing the similarity. Then, in the subsequent process number (15-c), it is determined whether or not the obtained evaluation value satisfies a predetermined end condition. When the condition is satisfied, the process proceeds to a process number (16). When the condition is not satisfied, the process proceeds to a process number (15-d). In the process number (15-d), the time-phase waveform function $\varphi_0(t)$ included in the second waveform function is changed to a certain time-phase waveform function $\varphi_{0,k}(t)$. The second waveform function after changing the time-phase waveform function is converted into a spectrogram again by time-frequency transform such as STFT. Thereafter, the above-described process numbers (15-a) to (15-d) are repeatedly performed. In this manner, the second waveform function is corrected such that the spectrogram $SG_{0,k}(\omega, t)$ is gradually brought close to the target spectrogram $TargetSG_0(\omega, t)$ (waveform function correction step).

Then, the inverse Fourier transform unit 28 of the phase spectrum design unit 22 performs an inverse Fourier transform on the corrected second waveform function (arrow A4 in FIG.) and generates a third waveform function (k) in the frequency domain (inverse Fourier transform step, process number (16)).

[Formula. 11]

$$\sqrt{B_{0,k}(\omega)}\exp\{i\Phi_{0,k}(\omega)\} \quad (k)$$

The phase spectrum function $\Phi_{0,k}(\omega)$ included in the third waveform function (k) becomes a desired phase spectrum function $\Phi_{TWC\text{-}TFD}(\omega)$ to be finally obtained. The phase spectrum function $\Phi_{TWC\text{-}TFD}(\omega)$ is provided to the modulation pattern generation unit 24.

FIG. 31 is a diagram illustrating a calculation procedure of the intensity spectrum function in the intensity spectrum design unit 23. Since the process numbers (11) to (15-c) are similar to the above-described spectrum phase calculation procedure in the phase spectrum design unit 22, the description thereof is omitted. In a case where the evaluation value indicating the similarity between the spectrogram $SG_{0,k}(\omega, t)$ and the target spectrogram $TargetSG_0(\omega, t)$ does not satisfy the predetermined end condition, the waveform function modification unit 27 of the intensity spectrum design unit 23 changes the temporal intensity waveform function $b_0(t)$ to a certain temporal intensity waveform function $b_{0,k}(t)$ while restraining the time-phase waveform function $\varphi_0(t)$ included in the second waveform function with the initial value (process number (15-e)). The second waveform function after changing the temporal intensity waveform function is converted into a spectrogram again by time-frequency transform such as STFT. Thereafter, the process numbers (15-a) to (15-c) and (15-e) are repeatedly performed. In this manner, the second waveform function is corrected such that the spectrogram $SG_{0,k}(\omega), t)$ is gradually brought close to the target spectrogram $TargetSG_0(\omega, t)$ (waveform function correction step).

Then, the inverse Fourier transform unit 28 of the intensity spectrum design unit 23 performs an inverse Fourier transform on the corrected second waveform function (arrow A4 in FIG.) and generates a third waveform function (m) in the frequency domain (inverse Fourier transform step, process number (16)).

[Formula. 12]

$$\sqrt{B_{0,k}(\omega)}\exp\{i\Phi_{0,k}(\omega)\} \quad (m)$$

Subsequently, in the process number (17-b), a filter processing unit of the intensity spectrum design unit 23 performs filter processing based on the intensity spectrum of the input light, on the intensity spectrum function $B_{0,k}(\omega)$ included in the third waveform function (m) (filter processing step). Specifically, in the intensity spectrum obtained by multiplying the intensity spectrum function $B_{0,k}(\omega)$ by a coefficient $\alpha$, a portion exceeding the cutoff intensity for each wavelength determined based on the intensity spectrum of the input light is cut. This is performed in order to prevent an occurrence of a situation in which an intensity spectrum function $\alpha B_{0,k}(\omega)$ does not exceed the spectrum intensity of the input light in all the wavelength ranges. In an example, the cutoff intensity for each wavelength is set to coincide with the intensity spectrum of the input light (the initial intensity spectrum function $A_0(\omega)$ in the present embodiment). In this case, as represented in the following formula (n), at frequencies where the intensity spectrum function $\alpha B_{0,k}(\omega)$ is larger than the intensity spectrum function $A_0(\omega)$, the value of the intensity spectrum function $A_0(\omega)$ is taken as the value of the intensity spectrum function $A_{TWC\text{-}TFD}(\omega)$. At frequencies where the intensity spectrum function $\alpha B_{0,k}(\omega)$ is equal to or smaller than the intensity spectrum function $A_0(\omega)$, the value of the intensity spectrum function $\alpha B_{0,k}(\omega)$ is taken as the value of the intensity spectrum function $A_{TWC\text{-}TFD}(\omega)$ (process number (17-b) in FIG.).

[Formula. 13]

$$A_{TWC\text{-}TFD}(\omega) = \begin{cases} A_0(\omega) & A_0(\omega) < \alpha B_{0,k}(\omega) \\ \alpha B_{0,k}(\omega) & A_0(\omega) \geq \alpha B_{0,k}(\omega) \end{cases} \quad (n)$$

The intensity spectrum function $A_{TWC-IFD}(\omega)$ is provided to the modulation pattern generation unit 24 as the desired spectrum intensity to be finally obtained.

The modulation pattern generation unit 24 calculates a phase modulation pattern (for example, a computer-generated hologram) for giving, to the output light, the spectrum phase represented by the phase spectrum function $\Phi_{TWC-TFD}(\omega)$ calculated in the phase spectrum design unit 22 and the spectrum intensity represented by the intensity spectrum function $A_{TWC-TFD}(\omega)$ calculated in the intensity spectrum design unit 23 (data generation step).

FIG. 32 is a diagram illustrating an example of a generation procedure of the target spectrogram $TargetSG_0(\omega, t)$ in the target generation unit 29. The target spectrogram $TargetSG_0(\omega, t)$ indicates a target temporal waveform. The temporal waveform is a temporal intensity waveform and a frequency component (wavelength band component) constituting the temporal intensity waveform. Therefore, the creation of the target spectrogram is a critical step for controlling the frequency component (wavelength band component). As illustrated in FIG. 32, the target generation unit 29 first receives inputs of the spectral waveform (initial intensity spectrum function $A_0(\omega)$ and initial phase spectrum function $\Phi_0(\omega)$) and the desired temporal intensity waveform function $Target_0(t)$. In addition, the target generation unit 29 receives an input of a time function $p_0(t)$ including desired frequency (wavelength) band information (process number (21)).

Then, the target generation unit 29 calculates a phase spectrum function $\Phi_{IFTA}(\omega)$ for realizing the temporal intensity waveform function $Target_0(t)$, for example, by using the iterative Fourier transform method illustrated in FIG. 29 (process number (22)).

Subsequently, the target generation unit 29 calculates an intensity spectrum function $A_{IFTA}(\omega)$ for realizing the temporal intensity waveform function $Target_0(t)$ by an iterative Fourier transform method using the previously obtained phase spectrum function $\Phi_{IFTA}(\omega)$ (process number (23)). FIG. 33 is a diagram illustrating an example of a procedure for calculating the intensity spectrum function $A_{IFTA}(\omega)$.

Referring to FIG. 33, first, an initial intensity spectrum function $A_{k=0}(\omega)$ and an initial phase spectrum function $\Psi_0(\omega)$ are prepared (process number (31) in FIG.). Then, a waveform function (o) in the frequency domain, which includes the intensity spectrum function $A_k(\omega)$ and the phase spectrum function $\Psi_0(\omega)$, is prepared (process number (32) in FIG.).

[Formula. 14]

$$\sqrt{A_k(\omega)}\exp\{i\Psi_0(\omega)\} \tag{o}$$

The subscript k indicates after the k-th Fourier transform processing. Before the first Fourier transform processing, the intensity spectrum function $A_{k=0}(\omega)$ described above is used as the intensity spectrum function $A_k(\omega)$. i is an imaginary number.

Then, Fourier transform from the frequency domain to the time domain is performed on the function (o) (arrow A5 in FIG.). As a result, a waveform function (p) in the time domain, which includes the temporal intensity waveform function $b_k(t)$, is obtained (process number (33) in FIG.).

[Formula. 15]

$$\sqrt{b_k(t)}\exp\{i\Theta_n(t)\} \tag{p}$$

Subsequently, the temporal intensity waveform function $b_k(t)$ included in the function (p) is replaced with the temporal intensity waveform function $Target_0(t)$ based on a desired waveform (process numbers (34) and (35) in FIG.).

[Formula. 16]

$$b_k(t):=Target_0(t) \tag{q}$$

[Formula. 17]

$$\sqrt{Target_0(t)}\exp\{i\Theta_k(t)\} \tag{r}$$

Subsequently, inverse Fourier transform from the time domain to the frequency domain is performed on a function (r) (arrow A6 in FIG.). As a result, a waveform function (s) in the frequency domain, which includes an intensity spectrum function $C_k(\omega)$ and the phase spectrum function $\Psi_k(\omega)$, is obtained (process number (36) in FIG.).

[Formula. 18]

$$\sqrt{C_k(\omega)}\exp\{i\Psi_n(\omega)\} \tag{s}$$

Subsequently, in order to restrain the phase spectrum function $\Psi_k(\omega)$ included in the function (s), the phase spectrum function $\Psi_k(\omega)$ is replaced with the initial phase spectrum function $\Psi_k(\omega)$ (process number (37-a) in FIG.).

[Formula. 19]

$$\Psi_k(\omega)=\Psi_0(\omega) \tag{t}$$

In addition, filter processing based on the intensity spectrum of the input light is performed on the intensity spectrum function $C_k(\omega)$ in the frequency domain after the inverse Fourier transform. Specifically, in the intensity spectrum represented by the intensity spectrum function $C_k(\omega)$, a portion exceeding a cutoff intensity for each wavelength determined based on the intensity spectrum of the input light is cut. In an example, the cutoff intensity for each wavelength is set to coincide with the intensity spectrum (for example, the initial intensity spectrum function $A_k=((\omega))$ of the input light. In this case, as represented in the following formula (u), at frequencies where the intensity spectrum function $C_k(\omega)$ is larger than the intensity spectrum function $A_{k=0}(\omega)$, the value of the intensity spectrum function $A_{k=0}(\omega)$ is taken as the value of the intensity spectrum function $A_k(\omega)$. At frequencies where the intensity spectrum function $C_k(\omega)$ is equal to or smaller than the intensity spectrum function $A_{k=0}(\omega)$, the value of the intensity spectrum function $C_k(\omega)$ is taken as the value of the intensity spectrum function $A_k(\omega)$ (process number (37-b) in FIG.).

[Formula. 20]

$$A_k(\omega) = \begin{cases} A_{k=0}(\omega), & A_{k=0}(\omega) < c_k(\omega) \\ c_k(\omega), & A_{k=0}(\omega) \geq c_k(\omega) \end{cases} \tag{u}$$

The intensity spectrum function $C_k(\omega)$ included in the function (s) is replaced with the intensity spectrum function $A_k(\omega)$ after the filter processing in accordance with the above formula (u).

Thereafter, by repeatedly performing the above processes (32) to (37-b), the phase spectrum shape represented by the intensity spectrum function $A_k(\omega)$ in the waveform function can be brought close to the intensity spectrum shape corresponding to the desired temporal intensity waveform. Finally, the intensity spectrum function $A_{IFTA}(\omega)$ is obtained.

Refer to FIG. 32 again. By calculating the phase spectrum function $\Phi_{IFTA}(\omega)$ and the intensity spectrum function $A_{IFTA}$ (ω) in the process numbers (22) and (23) described above, a third waveform function (v) in the frequency domain, which includes the above functions, is obtained (process number (24)).

[Formula. 21]

$$\sqrt{A_{IFTA}(\omega)}\exp\{i\Psi_{IFTA}(\omega)\} \quad (v)$$

The Fourier transform unit 29a of the target generation unit 29 performs the Fourier transform on the waveform function (v). As a result, a fourth waveform function (ω) in the time domain is obtained (process number (25)).

[Formula. 22]

$$\sqrt{a_{IFTA}(t)}\exp\{i\varphi_{IFTA}(t)\} \quad (w)$$

The spectrogram modification unit 29b of the target generation unit 29 converts the fourth waveform function (ω) into a spectrogram $SG_{IFTA}(\omega, t)$ by time-frequency transform (process number (26)). Then, in the process number (27), the target spectrogram $TargetSG_0(\omega, t)$ is generated by correcting the spectrogram $SG_{IFTA}(\omega, t)$ based on the time function $p_0(t)$ including the desired frequency (wavelength) band information (process number (28)). For example, a characteristic pattern appearing in the spectrogram $SG_{IFTA}(\omega, t)$ configured by two-dimensional data is partially cut out, and a frequency component of this portion is operated based on the time function $p_0(t)$. Specific examples thereof will be described below in detail.

For example, consider a case where a triple pulse having a time interval of 2 picoseconds is set as the desired temporal intensity waveform function $Target_0(t)$. At this time, the spectrogram $SG_{IFTA}(\omega, t)$ has a result as illustrated in FIG. 34(a). In FIG. 34(a), the horizontal axis indicates the time (unit: femtosecond), and the vertical axis indicates the wavelength (unit: nm). The value of the spectrogram is indicated by the brightness and darkness in FIG. 25(a), and the higher the brightness, the larger the value of the spectrogram. In this spectrogram $SG_{IFTA}(\omega, t)$, triple pulses appear as domains $D_1$, $D_2$, and $D_3$ separated on the time axis at intervals of 2 picoseconds. The center (peak) wavelengths of the domains $D_1$, $D_2$, and $D_3$ are 800 nm.

In a case where it is desired to control only the temporal intensity waveform of the output light (to simply obtain a triple pulse), it is not necessary to operate the domains $D_1$, $D_2$, and $D_3$. However, in a case where it is desired to control the frequency (wavelength) band of each pulse, it is necessary to operate the domains $D_1$, $D_2$, and $D_3$. That is, as illustrated in FIG. 34(b), moving the domains $D_1$, $D_2$, and $D_3$ independently of each other in a direction along the wavelength axis (vertical axis) means changing the constituent frequency (wavelength band) of each pulse. Such a change in the constituent frequency (wavelength band) of each pulse is performed based on the time function $p_0(t)$.

For example, when the time function $p_0(t)$ is described such that the peak wavelength of the domain $D_2$ is kept at 800 nm and the peak wavelengths of the domains $D_1$ and $D_3$ are translated by −2 nm and +2 nm, respectively, the spectrogram $SG_{IFTA}(\omega, t)$ changes to the target spectrogram $TargetSG_0(\omega, t)$ illustrated in FIG. 34(b). For example, by performing such processing on the spectrogram, it is possible to create the target spectrogram in which the constituent frequency (wavelength band) of each pulse is freely controlled without changing the shape of the temporal intensity waveform.

The dispersion measuring device and the dispersion measuring method according to the present disclosure are not limited to the embodiments described above, and various modifications can be made. For example, in the above embodiments, the optical component 7 which is an optical waveguide such as an optical fiber is exemplified as the measurement object, but the measurement object may be an optical component other than the optical waveguide, or may be various objects other than the optical component.

INDUSTRIAL APPLICABILITY

The embodiment can be used as a dispersion measuring device and a dispersion measuring method capable of accurately measuring a wavelength dispersion amount of a measurement object.

REFERENCE SIGNS LIST 1A, 1B: dispersion measuring device, 2: pulsed laser light source, 3: pulse forming unit, 3a: light input end, 3b: light output end, 4, 4A: light detection unit, 40, 40A, 40B, 40C: correlation optical system, 4a: light input end, 40b: light output end, 40c to 40f: optical path, 400: detector, 5: control device, 5a: control unit, 5b: arithmetic operation unit, 5c: input unit, 5d: output unit, 7: optical component (measurement object), 12: diffraction grating, 13, 15: lens, 14: spatial light modulator (SLM), 16: diffraction grating, 17: modulation surface, 17a: modulation region, 20: modulation pattern calculation unit, 21: arbitrary waveform input unit, 22: phase spectrum design unit, 23: intensity spectrum design unit, 24: modulation pattern generation unit, 25: fourier transform unit, 26: function replacement unit, 27: waveform function modification unit, 28: inverse fourier transform unit, 29: target generation unit, 29a: fourier transform unit, 29b: spectrogram modification unit, 41, 43: lens, 42: optical element, 44: beam splitter, 45, 46, 48: mirror, 47, 49: moving stage, 51: processor, 54: input device, 55: output device, 56: communication module, 57: auxiliary storage device, Pa: initial pulsed light, Pb, Pd: optical pulse train, $Pb_1$: optical pulse (first optical pulse), $Pb_2$: optical pulse (second optical pulse), $Pd_1$, $Pd_2$: optical pulse, Pba, Pbb: optical pulse train, Pc: correlated light, $Pc_1$, $Pc_2$, $Pc_3$: optical pulse, Pr: reference optical pulse, SC: control signal, G21, G41, G61: spectrum phase (second phase pattern), G51, G31, G71: spectrum phase (first phase pattern).

The invention claimed is:

1. A dispersion measuring device comprising:
a light source configured to output initial pulsed light;
a control unit configured to store a first phase pattern and a second phase pattern and selectively output the first phase pattern and the second phase pattern, the first phase pattern and the second phase pattern being phase patterns presented in a spatial light modulator in order to generate modulated light by applying a predetermined phase shift for each wavelength to the initial pulsed light;
a pulse forming unit including the spatial light modulator configured to present a phase pattern output by the control unit, the pulse forming unit forming, from the initial pulsed light, an optical pulse train that is the modulated light including a first optical pulse of which a center wavelength is a first wavelength and a second optical pulse of which a center wavelength is a second wavelength shorter than the first wavelength;
a light detection unit configured to detect a temporal waveform of the optical pulse train; and
an arithmetic operation unit electrically connected to the light detection unit, wherein a measurement object is disposed on an optical path between the light source and the pulse forming unit or an optical path between the pulse forming unit and the light detection unit, the arithmetic operation unit estimates a wavelength dispersion amount of the measurement object based on a feature amount of the temporal waveform, the first optical pulse and the second optical pulse have a time difference from each other, the first phase pattern is a phase pattern for applying the predetermined phase shift for each wavelength to the initial pulsed light so that the first optical pulse is generated after the second optical pulse, and the second phase pattern is a phase pattern for applying the predetermined phase shift for each wavelength to the initial pulsed light so that the second optical pulse is generated after the first optical pulse.

2. The dispersion measuring device according to claim 1, wherein the control unit outputs the first phase pattern in a case where the wavelength dispersion amount of the measurement object is negative, and outputs the second phase pattern in a case where the wavelength dispersion amount of the measurement object is positive.

3. The dispersion measuring device according to claim 1, wherein, in a case where one of the first phase pattern and the second phase pattern is output, and then it is determined that the first optical pulse and the second optical pulse interfere with each other in the temporal waveform of the optical pulse train detected by the light detection unit, the control unit outputs another phase pattern.

4. The dispersion measuring device according to claim 1, wherein the arithmetic operation unit estimates the wavelength dispersion amount of the measurement object based on the temporal waveform of the optical pulse train in which a time difference between peaks is larger among a temporal waveform of the optical pulse train detected by the light detection unit when the first phase pattern is output by the control unit and a temporal waveform of the optical pulse train detected by the light detection unit when the second phase pattern is output by the control unit.

5. The dispersion measuring device according to claim 1, wherein the light detection unit including a correlation optical system configured to receive the optical pulse train and output correlated light including cross-correlation or autocorrelation of the optical pulse train, the light detection unit detecting a temporal waveform of the correlated light as the temporal waveform of the optical pulse train, and the arithmetic operation unit estimates the wavelength dispersion amount of the measurement object based on a feature amount of the temporal waveform of the correlated light.

6. The dispersion measuring device according to claim 5, wherein, in a case where one of the first phase pattern and the second phase pattern is output, and then it is determined that optical pulses interfere with each other in the temporal waveform of the correlated light detected by the light detection unit, the control unit outputs another phase pattern.

7. The dispersion measuring device according to claim 5, wherein the arithmetic operation unit estimates the wavelength dispersion amount of the measurement object based on the temporal waveform of the correlated light in which a time difference between peaks is larger among a temporal waveform of the correlated light detected by the light detection unit when the first phase pattern is output by the control unit and a temporal waveform of the correlated light detected by the light detection unit when the second phase pattern is output by the control unit.

8. The dispersion measuring device according to claim 1, wherein the first phase pattern and the second phase pattern indicate a phase value at each wavelength, the phase value being a value indicating a magnitude of a phase shift applied to the initial pulsed light, and at each wavelength, the phase value in the first phase pattern has a symmetric relationship with the phase value of the second phase pattern with respect to a predetermined phase value.

9. The dispersion measuring device according to claim 1, wherein the measurement object is disposed on an optical path between the pulse forming unit and the light detection unit.

10. A dispersion measuring method comprising:

outputting initial pulsed light;

storing a first phase pattern and a second phase pattern and selectively outputting the first phase pattern and the second phase pattern, the first phase pattern and the second phase pattern being phase patterns presented in a spatial light modulator in order to generate modulated light by applying a predetermined phase shift for each wavelength to the initial pulsed light;

forming an optical pulse train from the initial pulsed light in the spatial light modulator configured to present the phase patterns output in the outputting, the optical pulse train being the modulated light including a first optical pulse of which a center wavelength is a first wavelength and a second optical pulse of which a center wavelength is a second wavelength shorter than the first wavelength;

detecting a temporal waveform of the optical pulse train; and acquiring a feature amount of the temporal waveform, wherein in the forming, the optical pulse train is formed from the initial pulsed light after the initial pulsed light is transmitted through a measurement object, or in the detecting, the temporal waveform of the optical pulse train is detected after the optical pulse train is transmitted through the measurement object, in the acquiring, a wavelength dispersion amount of the measurement object is estimated based on the feature amount of the temporal waveform, the first optical pulse and the second optical pulse have a time difference from each other, the first phase pattern is a phase pattern for applying the predetermined phase shift for each wavelength to the initial pulsed light so that the first optical pulse is generated after the second optical pulse, and the second phase pattern is a phase pattern for applying the predetermined phase shift for each wavelength to the initial pulsed light so that the second optical pulse is generated after the first optical pulse.

11. The dispersion measuring method according to claim 10, wherein in the detecting, correlated light including cross-correlation or autocorrelation of the optical pulse train is generated, and a temporal waveform of the correlated light is detected as the temporal waveform of the optical pulse train, and in the acquiring, the wavelength dispersion amount of the measurement object is estimated based on a feature amount of the temporal waveform of the correlated light.

* * * * *